US012739845B2

(12) United States Patent
Fan

(10) Patent No.: US 12,739,845 B2
(45) Date of Patent: Sep. 15, 2026

(54) ELECTRONIC DEVICE AND METHOD IN A WIRELESS COMMUNICATION

(71) Applicant: Sony Group Corporation, Tokyo (JP)

(72) Inventor: Tingting Fan, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 347 days.

(21) Appl. No.: 18/681,520

(22) PCT Filed: Jul. 14, 2022

(86) PCT No.: PCT/CN2022/105640
§ 371 (c)(1),
(2) Date: Feb. 6, 2024

(87) PCT Pub. No.: WO2023/040445
PCT Pub. Date: Mar. 23, 2023

(65) Prior Publication Data

US 2024/0276514 A1 Aug. 15, 2024

(30) Foreign Application Priority Data

Sep. 17, 2021 (CN) .......................... 202111091184.3

(51) Int. Cl.
*H04W 72/23* (2023.01)
*H04W 48/16* (2009.01)

(52) U.S. Cl.
CPC ........... *H04W 72/23* (2023.01); *H04W 48/16* (2013.01)

(58) Field of Classification Search
CPC ... H04L 1/0031; H04L 5/0053; H04L 5/0094; H04W 48/16; H04W 52/0229; H04W 72/23; Y02D 30/70

(Continued)

(56) References Cited

U.S. PATENT DOCUMENTS 8,433,251 B2 4/2013 Chen
11,064,473 B2 * 7/2021 He ...................... H04W 68/005

(Continued)

FOREIGN PATENT DOCUMENTS

CN 103188799 A 7/2013
CN 105637959 A 6/2016

(Continued)

OTHER PUBLICATIONS

International Search Report and Written Opinion mailed on Oct. 10, 2022, received for PCT Application PCT/CN2022/105640, filed on Jul. 14, 2022, 11 pages including English Translation.

(Continued)

*Primary Examiner* — Robert J Lopata
(74) *Attorney, Agent, or Firm* — XSENSUS LLP

(57) ABSTRACT

The present disclosure relates to an electronic device and a method in a wireless communication system. Provided is a control-side electronic device in a wireless communication system. The control-side electronic device is capable of performing data transmission based on a predetermined resource with a terminal-side electronic device in the wireless communication system in a data communication period. The control-side electronic device comprises a processing circuit, which is configured to acquire control information related to wireless communication between the control-side electronic device and the terminal-side electronic device, and to send the acquired control information to the terminal-side electronic device in the wireless communication system, wherein the control information is set such that the number of detection operations executed by the terminal-side electronic device on the control information related to the wireless communication is reduced.

17 Claims, 22 Drawing Sheets

(a)

(b)

(58) Field of Classification Search
USPC .......................................................... 370/329
See application file for complete search history.

(56) References Cited

U.S. PATENT DOCUMENTS

| | | | |
|---|---|---|---|
| 11,991,635 B2* | 5/2024 | Yang | H04W 52/0235 |
| 2012/0082130 A1 | 4/2012 | Xue et al. | |
| 2021/0368367 A1* | 11/2021 | Jiang | H04W 52/02 |
| 2022/0022241 A1 | 1/2022 | Zhang | |
| 2023/0022171 A1* | 1/2023 | Luo | H04W 52/028 |
| 2024/0172246 A1* | 5/2024 | Mohammad Soleymani | H04L 5/0053 |
| 2024/0195483 A1* | 6/2024 | Jang | H04W 52/242 |
| 2024/0357496 A1* | 10/2024 | Kim | H04L 1/1896 |

FOREIGN PATENT DOCUMENTS

| | | |
|---|---|---|
| CN | 103532688 B | 11/2016 |
| CN | 109891789 A | 6/2019 |
| CN | 110493874 A | 11/2019 |
| CN | 110691416 A | 1/2020 |
| CN | 111903088 A | 11/2020 |
| CN | 111937486 A | 11/2020 |
| CN | 112399436 A | 2/2021 |
| CN | 112438030 A | 3/2021 |
| WO | 2013/172672 A1 | 11/2013 |
| WO | WO-2019222922 A1 | 11/2019 |
| WO | WO-2020199967 A1 | 10/2020 |

OTHER PUBLICATIONS

CATT, "Discussion on PDCCH monitoring reduction", 3GPP TSG RAN WG1 Meeting #102-e, R1-2005715, Aug. 17-28, 2020, 7 pages.

* cited by examiner ( a )

( b )

( a )

(b)

(a)

(b)

(a)

(b)

(a)

(b)

ELECTRONIC DEVICE AND METHOD IN A WIRELESS COMMUNICATION

CROSS-REFERENCE OF RELATED APPLICATIONS

This application is a national stage of International Application No. PCT/CN2022/105640, filed on Jul. 14, 2022, which is based on and claims the benefit of Chinese patent application No. 202111091184.3, filed on Sep. 17, 2021, both of the aforementioned applications are hereby incorporated by reference in their entireties.

FIELD OF THE INVENTION

The present disclosure relates to electronic device and method in a wireless communication system, and in particular, to electronic device and method for optimizing traffic data transmission in a wireless communication system.

BACKGROUND

With development and widespread application of mobile Internet technology, more and more devices are connected into mobile networks, and new services and applications are emerging in endlessly. In order to meet people's communication requirements, the fifth-generation mobile communication technology (referred to as 5G or 5G technology) has become a hot topic of discussion and research in the communication industry and academia. The fifth-generation mobile communication technology is the latest generation of cellular mobile communication technology, and its performance goals are high data rate, latency reduction, energy saving, cost reduction, system capacity increase and large-scale device connectivity.

With rapid development of the number of Internet users and communication requirements, the surge in mobile data traffic will bring serious challenges to the network. In particular, the growth of data traffic is often accompanied by complex data transmission operations and increase in power consumption overhead, which imposes higher requirements on the current wireless communication.

Unless otherwise stated, it should not be assumed that any of the methods described in this section become prior art only because they are included in this section. Similarly, unless otherwise stated, the problems recognized about one or more methods should not be assumed to be recognized in any prior art on the basis of this section.

DISCLOSURE OF THE INVENTION

The present disclosure provides a scheme for optimizing traffic data transmission in a wireless communication system.

In particular, the present disclosure proposes optimizing settings for control information in wireless communication so as to reduce power consumption overhead in data transmission and achieve good energy saving. In particular, the present disclosure proposes optimizing settings for the format or content of control information, thereby effectively reducing detection operations for control information during wireless communication.

Additionally, the present disclosure also proposes application of a specific wireless data transmission mode, especially combination of the specific wireless data transmission mode and dynamic data scheduling, so that transmission data matching can be optimized.

Still additionally, the present disclosure further proposes a combination of a specific wireless data transmission mode, dynamic data scheduling, and optimized format of scheduling control information, which can optimize transmission data matching, while effectively reducing power consumption overhead in data transmission and achieving good energy saving.

One aspect of the present disclosure relates to a control-side electronic device in a wireless communication system, the control-side electronic device being capable of communicating with a terminal-side electronic device in the wireless communication system, wherein the control-side electronic device comprises a processing circuit, which is configured to acquire control information related to wireless communication between the control-side electronic device and the terminal-side electronic device, and send the acquired control information to the terminal-side electronic device in the wireless communication system, wherein the control information is set such that the number of detection operations performed by the terminal-side electronic device on the control information related to wireless communication is reduced.

Another aspect of the present disclosure relates to a control-side electronic device in a wireless communication system, the control-side electronic device being capable of performing data transmission based on a predetermined resource with a terminal-side electronic device in the wireless communication system in a data communication cycle, wherein the control-side electronic device comprises a processing circuit, which is configured to acquire relevant information about data to be dynamically scheduled between the control-side electronic device and the terminal-side electronic device; generate dynamic scheduling control information indicating data dynamic scheduling configuration with respect to the acquired relevant information; and send the generated dynamic scheduling control information to the terminal-side electronic device in the wireless communication system, wherein the dynamic scheduling control information is set such that the number of detection operations performed by the terminal-side electronic device on the control information is reduced.

Another aspect of the present disclosure relates to a terminal-side electronic device in a wireless communication system, the terminal-side electronic device being capable of performing data transmission based on a predetermined resource with a control-side electronic device in the wireless communication system in a data communication cycle, wherein the terminal-side electronic device comprises a processing circuit configured to send relevant information about data to be dynamically scheduled between the control-side electronic device and the terminal-side electronic device to the control-side electronic device based on the predetermined source; receive dynamic scheduling control information indicating data dynamic scheduling configuration that is from the control-side electronic device and is generated with respect to the acquired relevant information; and send an output to the control-side electronic device based on dynamic resources indicated by the dynamic scheduling control information.

Still another aspect of the present disclosure relates to a method for a control side in a wireless communication system, a control-side electronic device in the wireless communication system can communicate with a terminal-side electronic device in the wireless communication system, and the method includes: acquiring control information related to wireless communication between the control-side electronic device and the terminal-side electronic device, and sending the acquired control information to the terminal-side electronic device in the wireless communication system, wherein the control information is set such that the number of detection operations performed by the terminal-side electronic device on the control information related to wireless communication is reduced.

Still another aspect of the present disclosure relates to a method for a control side in a wireless communication system, a control-side electronic device in the wireless communication system can perform data transmission based on a predetermined resource with a terminal-side electronic device in the wireless communication system in a data communication cycle, wherein the method comprises acquiring relevant information about data to be dynamically scheduled between the control-side electronic device and the terminal-side electronic device; generating dynamic scheduling control information indicating data dynamic scheduling configuration with respect to the acquired relevant information; and sending the generated dynamic scheduling control information to the terminal-side electronic device in the wireless communication system, wherein the dynamic scheduling control information is set such that the number of detection operations performed by the terminal-side electronic device on the control information is reduced.

Yet another aspect of the present disclosure relates to a method for a terminal side in a wireless communication system, a terminal-side electronic device in the wireless communication system can perform data transmission based on a predetermined resource with a control-side electronic device in the wireless communication system in a data communication cycle. The method comprises sending relevant information about data to be dynamically scheduled between the control-side electronic device and the terminal-side electronic device to the control-side electronic device based on the predetermined source; receiving dynamic scheduling control information indicating data dynamic scheduling configuration that is from the control-side electronic device and is generated with respect to the acquired relevant information; and sending an output to the control-side electronic device based on dynamic resources indicated by the dynamic scheduling control information.

Yet another aspect of the present disclosure relates to a non-transitory computer-readable storage medium storing executable instructions thereon, and the executable instructions, when executed, cause implementation of methods as described herein.

In still another aspect, there is provided a wireless communication device. In an embodiment, the wireless communication device comprises a processor and a storage device having stored executable instructions thereon, and the executable instructions, when executed, cause implementation of methods as described herein.

Yet another aspect of the present disclosure relates to a wireless communication apparatus including means for implementing methods as previously described.

Yet another aspect of the present disclosure relates to a computer program product comprising instructions executable by an electronic device to implement the method as previously described.

Still another aspect of the present disclosure relates to a computer program comprising instructions which, when executed by a computer, cause the computer to implement methods as previously described.

The above summary is provided in order to summarize some exemplary embodiments and provide a basic understanding of various aspects of the subject matter described herein. Accordingly, the above features are exemplary only and should not be construed as in any way narrowing the scope or spirit of the subject matter described herein. Other features, aspects, and advantages of the subject matter described herein will become apparent from the following detailed description, taken in conjunction with the accompanying drawings.

DESCRIPTION OF THE DRAWINGS

Hereinafter, the above and other objects and advantages of the present disclosure will be further described in combination with specific embodiments with reference to the accompanying drawings. In the drawings, the same or corresponding technical features or components will be denoted by the same or corresponding reference numerals.

Figure 1:
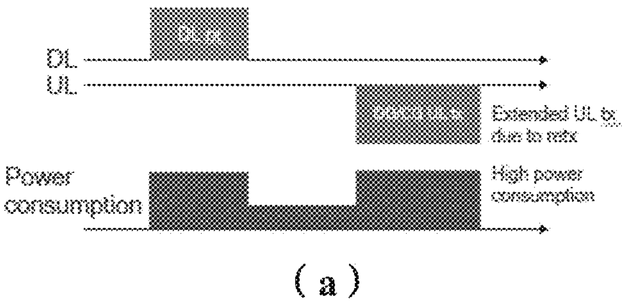
FIG. 1 shows uplink and downlink data alignment for terminal energy saving in the prior art.
Figure 1:
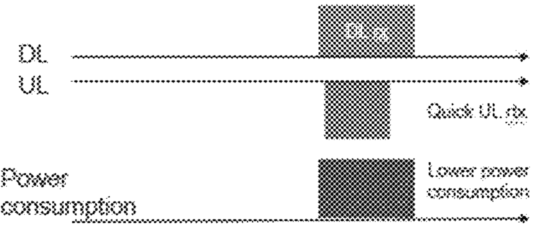

Although embodiments of this disclosure may be susceptible to various modifications and alternative forms, the embodiments of the present disclosure are shown by way of example in the drawings and are described in detail herein. It should be understood that the drawings and detailed description thereof are not intended to limit the embodiments to the particular forms disclosed, on the contrary, the intention is to cover all modifications, equivalents, and alternatives falling within the spirit and scope of the claims.

DETAILED DESCRIPTION OF PREFERRED EMBODIMENTS

Hereinafter, exemplary embodiments of the present disclosure will be described with reference to the accompanying drawings. For the sake of clarity and conciseness, not all features of the embodiments are described in the description. However, it should be understood that many implementation-specific settings must be made during the implementation of the embodiments in order to achieve specific goals of developers, for example, to meet those constraints related to equipment and business, and these constraints may vary with different implementations. In addition, it should be understood that although the development work may be very complicated and time-consuming, it is only a routine task for those skilled in the art who benefit from this disclosure.

Here, it should also be noted that in order to avoid obscuring the present disclosure by unnecessary details, only processing steps and/or device structures closely related to the schemes at least according to the present disclosure are shown in the drawings, while other details not closely related to the present disclosure are omitted. It should be noted that similar reference numerals and letters indicate similar items in the drawings, and therefore, once an item is defined in one drawing, there is no need to discuss it for subsequent drawings.

In this disclosure, the terms "first", "second" and the like are only used to distinguish elements or steps, and are not intended to indicate time sequence, preference, or importance.

Currently, 5G communication has been widely used in various applications, especially for XR applications. XR refers to a real and virtual combined environment which is generated through computer technology and wearable devices and in which human-computer interaction can be carried out, including augmented reality (AR), virtual reality (VR), mixed reality (MR) and other forms. The development of XR must rely on large bandwidth and low latency, so 5G will naturally facilitate XR.

In order to enable NR to efficiently support XR/CG (computer graphics) services in 5G communication, 3GPP passed a study item (SI) of XR project in Rel-17, aiming to establish the XR/CG traffic model at the physical layer. At current, the study item initially establishes uplink and downlink traffic models for various XR/CG scenarios. In particular, the existing RAN1 #104 agreement provides a downlink (DL) traffic model for XR/CG, which contains data that arrives periodically and follows a truncated Gaussian distribution, that is, the DL of XR/CG corresponds to periodic arrival of DL packets with non-fixed sizes. The existing RAN1 #104b agreement provides an uplink (UL) traffic model of XR/CG, in particular, there are four optional simulation items for UL of augmented reality (AR), among which the former two options (option 1 and option 2) contain baseline options. It can be observed from these two options that the UL traffic models all contain UL data that arrives periodically and follows a truncated Gaussian distribution, that is, AR UL data corresponds to periodic arrival of data packets with non-fixed sizes. It can be seen that in XR/CG, especially AR scenarios, both UL and DL can be services that arrive periodically and have variable data sizes.

However, the existing NR standard adopts Configure Grant (CG)/semi-persistent scheduling (SPS) for periodic arrival traffics, in particular, the existing standards adopt CG-PUSCH and SPS-PDSCH technologies for uplink and downlink periodic traffic arrivals separately, but these technologies all are designed for fixed-size data packets and cannot support variable-size data packets. Therefore, the SPS/CG technology used by existing NR for traffics that arrive periodically and have fixed data packet sizes cannot be well adapted to XR services that arrive periodically and have non-fixed sizes, and shall be improved so as to effectively support XR services.

In addition, due to large amount of data in XR uplink and downlink traffics and more frequent data uplink transmission, the power consumption overhead at the terminal increases, and the existing energy-saving solutions cannot well meet the energy-saving requirements of XR services, in order to reduce the power consumption of UE, it is necessary to make improvement so as to reduce the power overhead at XR service terminals.

With respect to the energy-saving problem of XR, some current energy-saving enhancement technologies include enhancing DRX, multiple sets of DRX configurations and DRX group configurations are proposed (such as in Rel-16), and DRX groups are configured to enable dynamic and flexible adjustment of DRX (dynamic adaptive DRX behavior, RWS-210164). However, the disadvantage is that the terminal needs to maintain multiple sets of DRX timers, which cannot effectively reduce the terminal overhead. A solution for uplink and downlink data alignment has also been proposed, that is, the uplink and downlink data are sent in the same time period, and the terminal enters an inactive duration during the remaining time, as shown in FIG. 1. However, due to different cycles of uplink and downlink traffics, it is difficult to implement in the design that uplink and downlink both are concentrated and sent within the same period of time, which does not match the actual traffics of uplink and downlink data.

In view of this, the present disclosure proposes optimizing settings for control information (for example, DCI) involved in wireless communication, especially optimizing the content and/or format of the control information, so as to reduce the power consumption overhead in data transmission and achieve good energy saving.

In particular, in a wireless communication system including a control-side device and a terminal-side device, the control-side device sends control information to the terminal-side device, and the terminal-side device receives and detects the control information, so as to facilitate wireless communication between the control-side device communicates with the terminal-side device. When the terminal-side device detects the control information, it usually detects it within a wide range predetermined by the system, which can be called blind detection. Blind detection usually requires searching all search space sets (SSS), especially detecting all candidate PDCCHs in all search space sets, and the candidate PDCCHs configured in each SSS are usually associated with DCI format, DCI format sets, aggregation level (AL), etc. However, since the search space set is usually relatively large, the detection times in the blind detection operation of the control information is usually more, which often results in larger overhead.

According to embodiments of the present disclosure, detection of control information can be improved by optimizing the control information. Specifically, the content and/or format of the control information can be set such that the number of detection operations performed by the terminal-side device on the control information can be reduced, especially the search space when detecting the control information can be reduced, thereby reducing the times of detection or blind detection of control information, and reducing the power consumption overhead on the terminal side.

Figure 2A:
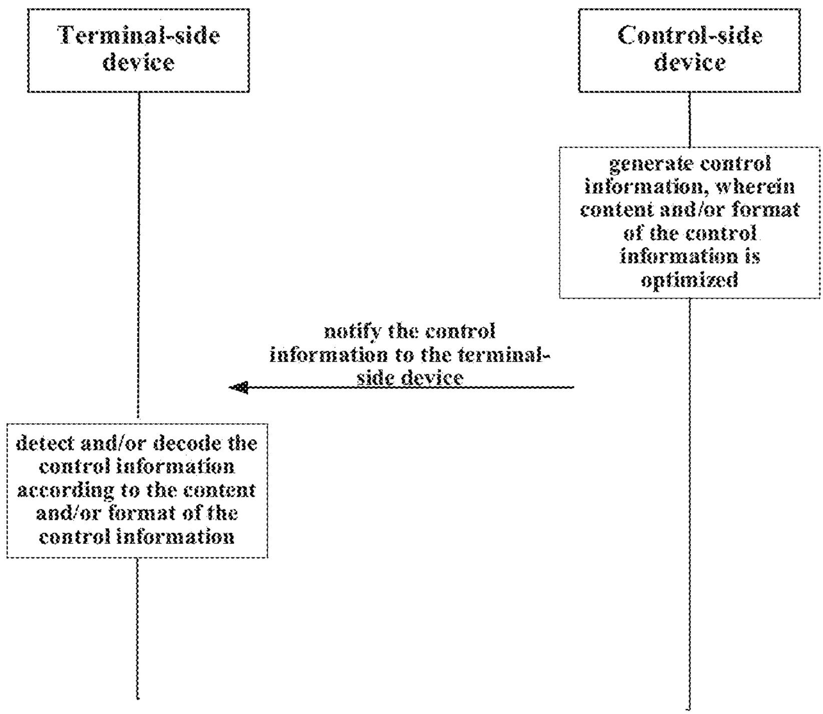
FIG. 2A shows a flow chart of wireless communication between a terminal-side device and a control-side device according to an embodiment of the present disclosure.
Figure 2B:
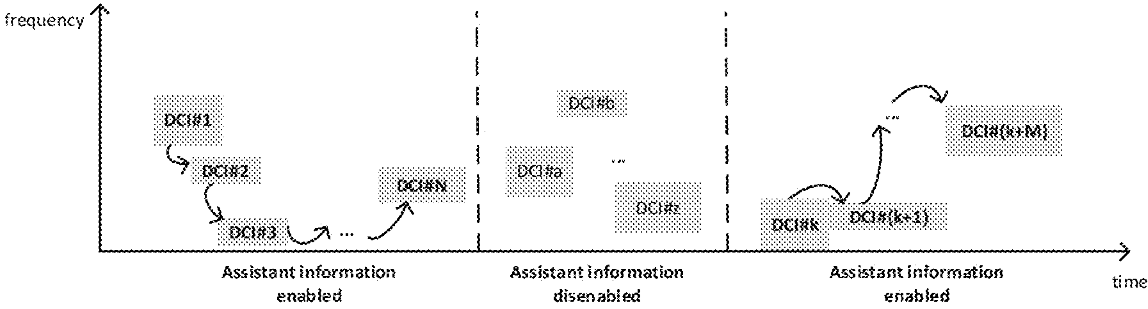
FIG. 2B shows a time domain diagram of wireless communication.

The implementation of wireless communication between the control-side device and the terminal-side device in the wireless communication system according to an embodiment of the present disclosure will be described in detail below, where FIG. 2A shows a conceptual signaling diagram of the wireless communication process, and FIG. 2B shows an exemplary implementation of wireless communication in the time domain.

During wireless communication, for various application scenarios, purposes, or usages, associated control information (for example, DCI) may be sent from the control-side device to the terminal-side device. Here, the control information may be any appropriate control information. In particular, the control information involved in the wireless communication can comprise various types of control information for various usages or functions, such as control information for data scheduling, resource allocation, etc. (such control information may be referred to as scheduling control information), or control information for non-data scheduling, non-resource allocation, etc. in the communication process, such as various message notification information, instruction information, etc. in communication (such control information may be referred to as non-scheduling control information), and other various appropriate information, and so on.

According to embodiments of the present disclosure, content and/or format of the control information sent from the control side can be set optimally, in particular, the content and/or format of the control information sent from the control side can be set optimally for detection operation of subsequent control information after the control information, so that the times of detection of control information received after the control information whose content and/or format has been optimized can be reduced, thereby improving the system overhead. It should be noted that the optimization of control information according to the present disclosure can be applied to various types of control information, such as at least one or even all of the above-mentioned scheduling control information, non-scheduling control information, and other control information.

Then, the terminal-side device will detect the received control information, in order to acquire relevant information provided by the control information and perform corresponding communication operations. Specifically, in embodiments of the present disclosure, the terminal-side device may perform detection of subsequent control information based on the content and/or format of the control information optimized according to embodiments of the present disclosure. In particular, when there are multiple pieces of control information during the wireless communication, the detection of the subsequent control information can be performed based on the content and/or format set by the previous control information, thereby reducing the times of detection of subsequent control information to a certain extent, reducing system overhead and improving efficiency.

According to embodiments of the present disclosure, the optimized setting of control information may be performed in various appropriate ways. In some embodiments, optimization of the control information may be achieved by causing the control information to include assistant information, which may include information defining a configuration to be followed by the terminal-side device for detecting subsequent control information transmitted after the control information, especially information indicating reduction of the detection range when detecting subsequent control information. In this way, the terminal-side device can implement improved detection of subsequent control information based on the assistant information.

As shown in FIG. 2B, in a case where DCI #1, DCI #2, DCI #3, . . . , DCI #N, etc. are included in the wireless communication, when the assistant information is enabled, the assistant information in DCI #1 will be at least available for detection of the subsequent DCI #2, the assistant information in DCI #2 will be at least available for detection of the subsequent DCI #3, and so on, until the detection of DCI #N. In a case that the wireless communication includes DCI #a, DCI #b, . . . , DCI #k, etc., when the assistant information is disabled, each DCI will be detected separately and independently, and it will not be possible to achieve reduction of detection times to some extent based on the assistant information as described previously. It should be noted that the situation shown in FIG. 2B is only exemplary, and the assistant information can also have various other appropriate forms and application manners, which will be described in detail below.

According to embodiments of the present disclosure, the assistant information transmission and reception between the control-side device and the terminal-side device in the wireless communication system can occur at any appropriate operation stage during the wireless communication, for example, depending on the application scenario, application purpose, etc. of the wireless communication, corresponding control information can be transmitted and received. As an example, scheduling control information can be sent in an active duration and/or an inactive duration in a data communication cycle, for example, non-scheduling control information can be sent in stages involving message notification, prompts, etc., especially in wireless communication stages other than data scheduling, resource allocation, etc., corresponding non-scheduling control information (such as DCI) will be sent to the terminal side, and so on.

Figure 3A:
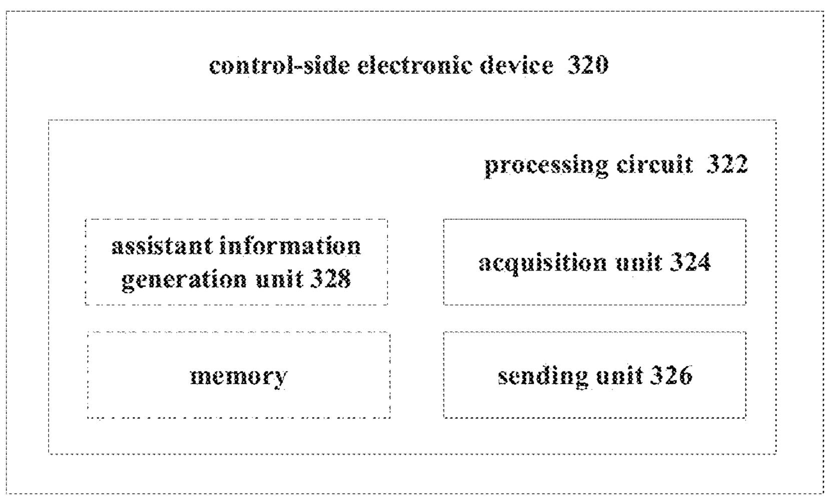
FIG. 3A shows a block diagram of a control-side electronic device in a wireless communication system according to an embodiment of the present disclosure.

Exemplary electronic devices of the wireless communication system according to embodiments of the present disclosure will be described below. FIG. 3A shows a control-side electronic device in the wireless communication system according to an embodiment of the present disclosure, the control-side electronic device is capable of communicating with the terminal-side electronic devices in the wireless communication system. The control-side electronic device 320 includes a processing circuit 322 configured to: acquire control information related to wireless communication between the control-side electronic device and the terminal-side electronic device, and send the acquired control information to the terminal-side electronic device in the wireless communication system, wherein the control information is set such that the number of detection operations performed by the terminal-side device on the control information in the wireless communication is reduced.

The control side may be a party in the wireless communication system that initiates downlink communication and/or receives uplink communication, and may be appropriately selected according to signal transmission direction in the wireless communication scenario, for example, when the downlink communication is performed from the base station to the user terminal, the control side may refer to the base station side, and when downlink communication is performed from another device to the base station in the wireless communication system, the control side may refer to the another device side. The electronic device on the control side may correspond to a device itself in the wireless communication system that communicates in the communication scenario (such as an access point, a base station, etc. in the communication system), or an electronic device used in conjunction with the device.

The terminal side may be the party in the wireless communication system that receives downlink communication and/or initiates uplink communication, and may be appropriately selected according to the signal transmission direction in the wireless communication scenario, for example, when downlink communication is performed from the base station to the user terminal, the terminal side may refer to the user terminal side, and when downlink communication is performed from another device to the base station in the wireless communication system, the terminal side may refer to the base station side. The electronic device on the terminal side may correspond to a device itself in the wireless communication system that communicates in the communication scenario (such as an access point, a user terminal, etc. in the communication system), or an electronic device used in conjunction with the device.

In some embodiments, the control information can be acquired by the control-side electronic device in various appropriate ways, for example, it can be generated by the control-side electronic device according to application scenarios, various purposes, usages, etc. in wireless communication, or can be generated by any other appropriate device in the communication system and provided to the control-side electronic device.

In some embodiments, the control information can be set such that detection/blind detection operations performed for subsequent control information transmitted after the control information in wireless communication can be reduced, in particular, by narrowing a search range for detection of subsequent control information, the times of detection of subsequent control information can be reduced, thereby reducing the power consumption overhead on the terminal side. It should be noted that the control information, including previous and subsequent control information, may be various appropriate control information, including but not limited to at least one of various types of scheduling control information, non-scheduling control information, etc., as described above.

According to some embodiments of the present disclosure, the control information may include assistant information, the assistant information may include information defining a configuration to be followed by the terminal-side device for detecting subsequent control information transmitted after the control information, such configuration can reduce the detection operations performed by the terminal-side device for subsequent control information, especially by narrowing the detection range.

In some embodiments, the configuration to be followed for detection as defined by the assistant information may refer to or indicate a search range for control information detection or blind detection, including but not limited to at least one of any available search space set, search space, or even a set comprised of available candidate resources, candidate channels, etc., and the like. Here, in particular, the configuration to be followed for detection defined by the assistant information may indicate that the detection range or search range for subsequent control information detection will be smaller than a detection range of a conventional blind detection operation, for example, usually a subset or part of a search range of the conventional blind detection operation, which can narrow the scope of control information detection, thereby reducing the times of blind detection and thus reducing system overhead. In some embodiments, the assistant information may include various information used to indicate the detection range for subsequent control information or various information related to the detection range, for example, may include but not limited to at least one of format information about control information, aggregation level (AL) indication information, search space indication information and the like.

In some embodiments, additionally, the configuration to be followed for detection as defined by the assistant information may also relate to or indicate applicable status of the detection range configuration for subsequent control information according to the present disclosure, and the like. In particular, the assistant information may also include, for example, information indicating how many pieces of subsequent control information the detection range configuration is applicable to, and such information may be called applicable status information. It should be noted that the applicable status information is optional, it can be set explicitly, or adopt default settings if not set.

In some embodiments, additionally or alternatively, the configuration to be followed for detection as defined by the assistant information may also relate to or indicate enable status of the control information-related settings according to the present disclosure, and in particular may relate to or indicate whether the detection range configuration for the subsequent control information, the applicable status of the configuration (if any), etc., according to the present disclosure are enabled/effective, it may be called enable indication information.

It should be noted that the above information related to the enable and/or applicable conditions may not be included in the assistant information, and may be set in other appropriate ways, for example, may be set implicitly or explicitly by RRC, MAC or any other appropriate signaling.

The assistant information according to embodiments of the present disclosure will be described in detail below.

According to an embodiment of the present disclosure, the assistant information may include format information about control information, which indicates a format configuration relationship between the control information and subsequent control information transmitted after the control information in wireless communication, in particular, whether the format configuration of the subsequent control information is the same as that of the previous control information, if so, the detection of subsequent control information can be performed within a search range or detection range indicated by the control information format information of the previous control information, and if not, the detection of subsequent control information can be performed within other search ranges or detection ranges. In this way, the detection range of subsequent control information will be smaller than the detection range of conventional control information (for example, the blind detection range including all search space sets), thereby reducing the detection times. As an example, usually DCI blind detection needs to search one by one in a full search space X (e.g., comprising all candidate PDCCHs), until a correct PDCCH position can be found, while by means of configuration of the format information about control information in the assistant information, X can be divided into X1 and X2, X1 is a search space composed of PDCCHs with the same format configuration as the previous DCI, X2 is a search space composed of PDCCHs with different format configuration from the previous DCI. By means of settings of the format information about control information in the assistant information, for a subsequent DCI, it is possible to choose to perform blind detection in X1 or X2, instead of blind detection in the whole X, thus reducing the times of blind detection and thus saving energy.

In some embodiments, the format configuration may include at least one of a control information format, a control information format set, a control information type format set, etc., so that the format information about control information may indicate whether at least one of the control information format, a control information format set, a control information type format set, etc., of the subsequent control information is the same as the relevant content of the previous control information.

In particular, in the wireless communication, appropriate DCI, including appropriate format set, format, type, etc., can be applied for various scenarios, purposes, usages, functions, and the like. As an example, in a wireless communication system, control information (DCI) is set in various appropriate formats, for example, it may have a DCI format set such as DCI 0_x, DCI 1_x, DCI 2_x, and each format set contains several DCI formats, such as DCI 0_0 to DCI 0_2, DCI 1_0 to DCI 1_2, DCI 2_0 to DCI 2_6, etc., and generally each DCI format or DCI format set may have a corresponding detection range. It should be noted that the above control information format sets are only exemplary, and the control information can also be set as an appropriate format set in other appropriate ways. As an example, it can be divided into predetermined format sets according to requirements. For example, DCI 0_0, DCI 1_0, and DCI 2_0 are grouped into one format set, while all other formats form a second format set, or are further divided into multiple format sets.

In particular, the control information (DCI) format may also be related to the type of DCI, for example, DCI may be divided into scheduling DCI and other DCI, and accordingly different types of DCI may have corresponding detection ranges (e.g, PDCCH candidates). It should be noted that the DCI types/classifications here are only exemplary, DCI in the wireless communication can also have other appropriate classification methods, such as being appropriately classified depending on application scenarios, purposes, usages, etc., which will not be described in detail here. In this way, DCI format types or classifications can also be considered to be format sets divided according to types, etc., in a sense.

Therefore, subsequent control information can be detected based on the format configuration provided in the format information. As an example, when the format of the previous control information is DCI 1_0, if the format information about control information indicates the same format, the detection range for the subsequent control information will be only a detection range corresponding to DCI 1_0, such as candidate PDCCHs, channels, resources, etc., otherwise it will be a detection range in the search space other than the detection range corresponding to DCI 1_0; on the other hand, if the same format set is indicated, the detection range for the subsequent control information will be only a detection range corresponding to DCI 1_x, otherwise it will be a detection range in the search space other than the detection range corresponding to DCI 1_x. As another example, in a case where the format information is divided into predefined format sets, if the same format set is indicated, the detection range for the subsequent control information will be only a detection range of a predefined format set including DCI 1_0, otherwise it will a detection range in the search space other than the predefined format set in which DCI 1_0 is contained.

On the other hand, if the same DCI type is indicated, the detection range for the subsequent control information will be only a detection range of the same type as the previous control information, otherwise it will be a detection range of a different type from the previous control information. As an example, the DCI format type set may be divided into two groups: scheduling DCI and other DCI (e.g, specifying a value of 0 to represent scheduling DCI and a value of 1 to represent other DCI). If the current DCI is scheduling DCI, but the DCI type is indicated to be the same, blind detection can be performed for subsequent control information in PDCCH candidates corresponding to all scheduling DCIs (currently there are six formats), if the format type is indicated to be different, then the blind detection will be performed in PDCCH candidates corresponding to other DCIs.

According to embodiments of the present disclosure, the format information about control information may take various appropriate forms. In one embodiment, the format information about control information may be indicated using 1-bit data. For example, "1" indicates the same and "0" indicates different. As an example, the previous DCI may include 1 bit of format information about control information, where the value 1 indicates that the subsequent DCI and the previous DCI are of the same format, or belong to the same format set, or belong to the same format type, and the bit data is an indication whether the DCI format, DCI format set, or DCI type may be set in advance, such as system default, or indicated by other information.

In another embodiment, the format information about control information may include sub-information corresponding to the above various format configurations respectively, for example, respectively including at least one of sub-information about control information format set, sub-information about control information format, and sub-information about control information type format set, and each sub-information is indicated using 1-bit data. For example, "1" indicates the same and "O" indicates different. As an example, the previous DCI may contain 3-bit format information about control information, where 1 bit indicates whether the DCI formats are the same, 1 bit indicates whether the DCI format sets are the same, and 1 bit indicates whether the DCI type format sets are the same. It should be noted that these three bits may not be set at the same time, for example, only one of the bit of the DCI format sub-information and the bit of the DCI format set sub-information can be set, set to 0 or 1.

As yet another example, the format information about control information may comprise appropriate fields or information, which may adopt different values to indicate whether it is the same DCI format, whether it is the same DCI format set, whether it is the same DCI type format set, for example, 6 different values may be used for indication, such as 1 indicating the same DCI format, 2 indicating the same DCI format set, 3 indicating the same DCI type format set, 4 indicating different DCI formats, 5 indicating different DCI format sets, and 6 indicating different DCI type format set.

It should be noted that the format information about control information according to the present disclosure can also adopt other appropriate settings, such as any other binary data, or other symbols, identifiers, etc., as long as different forms or values can be set to indicate different DCI format or format set or DCI type format set.

According to embodiments of the present disclosure, additionally or alternatively, the assistant information may include aggregation level (AL) indication information, which may indicate an aggregation level configuration related to detection of subsequent control information. In particular, compared with all available aggregation levels to be detected in a conventional blind detection operation, the aggregation level indication information proposed in the present disclosure will indicate fewer aggregation levels to be detected, which may, for example, be a sub-set of or a part of all available aggregation levels, so that detection operations for subsequent control information can be performed in fewer aggregation levels indicated by the aggregation level indication information, instead of having to be performed on all aggregation levels, thus reducing times of blind detection and saving energy.

In some embodiments, the aggregation level indication information may include information indicating whether an aggregation level for detection of subsequent control information is the same as an aggregation level for previous control information. As an example, the aggregation level indication information may take various suitable forms. In particular, 1-bit data may be used for indication. For example, "1" indicates the same and "0" indicates different. For example, 1 bit of the previous aggregation level indication information indicates that the subsequent control information and the previous control information are at the same aggregation level. Of course, any other binary data, or other symbols, identifiers, etc. can also be adopted, as long as different forms or values can be set to indicate different situations.

In some embodiments, the aggregation level indication information may indicate aggregation levels to be detected, wherein the number of aggregation levels to be detected is less than the number of all aggregation levels to be detected conventionally. As an example, there can be two design methods corresponding to different degrees of reduction of blind detection times. The first design method relates to 3-bit AL indication information, in which 000 sequentially increases to 100 to mean that only one type of AL is detected, corresponding to detection of candidate PDCCHs with AL=1, 2, 4, 8, and 16 respectively, 101 means detection of candidate PDCCHs with AL={1,2}, 110 means detection of candidate PDCCHs with AL={2,4,8}, and 111 means detection of candidate PDCCHs with AL={8,16}. Both the bit value and the indicated AL or AL combination can be designed with other values and correspondence relationships. The second design method relates to 1-bit AL indication information, where 0 means only detecting candidate PDCCHs with AL={1,2}, 1 means only detecting candidate PDCCHs with AL={4,8,16} or vice versa, or there may exist other specific indications, for example, 0 means only detecting AL={1,2,4}, 1 means only detecting AL={8,16}. It can be seen from the above that the number of aggregation levels for detection indicated by the aggregation level indication information is significantly smaller than the number of aggregation levels for detection in the usual blind detection, thereby reducing the numbers of blind detection operations.

According to an embodiment of the present disclosure, additionally or alternatively, the assistant information may include search space (SS) indication information, which indicates a search space configuration related to detection of subsequent control information. In particular, compared with the entire set of search spaces to be detected in the conventional blind detection operation, the search space indication information proposed in the present disclosure will indicate fewer search spaces to be detected, so that detection operations for subsequent control information can be performed in less search spaces instead of all search space, which reduces the times of blind detection and thereby saves energy.

In some embodiments, the search space indication information may include information indicating whether a search space for detection of subsequent control information is the same as a search space for previous control information. As an example, the search space indication information may take various suitable forms. Preferably, 1-bit data can be used for indication. For example, "1" indicates the same and "0" indicates different. For example, 1 bit of previous search space indication information indicates that the same search space is used for the subsequent control information and the previous control information. Of course, any other binary data, or other symbols, identifiers, etc. can also be adopted, as long as different forms or values can be set to indicate different situations.

As an example, usually DCI blind detection needs to search in a full search space set, the full search space set can usually include multiple search spaces (SS), each SS has a corresponding SSid, and each SS can have multiple PDCCHs. If the search space indication information indicates the same, for the subsequent DCI, blind detection will be performed in the search space from which the current DCI is searched (that is, the search space with the same SSid); if it is indicated to be different, the blind detection will be performed in other SSs.

In other embodiments, the search space indication information may indicate search spaces to be detected, where the number of search spaces to be detected is less than the number of all search spaces to be conventionally detected. In particular, it can be indicated that one or more search spaces included in the conventional full search space set can be used for detection. For example, if the search space set contains up to 39 search spaces, that is, the maximum SS id is 39, so 6 bits can be used to indicate a certain SS id for blind detection, or a joint encoding scheme can be used to indicate combination of two or more SS IDs for blind detection.

According to embodiments of the present disclosure, various information included in the above-mentioned assistant information can be used in combination in various appropriate ways. According to embodiments of the present disclosure, the assistant information may include at least two of or even all of the format information about control information, aggregation level indication information, search space indication information, or the like, so that blind detection of subsequent DCI will be performed on candidate PDCCHs that comply with at least two of or even all of the DCI format information, AL indication information, search space indication information, or the like, which can further reduce the complexity of blind detection.

According to embodiments of the present disclosure, the assistant information of the control information can also be used in combination with other information in the DCI, for example, it can be combined with SSSG indication information in the DCI for switching a search space set group (SSSG), so that in the search space set group to be switched to indicated in SSSG indication information, detection of DCI is further performed in accordance with the configuration of assistant information. In this way, detection operation for subsequent control information can be performed within a smaller search range in the switched search space set group, reducing the times of blind detection and thereby achieving system energy saving.

According to an embodiment of the present disclosure, the optimized configuration of the control information may further include applicable status information, which indicates the status of subsequent control information to which the optimization of the control information, especially the optimized configuration of the assistant information, according to the embodiment of the present disclosure is applicable.

In some embodiments, the applicable status information indicates that the indication of detection range reduction given in the assistant information is applicable to a specific amount of subsequent control information. In particular, it may indicate that the control information optimization of the present disclosure is applicable to detection/decoding of one control information immediately next to the current control information; or indicate detection/decoding of several control information following the current control information within a specific time period, such as detection/decoding of several control information following the current control information within a DRX cycle, or even in the active duration of the DRX cycle.

Depending on the definition of the applicable status information, the applicable status information may be set in various appropriate forms. In some embodiments, the applicable status information may be a specific value to indicate the number of applicable subsequent scheduling control information, for example, it may be indicated by an absolute value or an index value. In other embodiments, the applicable status information may be indicated using 1-bit data, such as 0 indicating that it is applicable to one DCI, especially the immediate next DCI, and 1 indicating that it is applicable to all subsequent DCIs. Therefore, the assistant information setting in one DCI can be used for detection of a specified number of or even all of subsequent DCIs, while the intermediate DCI does not require assistant information setting. In this way, when multiple DCIs are transmitted during wireless communication, by only setting assistant information in one or some DCIs, the times of detection of almost all DCIs (for example, other DCIs after the first DCI) can still be reduced.

It should be noted that if an intermediate DCI also has the assistant information setting, the detection of subsequent DCIs may also rely on the nearest DCI that has the assistant information setting. For example, when there are N DCIs, and the first DCI has the assistant information setting and its applicable status information can apply to all subsequent DCIs, the detection of the second to Nth DCIs will be based on the assistant information setting of the first DCI. And if the assistant information setting is also performed in the Mth DCI among the second to Nth DCI, the detection of the M+1th to Nth DCIs can be performed based on the assistant information configuration of the Mth DCI.

It should be noted that the above applicable status information can be set in various appropriate ways. In some embodiments, the applicable status information may be included in the assistant information, or in the control information but outside of the assistant information. In other embodiments, the above applicable status information may not even be included in the control information, but can be set or indicated in the communication system in other ways, such as indicated by a specific control device in the wireless communication system, or explicitly or implicitly indicated by a specific signaling. As an example, it may be implicitly or explicitly set by RRC, MAC or any other suitable signaling. As another example, it can also be specified by default in the wireless system, for example, when the enable indication is allowed to take effect, the assistant information optimization configuration of each DCI will be applied to the immediate next control information by default. It should be pointed out that in this case, there is no need to set or add the applicable status information, that is to say, even if there is no applicable status bit, when the enable indication is allowed to take effect, the assistant information optimization configuration according to the present disclosure can still be applied to the immediate next DCI by default.

According to an embodiment of the present disclosure, additionally, the optimized configuration of the scheduling control information may further include enable indication information, which indicates whether the optimized configuration of the control information according to the embodiment of the present disclosure, especially the configuration, applicable status information, etc. involved in or indicating the subsequent control information detection range in the control information according to the embodiment of the present disclosure, takes effect. Specifically, the enable indication information may indicate whether the setting of the assistant information according to the embodiment of the present disclosure, especially the setting of at least one of the format information about control information, aggregation level information, search space information, etc. in the assistant information, takes effect. Furthermore, if the applicable status information is explicitly specified, the enable indication information may also indicate whether the setting of the applicable status information takes effect.

In some embodiments, the enable indication information may take various suitable forms. Preferably, 1-bit data is used for indication. For example, "1" indicates effective, that is, the control information optimization configuration according to the present disclosure will take effect, so that subsequent control information can be detected based on the optimized configuration in the previous control information, especially the aforementioned settings of various information of the assistant information; and the "0" indication non-effective, that is, the function of the control information will remain unchanged, that is to say, the detection of subsequent control information will be performed in a conventional manner, for example, blind detection will be performed in the conventional search space without using the control information optimization configuration. It should be noted that this 1-bit data is only exemplary, of course, any other binary data, or other symbols, identifiers, etc. can also be used, as long as different forms or values can be set to indicate different conditions.

According to an embodiment of the present disclosure, the enable indication information may be set in association with the assistant information. In some embodiments, the enable indication information may be set for the assistant information as a whole, in particular, the enable indication information may be set to indicate whether the configuration of the assistant information as a whole is effective. As an example, if the assistant information includes two or more pieces of the above various information, by setting the enable indication information, the settings of these two or more pieces of information can be effective or non-effective at the same time. In other embodiments, alternatively, the enable indication information can be set separately for each of the various information contained in the assistant information, so as to indicate whether the configuration of the corresponding information contained in the assistant information is effective. As an example, the enable indication information may respectively have sub-enable information corresponding to each of format information about control information, aggregation level information, search space information, search space group information, applicable status information, etc., and the setting of each sub-enable information can make the corresponding information effective or non-effective.

According to embodiments of the present disclosure, the enable indication information may be set appropriately. In some embodiments, the enable indication information may be included in assistant information of the control information, or may be included in the control information but outside of the assistant information. As an example, when there are multiple pieces of control information during the wireless communication, corresponding enable indication information can be set for at least some or even all of the multiple pieces of control information, so that for each control information, it is possible to perform search space optimization according to the optimized configuration of the assistant information, or the search can be performed in a conventional manner.

According to embodiments of the present disclosure, optionally, the enable indication information may not even be included in the control information, but may be set or indicated in the communication system in other ways. In some embodiments, the message indicating whether the optimized configuration of the assistant information of the control information is effective can be indicated by a specific control device in the wireless communication system, or can be explicitly or implicitly indicated by specific signaling. As an example, it may be implicitly or explicitly set by RRC, MAC or any other suitable signaling. As another example, it may also be specified by default in the wireless system, such as the assistant information configuration of the control information is enabled to be effective by default.

In particular, in a case where such enable indication information configuration is not included in the control information but is set in other ways, the setting of the enable indication information may be applied to all control information, for example, when the enable indication information is set to 1, if any control information in the wireless communication process is configured with assistant information, the setting of the assistant information will take effect, so that detection or blind detection can be performed based on the setting of the assistant information; on the contrary, when the enable indication information is set to 0, all assistant information settings of the control information will be non-effective, and the detection will be performed according to the conventional manner.

In some embodiments, alternatively, the setting of the enable indication information may be applied to specific control information in the wireless communication process, such as scheduling DCI, non-scheduling DCI, etc., thereby indicating whether the assistant information setting of such specific control information is effective, and if effective, the control information after the specific control information will be detected based on the setting of the assistant information.

According to embodiments of the present disclosure, the above-mentioned optimized configuration of control information, especially the setting of assistant information, etc., can be applied to any control information in the wireless communication process. In particular, when multiple pieces of control information are included in the wireless communication process, the optimized configuration of the control information can be applied to one or more pieces of the control information, thereby achieving reduction of blind detection overhead in the wireless communication process to some degree. Moreover, in a case where the assistant information is applied to multiple pieces of control information in the wireless communication process, the optimized configuration of control information in each control information may be the same or different. As an example, the information type contained in the optimized configuration of each control information may be the same or different, or the set value of the corresponding information type included in the assistant information in each control information may be the same or different, and so on. It should be noted that the above description is only exemplary, the setting of assistant information of each control information in the wireless communication process can be accordingly set according to the specific application scenarios, purposes, usages, etc., and can be set independently from the assistant information in other control information, of course, it can also be set in association, which will not be described in detail here.

Figure 3B:
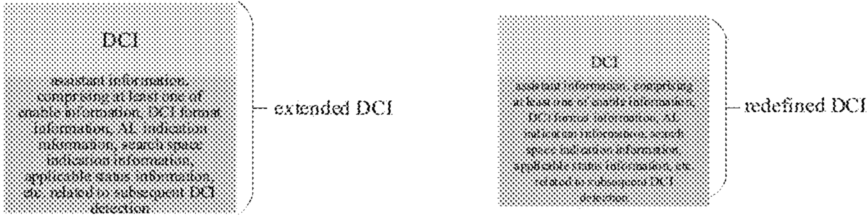
FIG. 3B shows a schematic diagram of control information configuration according to an embodiment of the present disclosure.

According to embodiments of the present disclosure, the assistant information may be implemented or generated in various ways, and particularly, may be generated by extending or reinterpreting the control information, as shown in FIG. 3B. In some embodiments, the processing circuit is further configured to extend reference control information or reinterpret a specific field or bit field in the reference control information to generate the assistant information. The reference control information here may include conventional control information, such as various control information commonly used in current wireless communications.

In some embodiments, the assistant information may be generated by extending control information, which may refer to adding, on the basis of conventional control information (e.g., DCI), additional information indicating detection configuration for subsequent DCI as assistant information. In particular, at least one of the above-mentioned format information, aggregation level indication information, search space information, applicable status information, enable indication information, etc. in the assistant information can be added respectively.

In some embodiments, the assistant information can be implemented by adding corresponding bits, bytes, fields, sign bits, etc. in the control information. For example, bits corresponding to at least one of the format information, aggregation level indication information, search space information, applicable status information, enable indication information, etc. can be added respectively, and the configuration of the assistant information can be implemented by setting values. As an example, in a case of adding the format information and the enable indication information, two new bits can be added, one bit indicates that the next DCI has a format which is the same as or different from the current DCI (for example, the value may be 0, indicating that the next DCI and the current DCI have the different formats, and the value may be 1, indicating that the next DCI and the current DCI have the same DCI format); the other bit indicates whether the DCI format setting is effective (for example, the bit value may be 0, indicating that the DCI maintains the existing DCI function, without adding an additional function indicating whether the next DCI has the same format as the current DCI; the bit value may be 1, indicating the function is enabled). no additional function is added to indicate whether the next DCI has the same format as this DCI; if the value is 1, it means that the function takes effect). For other information, corresponding bits or fields can be added, and their configurations can be indicated by setting corresponding values, as mentioned above, which will not be described in detail here.

In other embodiments, the control information may be extended to only add bits, bytes, fields, etc. respectively corresponding to at least one of the foregoing format information, aggregation level indication information, search space information, etc., and the enable indication information and/or applicable status information may be otherwise set by the system, as described above.

In some embodiments, assistant information may be generated by reinterpreting control information, which may mean reinterpreting and/or re-setting certain specific information bits, bytes, fields, etc. in conventional control information (e.g., DCI) for indicating detection configuration for subsequent DCI, as assistant information.

In some embodiments, the specific information bits may be reserved information bits in the current control information, so that a specific number of reserved information bits may be used and be set to specific values, so as to realize the function of assistant information. For example, two reserved bits can be used (one indicates whether it is enabled and the other indicates whether the formats are the same); or, for example, one reserved bit may be used (to indicate whether the formats in the previous and subsequent control information are the same or different), and the enable indication will be set in other ways (such as RRC, MAC CE or other ways), as mentioned above, which will not be described in detail here.

In some embodiments, the specific information bits may be information bits in the current control information that have already been used, so that a specific number of information bits that have already been used can be set to additional values for indication. The number and values of the information bits used may be as described above for the reserved information bits, and will not be described in detail here.

It can be seen from the above that according to embodiments of the present disclosure, the control information in the wireless communication system can be optimally configured, especially by setting assistant information in the control information, and the assistant information can be set such that a candidate range for detection of subsequent control information is smaller than a conventional search range of control information, which reduces the times of detection/blind detection to be performed when receiving and detecting subsequent control information, thereby reducing communication overhead and achieving system energy saving.

The above description is mainly directed to the design of DCI format in a case of downlink communication from the base station to the user terminal. It should be noted that the above description can also be applied to a case of downlink communication from other devices in the wireless communication system to the base station. In addition, the above description can also be applied to the design of DCI format in a case of uplink communication from the user terminal to the base station, as well as other downlink communication and uplink communication cases in the wireless communication system.

In the structural example of the above device, the processing circuit may be in the form of a general-purpose processor, or may be a dedicated processing circuit, such as an ASIC. For example, the processing circuit can be configured by a circuit (hardware) or a central processing device such as a central processing unit (CPU). In addition, the processing circuit may carry a program (software) for operating the circuit (hardware) or the central processing device. The program can be stored in a memory (such as arranged in the memory) or an external storage medium connected from the outside, and downloaded via a network (such as the Internet).

According to one embodiment, the processing circuit 322 may include various units for correspondingly implementing the above operations, and may particularly include an acquisition unit 324 configured to acquire control information related to wireless communication between the control-side electronic device and the terminal-side electronic device, and a sending unit 326 configured to send the acquired control information to the terminal-side electronic device in the wireless communication system, wherein the control information is set such that the number of detection operations performed by the terminal-side device on the control information in the wireless communication is reduced.

Additionally, the processing circuit 322 may further include an assistant information generation unit 328 configured to extend reference non-scheduling control information or reinterpret specific fields or bit fields in the reference non-scheduling control information to generate assistant information.

In particular, each unit of the processing circuit 322 may operate as described above, and may be implemented in various appropriate ways. It should be noted that each of the above units only belongs to a logical module classified according to the specific function it implements, instead of limiting its specific implementation manner, for example, it can be implemented in software, hardware, or a combination of software and hardware. In an actual implementation, the foregoing units may be implemented as separate physical entities, or may be implemented by a single entity (for example, a processor (CPU or DSP, etc.), an integrated circuit, etc.). Note that although each unit is shown as a separate unit in FIG. 3A, one or more of these units may be combined into one unit or split into multiple units. Furthermore, that the foregoing units are indicated by dotted lines in the figure indicates that the foregoing units may not actually exist, and the operation/functionality they achieve can be implemented by the processing circuit itself.

It should be understood that FIG. 3A is only a schematic structural configuration of the control-side electronic device in the wireless communication system, and alternatively, the control-side electronic device 320 may also include other components not shown, such as a memory, a radio frequency link, a baseband processing unit, a network interface, a controller, and the like. The processing circuit may be associated with a memory and/or an antenna. For example, the processing circuit can be directly or indirectly connected to the memory (for example, other components may be interposed therebetween) to access data. The memory can store various information (e.g., vehicle internal state information and its analysis result, etc.) acquired and generated by the processing circuit 322, programs and data for the operation of the control-side electronic device, data to be transmitted by the control-side electronic device, etc. The memory can also be located in the purchase-side electronic device but outside the processing circuit, or even outside the purchase-side electronic device. The memory can be volatile memory and/or nonvolatile memory. For example, the memory may include, but not limited to, random access memory (RAM), dynamic random-access memory (DRAM), static random access memory (SRAM), read only memory (ROM) and flash memory.

For example, the processing circuit can be directly or indirectly connected to the antenna to send information and receive requests/instructions via the antenna. For example, as an example, the antenna may be an omni-directional antenna and/or a directional antenna, which may be implemented in various ways, for example, communication components such as an antenna array (such as both omni-directional antenna and directional antenna, or a single antenna array capable of realizing the functions of both omni-directional antenna and directional antenna) and/or a radio frequency link, etc., which will not be described in detail here. As an example, the antenna may also be included in the processing circuit or external to the processing circuit. It can even be coupled/attached to the electronic device 320, instead of being included in the electronic device 320.

Figure 3C:
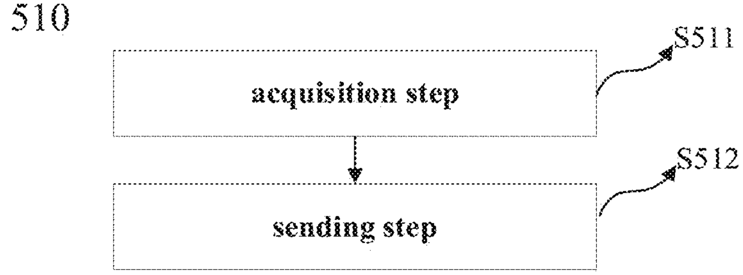
FIG. 3C shows a flowchart of a method for a control side in a wireless communication system according to an embodiment of the present disclosure.

FIG. 3C shows a flowchart of a method 510 for a control side in a wireless communication system according to an embodiment of the present disclosure.

In step S511 (referred to as acquisition step), acquire control information related to wireless communication between the control-side electronic device and the terminal-side electronic device; and In step S512 (referred to as sending step), send the acquired control information to the terminal-side electronic device in the wireless communication system, wherein the control information is set such that the number of detection operations performed by the terminal-side device on the control information in the wireless communication is reduced.

In addition, the method may also include corresponding steps for implementing the operations performed by the control-side electronic device 320 as described above, which may be particularly performed by corresponding units of the control-side electronic device 320 according to the present disclosure as described above.

Figure 3D:
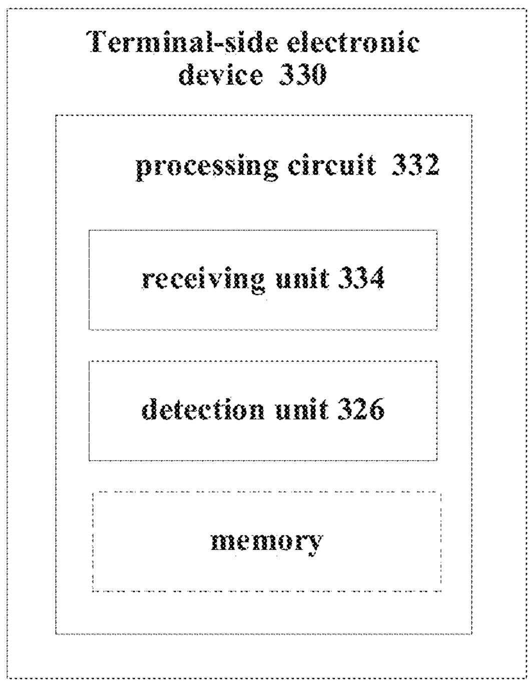
FIG. 3D shows a block diagram of a terminal-side electronic device in a wireless communication system according to an embodiment of the present disclosure.

The implementation of the terminal side in the wireless communication system according to the embodiment of the present disclosure, especially the implementation of the terminal-side electronic device and the method for the terminal side, will be described below. FIG. 3D shows a terminal-side electronic device in a wireless communication system according to an embodiment of the present disclosure, the terminal-side electronic device 330 is capable of communicating with a control-side electronic device in the wireless communication system and includes a processing circuit 332, which is configured to: receive control information from the control-side electronic device; and detect the control information based on previous control information from the control-side electronic device in wireless communication between the control-side electronic device and the terminal-side electronic device, wherein the previous control information is set such that the number of detection operations performed by the terminal-side electronic device on the control information is reduced. Specifically, the received control information can be detected based on the configuration for control information detection in the previous control information, especially based on the setting of the assistant information in the control information as mentioned above, so that in wireless communication, the times of blind detection can be reduced and the overhead can be lowered.

In some embodiments, the previous control information may include assistant information, which may comprise information indicating that when the control information is to be detected in wireless communication, a detection range is reduced, and the processing circuit can be further configured to detect the control information based on the reduced detection range indicated in the assistant information.

In some embodiments, the previous control information may comprise enable indication information, which indicates whether the indication of detection range reduction given by the assistant information takes effect, and the processing circuit can be configured to, in a case where the enable indication information indicates that the indication of detection range reduction given in the assistant information takes effect, detect the control information based on the reduced detection range indicated in the assistant information.

In some embodiments, the previous control information may further comprise applicable status information, which indicates that the indication of detection range reduction given in the assistant information is applicable to a specific amount of subsequent control information, and the processing circuit can be configured to, in a case where the control information belongs to the specific amount of subsequent control information, detect the control information based on the reduced detection range indicated in the assistant information.

It should be noted that the above operations of the processing circuit are also applicable to the detection processing of subsequent control information, that is, the processing circuit can perform detection on subsequent control information according to the configuration of the current control information, thereby reducing the times of detection. In particular, after the received control information has been detected based on the previous control information, the detected control information may serve as the current control information, and when the current control information also contains assistant information, detection of subsequently received control information can be performed based on configuration of the assistant information in the current control information, which will not be described in detail here.

Further, after the control information is detected, the processing circuit may further perform operations corresponding to or required by the control information, such as data scheduling, data transmission, and so on.

According to embodiments of the present disclosure, the terminal-side electronic device 330 and the processing circuit 332 may be implemented in any suitable form. In particular, in one embodiment, the processing circuit 332 may include a receiving unit 334 configured to receive control information from the control-side electronic device; and a detection unit 336 configured to detect the control information based on previous control information from the control-side electronic device in wireless communication between the control-side electronic device and the terminal-side electronic device, wherein the previous control information is set such that the number of detection operations performed by the terminal-side electronic device on the control information can be reduced. The processing circuitry may also optionally include memory. It should be noted that the terminal-side electronic device 330 and the processing circuit 332 can also be implemented in various appropriate ways and have various appropriate structures, similar to the electronic device 320 and the processing circuit 322 as described above, and will not be detailed here.

Figure 3E:
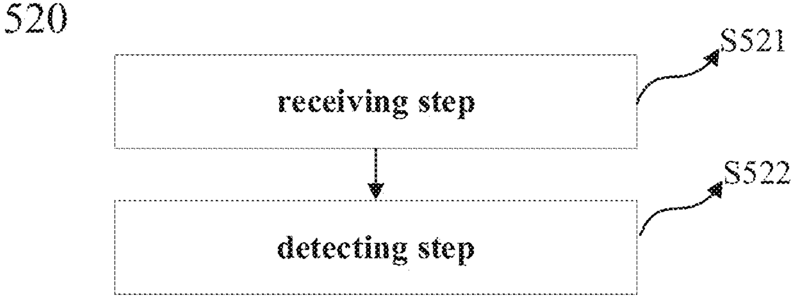
FIG. 3E shows a flowchart of a method for a terminal side in the wireless communication system according to an embodiment of the present disclosure.

FIG. 3E shows a flowchart of a method for a control-side in a wireless communication system according to an embodiment of the present disclosure, in the method 520, in step S521 (referred to as receiving step), receive control information from the control-side electronic device; and in step S522 (referred to as detecting step), detect the control information based on previous control information from the control-side electronic device in wireless communication between the control-side electronic device and the terminal-side electronic device, wherein the previous control information is set such that the number of detection operations performed by the terminal-side electronic device on the control information can be reduced.

In addition, the method may also include corresponding steps for implementing the operations performed by the terminal-side electronic device 330 as described above, which may particularly be performed by corresponding units of the terminal-side electronic device 330 according to the present disclosure as described above.

An exemplary implementation of control information optimization according to an embodiment of the present disclosure will be described below, and in particular, an optimized configuration for non-scheduling control information will be described.

In some exemplary implementations, the control information optimization setting according to embodiments of the present disclosure as described above may be applied to non-scheduling control information (e.g., DCI) transmitted between the control-side device and the terminal-side device in wireless communication, such as control information that is not used for data transmission or does not involve resource allocation and other operations, especially its related content or the format involved can be optimized, which can effectively reduce the times of detection (blind detection) of control information in the communication process, and can effectively reduce the work overhead at the service terminal. Here, the detection of control information may include detection of any type of control information following non-scheduling control information.

In particular, non-scheduling DCI in wireless communication may relate to various usages, purposes, etc. in wireless communication, for example, it may be used to indicate system information changes, or the like. The non-scheduling DCI does not have PDSCH indication information (time-frequency resource indication, MCS indication), that is, does not relate to data scheduling. Non-scheduling DCI can be in various appropriate formats. For example, non-scheduling DCI can include, but not limited to, all non-scheduling DCI formats that have been enumerated in the protocol TS38.212, such as that defined in the DCI format section in Section 7.3.1 of TS38.212. such as DCI 2_x. Among them, for example, DCI 2_0 to DCI 2_6 are all non-scheduling DCIs and correspond to different usages respectively. For example, DCI 2_0 is used to inform notification gap format, COT duration, available RB set, and search space set group (SSSG) switching, etc.; DCI 2_1 is used for resource occupancy indication; DCI 2_6 is used for energy saving related indication, such as notify energy saving information outside of DRX activation duration of one or more UEs. Non-scheduling DCI can be generated by the network/base station itself.

According to embodiments of the present disclosure, optimization for non-scheduling DCI can be performed as described above, for example, by setting the above-mentioned assistant information, especially at least one of the above-mentioned format information, aggregation level indication information, search space information, applicable status information, enable indication information, etc. for non-scheduling DCI, the setting of such information can be implemented as described above, and will not be described in detail here. In this way, the search range, candidate PDCCHs, etc. for detection of subsequent control information can be optimized, especially reduced, thereby effectively reducing the times of detection (blind detection) of control information in the communication process and effectively reducing the work overhead at the service terminal.

An exemplary implementation of control information optimization according to an embodiment of the present disclosure will be described below, and in particular, an optimized configuration for scheduling control information will be described.

In other implementations, the control information optimization setting according to embodiments of the present disclosure as described above may be applied to scheduling control information (e.g., DCI) transmitted between the control-side device and the terminal-side device in wireless communication, especially scheduling control information for dynamic data scheduling, which can effectively reduce the times of detection of control information during the communication process, especially the times of detection of subsequent control information, and thereby effectively reduce the power overhead at the service terminal. The control information optimization here can be performed as described above and will not be described in detail here.

In still other implementations, the present disclosure proposes to combine a specific wireless data transmission mode with dynamic data scheduling, in particular, utilize preset resources (which can be called "static resources") to transmit data in the specific wireless data transmission mode, and utilize the dynamic data scheduling to transmit data that is not transmitted by utilizing the preset resources, so that it can effectively deal with traffic data with non-fixed sizes and optimize transmission data matching. In particular, the combination of CG-PUSCH/SPS-PDSCH and dynamic data scheduling can be implemented, and the problem of mismatch between non-fixed data size and CG/SPS transmission can be effectively solved.

In still other implementations, the present disclosure proposes to combine a specific wireless data transmission mode with dynamic data scheduling, in which an optimized scheduling control information format is further utilized for dynamic data scheduling, which can optimize transmission data matching while effectively reducing power consumption overhead in data transmission to achieve good energy saving. In particular, the combination of CG-PUSCH/SPS-PDSCH and dynamic data scheduling can be implemented, and the optimized DCI format can be used in dynamic data scheduling, which can effectively solve the problem of mismatch between non-fixed data size and CG/SPS transmission, and also effectively reduce the power overhead at the service terminal.

Figure 4A:
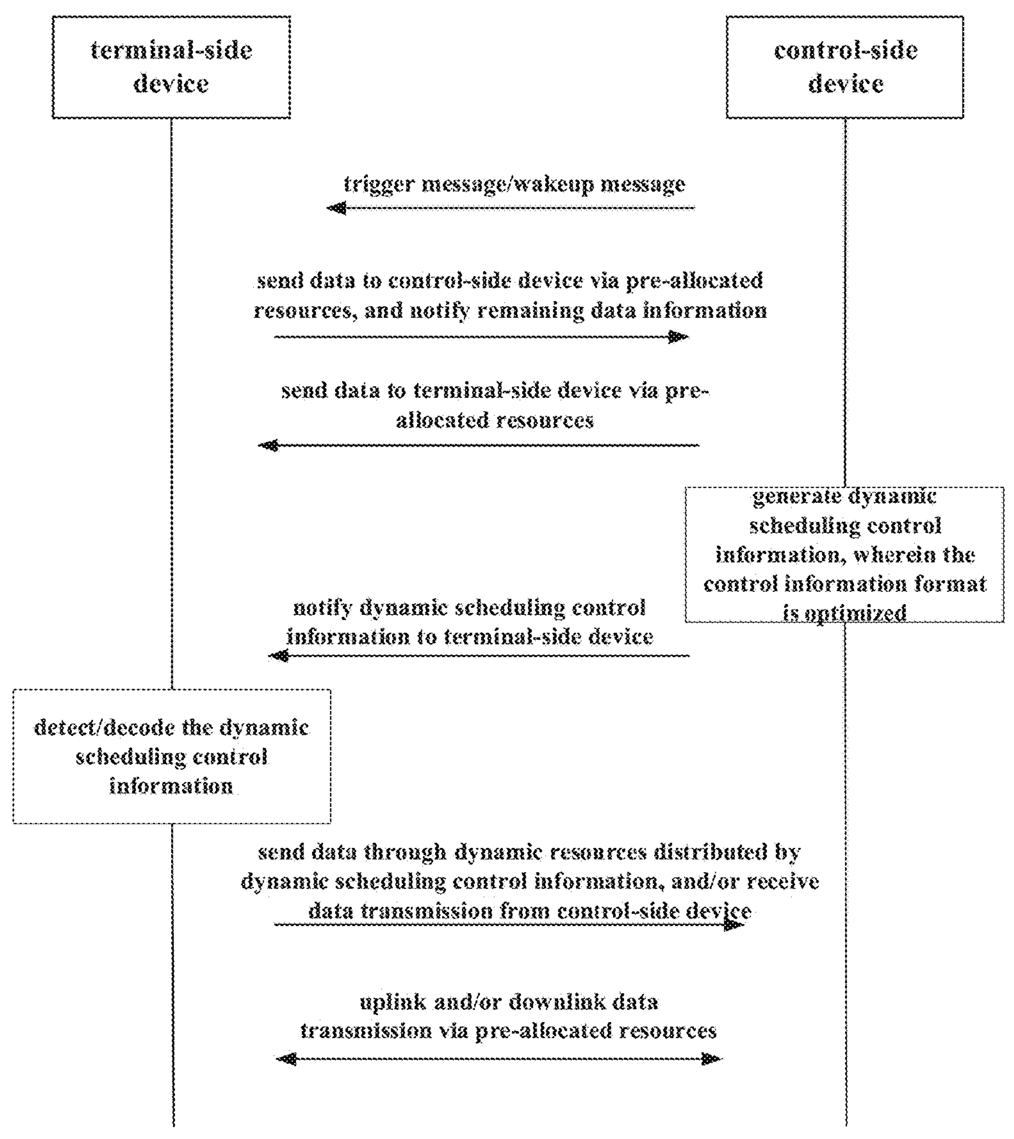
FIG. 4A shows a flow chart of wireless communication between a terminal-side device and a control-side device according to another embodiment of the present disclosure.
Figure 4B:
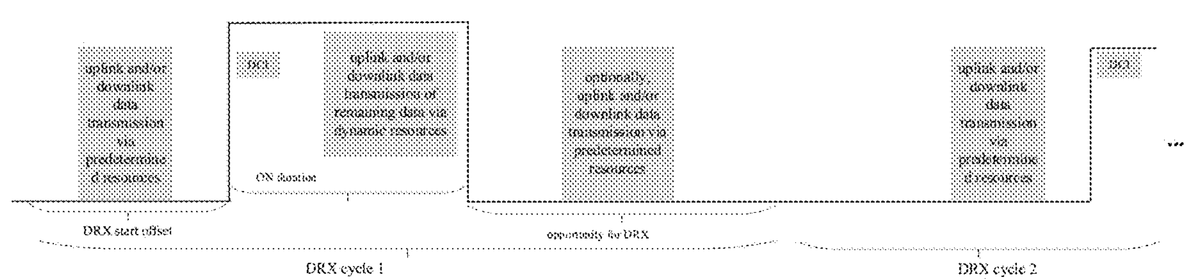
FIG. 4B shows a time domain diagram of wireless communication.

An exemplary implementation of wireless communication between a control-side device and a terminal-side device in a wireless communication system by using dynamically allocated resources according to an embodiment of the present disclosure will be described below with reference to FIGS. 4A and 4B, where FIG. 4A shows a conceptual signaling diagram of a wireless communication process, FIG. 4B shows an exemplary implementation of wireless communication in the time domain.

Embodiments of the present disclosure may particularly involve that the data communication between the control-side device and the terminal-side device is a periodic service, and resources pre-allocated for the periodic service may be used for data transmission. In addition, data that may not be transmitted using the pre-allocated resources can be transmitted using dynamically allocated resources. Here, the control-side device may be a gNB, and/or the terminal-side device may be a user equipment (UE). The control-side device performs downlink communication to the terminal-side device, and the terminal-side device performs uplink communication to the control-side device.

Data communication between the control-side device and the terminal-side device can be performed in various appropriate modes. In particular, a DRX (Discontinuous Reception) mode is adopted. Specifically, in DRX communication, packet-based data flows are usually bursty. When there is no data transmission, power consumption can be reduced by turning off the UE's receiving circuit, thereby improving battery life. The basic mechanism of DRX is that the UE in the RRC_CONNECTED state configures a DRX cycle. The DRX cycle consists of "active duration (ON duration)" and "inactive duration (opportunity for DRX)". During the active duration, the UE monitors and receives downlink control information transmission, such as PDCCH, and thereby performs data transmission; while during the inactive duration, the UE does not receive data in the downlink channel to save power consumption. In this way, in the time domain, time can be divided into consecutive DRX cycles for communication.

At the beginning of starting communication, the control-side device sends trigger information/wakeup information to the terminal-side device in order to start data communication between the control-side device and the terminal-side device. The trigger information/wake-up information may be in various appropriate forms and sent in various appropriate ways, for example, via PDCCH, which will not be described in detail here.

The terminal-side device monitors the information and starts communication between the terminal-side device and the control-side device, including at least one of uplink communication and downlink communication. At least one of the uplink and downlink communications will utilize pre-allocated resources for data transmission. The pre-allocated resources may correspond to a specific data transmission mode, such as periodic data transmission and so on. In particular, the terminal-side device uses CG-PUSCH for uplink data transmission, and/or the control-side device uses SPS-PDSCH for downlink data transmission, where data carried on CG-PUSCH and SPS-PUSCH can be appropriately set, preferably set as that will be described in detail below. Prior to the active duration of DRX, PUSCH and/or PDSCH data transmission will proceed.

Further, for data that has not been transmitted through pre-allocated resources, the terminal-side device notifies the control-side device of the data or indication information of the data, so that the dynamically allocated resources can be used for transmission during the active duration of DRX. Here, data that has not been transmitted through pre-allocated resources may refer to remaining data when the pre-allocated resources are not enough to transmit all data, and/or data that is not transmitted by utilizing pre-allocated resources. In particular, the data may include uplink transmission remaining data and/or downlink transmission remaining data.

The control-side device will acquire information about data to be dynamically scheduled, and generate scheduling control information for the data scheduling, such as DCI, which indicates the resources allocated for the data transmission, etc., and send the scheduling control information to the terminal-side device for detection and/or decoding. The scheduling control information may include uplink scheduling control information and/or downlink scheduling control information. Preferably, the scheduling control information can be optimized according to embodiments of the present disclosure, wherein an optimized format is adopted to effectively reduce the times of blind detection performed on the control information in the terminal-side detection and/or decoding process, as described below.

As a result, the terminal-side device can receive and decode DCI, and then transmit data on the resources specified by DCI. In particular, UL DCI can be decoded. All remaining PUSCHs then can be transmitted on the specified time-frequency resources according to the UL DCI. In addition, DL DCI can be decoded and all remaining PDSCHs can be received on specified time-frequency resources according to the DL DCI. The above operations are performed during the active duration of DRX. In other words, data that has not been transmitted before the DRX active duration, such as remaining data, will all be transmitted during the DRX active duration.

After that, enter an inactive duration of DRX. However, uplink communication and/or downlink communication can still be performed according to pre-allocated resources during the DRX inactive duration. For example, according to parameter configuration of CG-PUSCH/SPS-PDSCH, there may still be at least one CG-PUSCH/SPS-PDSCH for data transmission during the DRX inactive duration. It should be noted that data transmission during the DRX inactive duration is only optional and not required.

A time domain diagram according to an embodiment of the present disclosure is shown in FIG. 4B, which schematically shows that before the active duration, for example, in the DRX start offset, uplink data transmission and/or downlink data transmission are performed by using predetermined resources (such as pre-allocated resources), and during the active duration, uplink data transmission and/or downlink data transmission are performed by using dynamic resources (such as dynamically allocated resources). In addition, during the inactive duration, optionally, the predetermined resources can be utilized for uplink data transmission and/or downlink data transmission.

It should be noted that communication resources in the wireless communication system as mentioned in this disclosure may refer to various resources that can be used by devices in the wireless communication system for communication and/or providing services, such as any of physical resources, channel resources, time-frequency resources, etc., and these resources can take various forms and be used by devices in the wireless communication system in various appropriate methods, which will not be described in detail here.

Figure 5A:
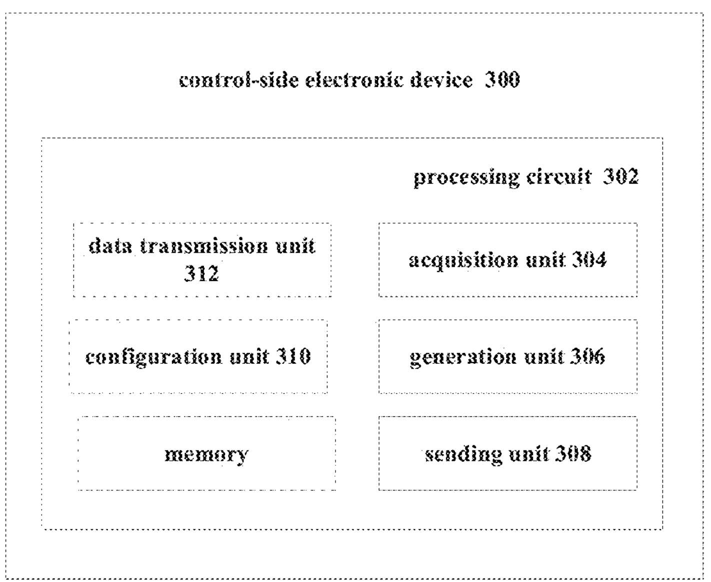
FIG. 5A shows a block diagram of a control-side electronic device in a wireless communication system according to another embodiment of the present disclosure.

Exemplary electronic devices in a wireless communication system according to embodiments of the present disclosure will be described below. FIG. 5A shows a control-side electronic device 300 in a wireless communication system according to an embodiment of the present disclosure. The electronic device 300 includes a processing circuit 302 configured to acquire relevant information about data to be dynamically scheduled between the control-side electronic device and the terminal-side electronic device; generate dynamic scheduling control information indicating configuration for data dynamic scheduling with respect to the acquired relevant information; and send the generated dynamic scheduling control information to the terminal-side electronic device in the wireless communication system, wherein the dynamic scheduling control information is set such that the number of detection operations performed by the terminal-side electronic device on the control information is reduced.

According to an embodiment of the present disclosure, the relevant information about data to be dynamically scheduled may include the data to be dynamically scheduled, and/or information associated with the data to be dynamically scheduled, such as BSR, PHR, etc.

In some embodiments, the data to be dynamically scheduled refers to data to be transmitted via resources dynamically allocated by the control-side electronic device. In some embodiments, the data to be dynamically scheduled includes data remaining after data transmission has been performed through preset resources, such as at least one of physical downlink shared channel (PDSCH) data and physical uplink shared channel (PUSCH) data. For example, when SPS-PDSCH and/or CG-PUSCH cannot transmit all data, the remaining data can be transmitted through dynamically allocated resources.

In other embodiments, when in uplink or downlink data transmission, the transmission is not performed by using pre-allocated fixed resources, such data will also be referred to as data to be dynamically scheduled and will be transmitted through dynamically allocated resources. As an example, for downlink transmission, when a standard existing downlink scheduling process is used to replace SPS-PDSCH, the data to be dynamically scheduled may include all downlink data. For uplink transmission, when a standard existing uplink dynamic scheduling process is used to replace CG-PUSCH, the data to be dynamically scheduled will include all uplink data.

According to an embodiment of the present disclosure, the processing circuit is further configured to send scheduling control information in an active duration in a data communication cycle, so that data to be dynamically scheduled can be transmitted according to the scheduling control information in the active duration. As an example, the scheduling control information may include resource allocation related to the data transmission channel. As an example, the scheduling control information may be DCI, including uplink and downlink resource allocation, HARQ information, power control, etc.

On the other hand, the terminal-side device receives the scheduling control information, acquires the scheduling control information through specific detection processing, and decodes the scheduling control information, so as to perform uplink and/or downlink data transmission on the dynamic resources specified in the scheduling control information. Particularly, in the case of DCI as the scheduling control information, the DCI will be detected for localization.

In an embodiment of the present disclosure, the dynamic scheduling control information can be set such that the number of detection operations performed by the terminal-side device on control information, especially subsequent control information after the dynamic scheduling control information, can be reduced, that is, the times of detection or blind detection to acquire/localize the control information can be reduced. Here, the subsequent control information may be any appropriate type of control information in the wireless communication process, including but not limited to at least one of scheduling control information, non-scheduling control information, and the like.

Figure 5B:
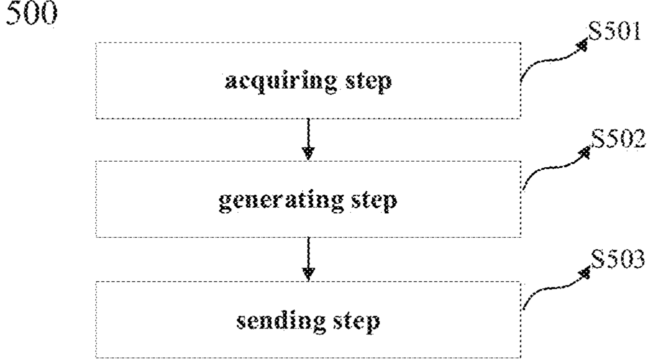
FIG. 5B shows a flow of a method for a control side in a wireless communication system according to another embodiment of the present disclosure.
Figure 5C:
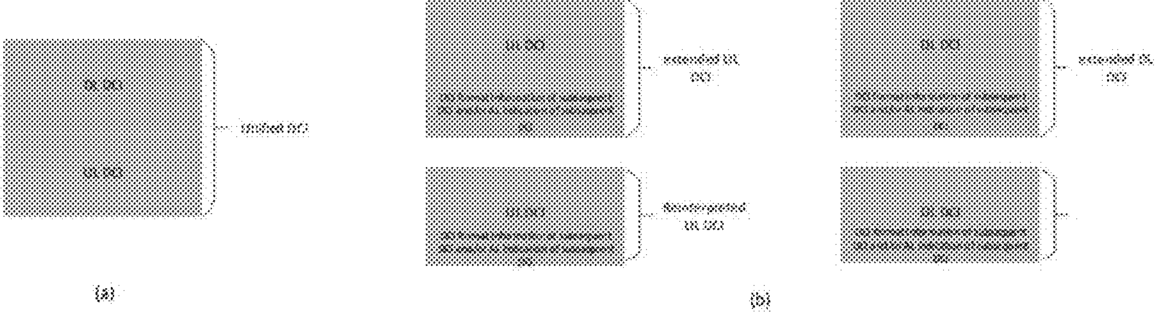
FIG. 5C shows a schematic diagram of dynamic scheduling control information configuration according to another embodiment of the present disclosure.
Figure 5C:
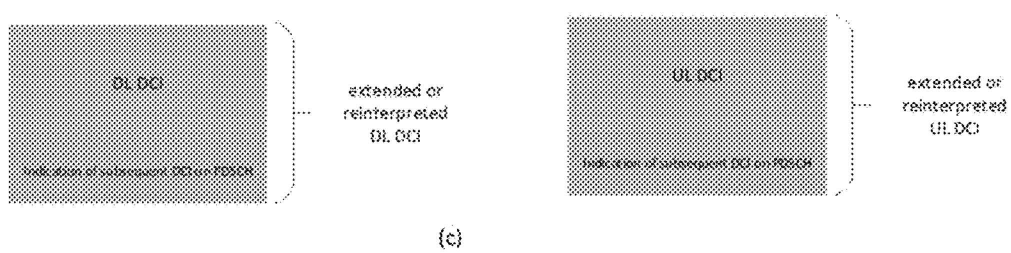

According to embodiments of the present disclosure, scheduling control information may be optimally configured in various appropriate ways. In some embodiments, the scheduling control information includes both scheduling control information indicating remaining uplink data transmission channel data and scheduling control information indicating remaining downlink data transmission channel data. As an example, the present disclosure proposes a unified DCI that simultaneously contains downlink scheduling control information about the remaining PDSCH and uplink scheduling control information about the remaining PUSCH, as schematically shown in FIG. 5C(a). In this way, compared to blind detection of UL DCI and DL DCI separately, when using unified DCI, blind detection can be performed only for the unified DCI, and when unified DCI is detected, the specified resources can be acquired from it to perform uplink and downlink transmission respectively. Therefore, it is possible to reduce one round of blind detection, especially the blind detection of currently received unified DCI, which greatly reduces the power consumption overhead for PDCCH monitoring at the terminal.

In some embodiments, the scheduling control information (DCI) can be configured with the above-mentioned assistant information, especially at least one of the above-mentioned format information, aggregation level indication information, search space information, applicable status information, enable indication information, etc., the setting of these information can be implemented as described above, and will not be described in detail here, as shown in FIG. 5C(b).

In particular, in some embodiments, the assistant information may be generated for one or both of scheduling control information for uplink data transmission and scheduling control information for downlink data transmission. For example, the assistant information may be generated for one of the scheduling DL DCI and the scheduling UL DCI, or even for both. As an example, assistant information can be generated by designing extended DL DCI or reinterpreting certain bit fields in DL DCI, for example, generated by adding additional indication information on the basis of the current DL DCI for assisting in subsequent UL DCI detection and/or decoding or reinterpreting certain bits in the current DL DCI for assisting in subsequent UL DCI detection and/or decoding, thereby reducing the times of blind detection of subsequent UL DCI. As another example, assistant information can be generated by designing extended UL DCI or reinterpreting certain bit fields in UL DCI, for example, generated by adding additional indication information on the basis of the current UL DCI for assisting in subsequent DL DCI detection and/or decoding or reinterpreting certain bits in the current UL DCI for assisting in subsequent DL DCI detection and/or decoding, thereby reducing the times of blind detection of subsequent DL DCI. It should be pointed out that when adjacent scheduling control information contains UL DCI and DL DCI, whether UL DCI or DL DCI comes first may depend on the delay requirements of the uplink and downlink traffics, one of UL DCI or DL DCI with higher delay requirements can be placed in an earlier slot, which can be achieved by base station scheduling.

According to some embodiments of the present disclosure, the dynamic scheduling control information may be configured to include both uplink and downlink scheduling control information, and the dynamic scheduling control information includes information indicating one of the uplink and downlink scheduling control information carried through the data transmission channel. In particular, in some embodiments, one of the uplink scheduling control information and the downlink scheduling control information can be transmitted as data through the data transmission channel, and the other is transmitted through the control transmission channel, so that the blind detection is only performed to the scheduling control information transmitted on the control transmission channel, while the blind detection operation on the other scheduling control information can be omitted.

According to an embodiment of the present disclosure, the information at least includes transmission configuration of the scheduling control information transmitted on the data transmission channel, whereby based on the information, the scheduling control information can be acquired/decoded in the data transmission channel. As an example, the transmission configuration may include the time-frequency position occupied in the transmission, modulation and coding parameters, the number of repetitions, and so on. An example of this information is shown in FIG. 5C(c).

As an example, an extended/reinterpreted DL DCI can be generated, the extended DL DCI adds additional information indicating the UL DCI transmitted on the PDSCH on the basis of the existing standard DL DCI, the information may include the time and frequency position occupied by the UL DCI transmitted on the PDSCH, modulation and coding MCS parameters, number of repetitions, etc., which can guide the relevant information required to decode UL DCI on PDSCH. This method is to determine which kind of control information is placed on the PDCCH for transmission and which kind of control information is placed on the PDSCH for transmission based on the difference between uplink and downlink, for example, DL DCI is placed on the PDCCH and UL DCI is placed on the PDSCH for transmission.

As another example, the information can be further optimized to reduce the amount of DCI extension. In particular, the scheduling control information may include remaining control information relative to conventional scheduling control information, so that communication transmission overhead can be saved.

As an example, when DL DCI and UL DCI need to schedule multiple PDSCHs and/or multiple PUSCHs respectively, which causes the sizes of DL DCI and UL DCI to be expanded a lot, in order to avoid introduction of too many new DCI formats, the existing standard DCI can be transmitted on PDCCH, which indicates parameters (number of repetitions, time-frequency resources, modulation coding parameters, etc.) of the remaining control information (total control information used for uplink and downlink scheduling minus the number of control signaling carried in DCI) transmitted on the PDSCH, used for decoding of the remaining control information on the PDSCH.

In this way, by extending DL DCI, such as indicating relevant information about the transmission of UL DCI on the PDSCH, a round of blind detection of the UL DCI can be omitted, and only one or more (depending on repetition configuration) data channel decoding is required, thereby the power consumption overhead of terminal PDCCH monitoring is greatly reduced. It should be noted that the above description can also be directed to the extension of UL DCI, for example, UL DCI can be extended to indicate relevant information about the transmission of DL DCI on the PUSCH, thus the need for blind detection of DL DCI can be eliminated.

From the above, by designing the format of dynamic scheduling control information to reduce the times of its blind detection, the terminal energy saving gain can be achieved. In particular, for uplink and downlink scheduling control information, by adopting a unified format, or by extending or reinterpreting the scheduling control information to include information that can assist in detection/blind detection of subsequent scheduling control information, the times of detection/blind detection of dynamic scheduling information can be effectively reduced.

Furthermore, the scheduling control information optimization according to the present disclosure can be appropriately applied to wireless communications. In some embodiments, the scheduling control information optimization according to the present disclosure can be applied to the optimization of DCI of the existing uplink dynamic scheduling process and/or the downlink dynamic scheduling process. In particular, all uplink data in the existing uplink dynamic scheduling process will be transmitted through dynamically allocated resources that will be indicated by UL DCI; all downlink data in the existing downlink dynamic scheduling process will be transmitted through dynamically allocated resources that will be indicated by DL DCI. In such transmission, by optimizing UL DCI and/or DL DCI as above, the work overhead when decoding/detecting DCI on the terminal side can be effectively reduced. In other embodiments, scheduling control information optimization according to the present disclosure may be combined with a scheme for data transmission through pre-allocated resources, so that the remaining data after data transmission through the pre-allocated resources will be transmitted through dynamically allocated resources, and during the dynamic transmission process, the work overhead of detection/decoding of scheduling control information, such as DCI, will be reduced.

The following will describe an optimization scheme in the case of using pre-allocated resources for data transmission according to the present disclosure. Particularly, in the wireless communication, when data transmission is to be performed for a specific service according to a specific mode, the data can often be transmitted in accordance with resource settings corresponding to the specific mode. As an example, for uplink and downlink data arriving periodically, the pre-allocated resources corresponding to the periodicity can be used for uplink and downlink data transmission, such as CG/SPS technology. However, problems may arise when the data to be transmitted does not match the pre-allocated transmission resources, as mentioned above, XR services with non-fixed data sizes do not match CG/SPS transmission. For such mismatch, the present disclosure proposes an improved combination of using pre-allocated resources for data transmission and dynamic scheduling to cope with such mismatch and better support data transmission services.

In particular, a data transmission cycle may include an active duration and an inactive duration. In the data transmission cycle, data transmission using pre-allocated resources can be performed before the active duration or during the inactive duration, which may depend on data transmission service parameters, especially transmission rate, such as average data transmission rate, and dynamically allocated resources will be used to transmit the remaining data during the active duration. The remaining data may indicate data that has not been transmitted up to this active duration, which may include remaining data that has not been transmitted in this data transmission cycle, and may even include remaining data that has not been transmitted in a previous data transmission cycle. Such data may be referred to as data to be dynamically scheduled. In some embodiments, the data to be dynamically scheduled may be data that still remains after deducting the data that has been carried/allocated by at least one data transmission channel before the active duration of the current cycle from the data that has not been transmitted in the previous cycle and the data to be transmitted before the active duration in the current cycle, which, in a sense, can also be called data that has not been successfully sent before the active duration in the current cycle.

According to an embodiment of the present disclosure, there is at least one data transmission channel before the active duration in the data transmission cycle, and the content carried by the at least one data transmission channel may depend on relationship between the resource size of the data transmission channel and the data that needs to be sent (i.e., has not sent yet) until the current moment. In particular, in a case that the resource size of the data transmission channel is greater than or equal to the size of the data that needs to be sent up to the current moment, the content carried by at least one data transmission channel can be the size of the data that needs to be sent up to the current moment; while in a case that the resource size of the data transmission channel is smaller than the size of the data that needs to be sent up to the current moment, the content carried by at least one data transmission channel includes a part of the data and indication information about the rest part of the data, the information can be in various appropriate forms, such as BSR (Buffer Status Report) or PHR (Power Headroom Report). Therefore, the rest part of the data can be transmitted via dynamically allocated resources.

In some embodiments, the data that needs to be sent up to the current moment includes traffic data that needs to be sent in the current data transmission cycle, and the content carried by at least one data transmission channel may include all traffic data, or a part of the traffic data and indication information about the rest of traffic data. In other embodiments, if there is still traffic data that has not been transmitted in the previous data transmission cycle yet (for example, data that has not been transmitted in the inactive duration in the previous data transmission cycle yet), the data that needs to be sent up to the current moment optionally also includes data that has not been transmitted in the previous data transmission cycle yet. In this way, the content carried by at least one data transmission channel may also include all traffic data that have not been transmitted in the previous data transmission cycle yet, indication information about all traffic data, or a part of the traffic data and indication information about the rest of the traffic data.

According to some embodiments of the present disclosure, the traffic data and/or the indication information about the traffic data may be appropriately distributed in at least one data transmission channel. In some embodiments, the traffic data and/or the indication information about the traffic data may be randomly distributed. In some embodiments, the distribution can be carried out according to the priority of the traffic data, and high-priority traffic data can be preferentially sent through resources corresponding to the data transmission channel. For example, the traffic data can be arranged sequentially in the data transmission channel according to the priority of the traffic data from high to low, so that the traffic data can be transmitted in sequence. In particular, the priority of traffic data can be appropriately determined according to various factors, for example, it can depend on the importance of the data, the more important the data is, the higher its priority is, for example, it can also depend on chronological order of the data, and the data priority can be set from high to low or from low to high according to the chronological order of the data. As an example, when the content to be carried by the data transmission channel before the active duration in the current data transmission cycle will involve data that has not yet been transmitted in the previous data transmission cycle and data to be transmitted in the current data transmission cycle, data that has not yet been transmitted in a data transmission cycle can be preferentially transmitted through the resources of the current data transmission channel, or data in the current data transmission cycle can be preferentially transmitted through the resources of the current data transmission channel.

In this way, all data to be transmitted before the active duration in the data transmission cycle will complete its transmission during the active duration at the latest. In particular, either all data can be carried and transmitted by the data transmission channel before the active duration, or a part of data can be carried and transmitted by the data transmission channel before the active duration, and the remaining part can be dynamically transmitted during the active duration.

According to embodiments of the present disclosure, the number of data transmission channels before the active duration in the data transmission cycle may depend on various factors/parameters in data communication, such as the data transmission rate, etc. In particular, there may be one or more data transmission channels, depending on whether jitter is present in the data transmission.

According to embodiments of the present disclosure, data distribution in a data transmission channel to which predetermined resources have been allocated may be performed in various appropriate ways. In particular, the data to be carried in each data transmission channel can be determined depending on the status of data that has not been transmitted yet up to the active duration in the current data transmission cycle and the number of data transmission channels before the active duration to which resources have been allocated.

According to embodiments of the present disclosure, when there is no jitter in data transmission, there is one data transmission channel before the active duration of the data transmission cycle. The content carried by the data transmission channel can be set as described above, for example, depending on the resource size of the data transmission channel, it can include all data to be transmitted up to the data transmission channel, or include part of the data and indication information about the rest of data if not all data can be carried. In some embodiments, the content carried by the data transmission channel includes all the data that needs to be sent before the active duration in the current data transmission cycle, or a part of the data that needs to be sent before the active duration in the current data transmission cycle and indication information about the rest of data. In some embodiments, when there is remaining data that has not yet been sent in the previous data transmission cycle (for example, data that was not sent during the inactive duration), the content carried by the data transmission channel can also include all remaining data that have not yet been sent in the previous data transmission cycle, indication information about the remaining data that has not yet been sent in the previous data transmission cycle, or a part of the remaining data that have not yet been sent in the previous data transmission cycle and indication information about the rest of data.

According to embodiments of the present disclosure, content carried by the data transmission channel may be arranged in an appropriate order. In some embodiments, the content carried by the data transmission channel may be ordered according to the transmission priorities of data content. For example, the remaining data that has not yet been sent in the previous data transmission cycle, a part of the data to be sent in the current transmission cycle, and the indication information about the remaining data can be arranged in the stated order sequentially. In particular, the remaining data that have not yet been sent in the previous data transmission cycle may be sorted in the order of at least one data transmission channel in the previous data transmission cycle. In another example, the remaining data that has not yet been sent in the previous data transmission cycle may be arranged in other ways, for example, may be arranged before or after the data for the current data transmission cycle and/or its indication information, for example, randomly. distributed.

As an example, when there is only one CG-PUSCH before the DRX active duration in the DRX cycle, the data carried by the CG-PUSCH can be determined based on the relationship between the resource size for CG-PUSCH and the size of the PUSCH data that needs to be sent up to the current moment. The data that the CG-PUSCH can carry can include three types of data: PUSCH data that remains in the DRX inactive duration in the previous DRX cycle (for example, when one or more PUSCHs remain, the data can include information about remaining bits of the one or more PUSCH, and multiple PUSCHs have priorities from high to low or from low to high in chronological order, it should be noted that the remaining PUSCH data is optional, when all data has been transmitted in the previous DRX cycle, there will no longer be any remaining PUSCH data), PUSCH data that needs to be sent up to the current moment in the current DRX cycle, and indication information (for example, BSR/PHR) about remaining PUSCH data after deducting PUSCH data to be carried by current CG-PUSCH from all PUSCH data that needs to be sent from the DRX inactive duration in the previous DRX cycle up to the current moment. These three types of data have respective transmission priorities from high to low in the order listed. In another example, the data in the current DRX cycle may be arranged before the data in the previous DRX cycle, and have a higher transmission priority.

In a case where a jitter exists in data transmission, there are two or more data transmission channels before the active duration of the data transmission cycle, and data can be appropriately distributed in the two or more data transmission channels to appropriately determine content to be carried in each data transmission channel. According to embodiments of the present disclosure, a specific data transmission channel among two or more data transmission channels, preferably a data transmission channel closest to the active duration, may be performed data distribution as described above, such as carrying data as well as indication information about the remaining data, while other transmission channels only carry the data to be transmitted.

In some embodiments, the data to be carried by a data transmission channel may be all or part of the data to be allocated to the data transmission channel. In some embodiments, a correspondence relationship between two or more data transmission channels in the current data transmission cycle and data transmission channels in the previous data transmission cycle can be set, and the data distribution in the data transmission channels can be arranged according to the correspondence relationship. For example, the remaining transmission data for a data transmission channel in the previous data transmission cycle may be arranged in a corresponding data transmission channel in the current data transmission cycle. In some embodiments, the traffic data can be sorted according to priority of the traffic data, and high-priority data can be preferentially transmitted through preset resources, for example, high-priority data can be preferentially arranged in a data transmission channel that is sorted first, which can ensure that high-priority data can be transmitted preferentially.

As an example, when there are multiple CG-PUSCHs before the DRX active duration in the DRX cycle, there are two optional schemes, one scheme is that the CG-PUSCH closest to the DRX active duration can be performed data package and transmission according to the case that there contains only one CG-PUSCH before the DRX active duration in the DRX cycle, and CG-PUSCHs before the CG-PUSCH in the DRX cycle only contains PUSCH data arriving at the corresponding time moment. Another scheme is that a first CG-PUSCH in the current DRX cycle preferentially transmits all remaining PUSCHs in the previous DRX cycle, and a second CG-PUSCH in the current DRX cycle preferentially transmits remaining PUSCHs of the first CG-PUSCH in the current DRX cycle, and so on, until all the remaining PUSCHs in the DRX cycle are transmitted during the DRX active duration. For SPS-PDSCHs before the DRX active duration in the current DRX cycle, all or part of PDSCH data is sent on the SPS-PDSCH, according to the relationship between the size of PDSCH data that currently needs to be sent and the size of the SPS-PDSCH resource.

The following will describe an exemplary embodiment according to the present disclosure in which data transmission using pre-allocated resources is combined with dynamic scheduling, where data transmission will be described with DRX cycle transmission, and for data transmission using pre-allocated resources, uplink transmission will be described by taking CG PUSCH as an example, and downlink transmission will be described by taking SPS PDSCH as an example.

According to an embodiment of the present disclosure, taking uplink and downlink data of AR scene as a single stream as an example, according to the agreement reached by the existing standards, the downlink service parameters are FPS=60 (baseline), 120, 30 (optional). The data packet size follows a truncated Gaussian distribution, and the packet arrival jitter follows a truncated Gaussian distribution with a mean of Oms and a standard deviation of 2 ms. The uplink service parameters are FPS=60 (baseline), 240 (optional), and the data packet size follows the truncated Gaussian distribution.

Figure 6A:
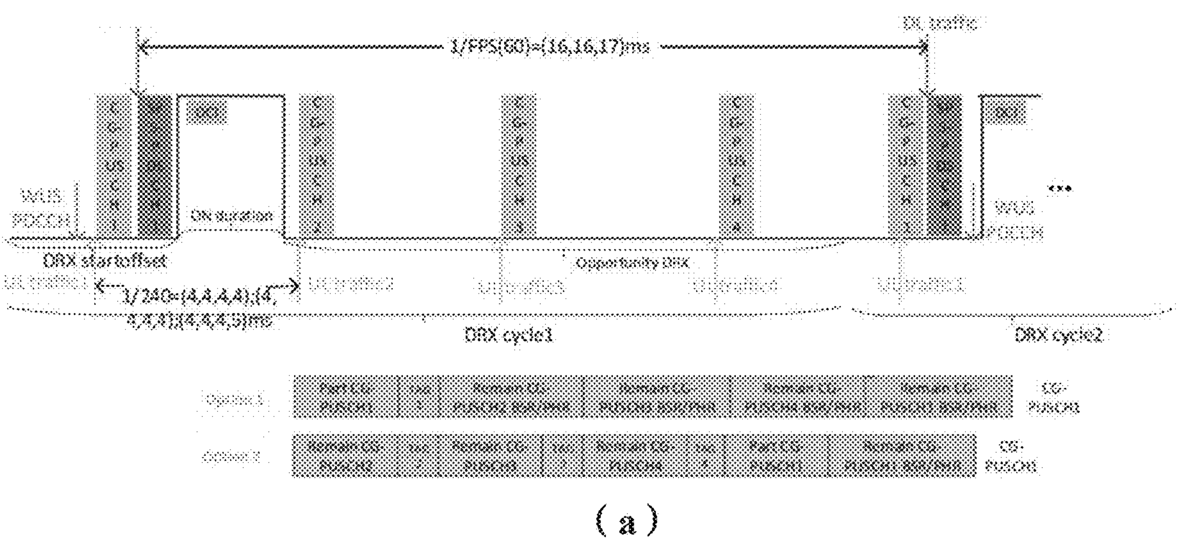
FIGS. 6A and 6B show schematic structural diagrams of both downlink data transmission and uplink data transmission in a dynamic scheduling scheme according to a first embodiment of the present disclosure.
Figure 6A:
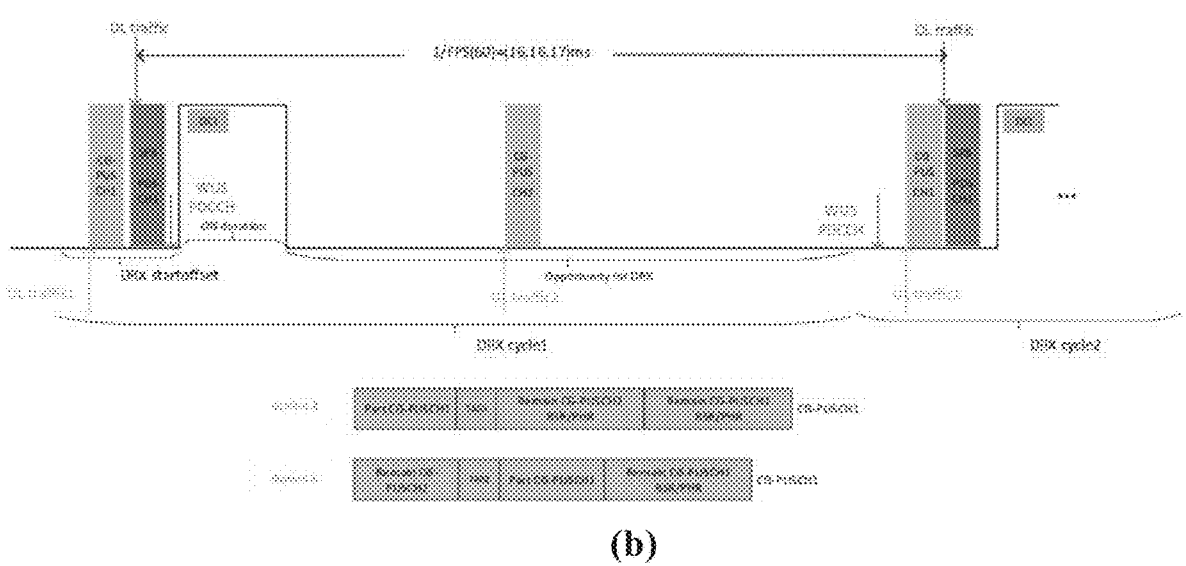
Figure 6B:
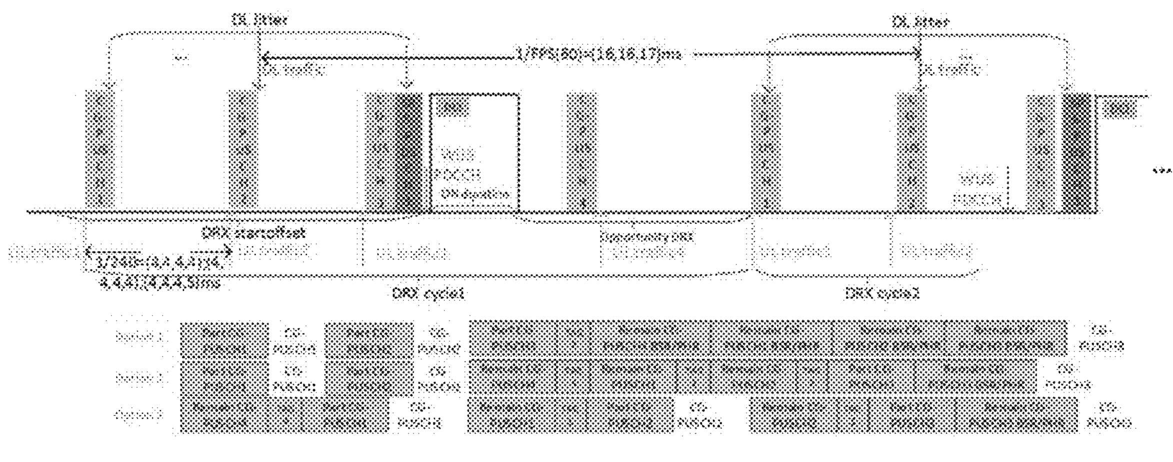
Figure 6B:
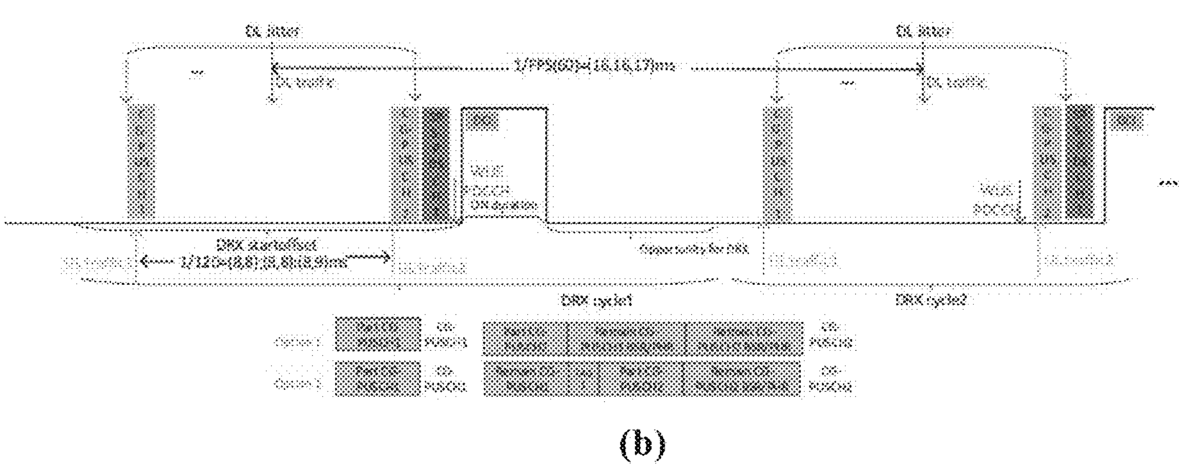

FIGS. 6A and 6B show schematic structural diagrams of both downlink data transmission and uplink data transmission in the dynamic scheduling scheme according to the first embodiment of the present disclosure, where both uplink data transmission and downlink data transmission are performed periodically and combined with dynamic data scheduling, and DL FPS is smaller than UL FPS, such as DL@60 FPS, UL@240 FPS and UL@120 FPS. Depending on different CG-PUSCH, SPS-PDSCH and DRX parameter configuration relationships, two situations may exist as follows.

The first situation is a case where DL arrival jitter is not considered, and there is only one CG-PUSCH before the DRX active duration in the DRX cycle, as shown in FIG. 6A. The following configuration is met: CG-PUSCH1, SPS-PDSCH1 and WUS-PDCCH precede the DRX active duration, CG-PUSCH1 precedes SPS-PDSCH1, but positional relationships among CG-PUSCH1 and SPS-PDSCH1 and WUS-PDCCH are not limited, for example, WUS-PDCCH can be located before, between or after CG-PUSCH1 and SPS-PDSCH1. In addition, CG-PUSCH can be still included in the inactive duration of the DRX cycle, and the number of CG-PUSCHs included in the inactive duration may depend on the uplink data transmission rate.

FIG. 6A(a) shows an embodiment where DL is 60 fps and UL is 240 fps, there still exists CG-PUSCHs in the inactive duration of the DRX cycle, such as CG-PUSCH2 to CG-PUSCH4. When a first UL traffic (UL traffic 1) in DRX cycle 2 arrives, the UE first determines the content that needs to be carried by CG-PUSCH1. In one example, all data that has not been transmitted in the previous DRX cycle will be transmitted via dynamic scheduling, instead of CG-PUSCH, in the current DRX cycle. In this way, CG-PUSCH1 in DRX2 transmits a part of data of UL traffic 1 and BSR/PHR information about all bits that have not been transmitted in the previous DRX cycle, and then BSR/PHR information of the remaining bits of CG-PUSCH1 is appended to the end of CG-PUSCH1 for reporting, and the format of CG-PUSCH1 is finally got, as shown in option 1 of FIG. 6A(a). In another example, information about numbers of remaining bits in UL traffic 2, UL traffic 3, and UL traffic 4 in DRX cycle 1 that has not been transmitted by the corresponding CG-PUSCH is obtained respectively, and is set to B_p2, B_p3, B_p4, and then the number of data bits of UL traffic 1 that need to be sent in DRX cycle 2 is taken as B_c1, these four pieces of data can be filled into CG-PUSCH1 in the order of priority 1: B_p2, B_p3, B_p4, B_c1 or priority 2: B_p4, B_p3, B_p2, B_c1, and at the end of each piece of data, a TAG with the corresponding data number can be appended as a tag indicating that such piece of data ends. Among them, only a part of or no data of B_c1 is carried in CG-PUSCH1, the BSR/PHR information about the remaining bits that have not been carried in CG-PUSCH1 in B_c1 is appended to the end of CG-PUSCH1 for reporting, and the format of CG-PUSCH1 is finally obtained, as shown in option 2 of FIG. 6A(a). FIG. 6A(b) shows a situation where DL is 60 fps and UL is 120 fps, the steps are similar and the corresponding format is as shown in the figure.

It should be noted that the format of CG-PUSCH1 shown in FIG. 6A corresponds to a situation where all numbered PUSCHs have remaining bits that have not been transmitted during the inactive duration of the previous DRX cycle, if some numbered PUSCHs have no remaining data to be transmitted, the resources occupied by the data and corresponding TAG, or the BSR corresponding to the remaining bits, would be released, and used for transmission of other information. TAG is used to split PUSCH data with different numbers, can be designed as a known sequence, TAGs with different numbers correspond to different known sequences.

The second situation is a case that the DL arrival jitter is consider, and there contains two or more CG-PUSCHs before the DRX active duration in the DRX cycle, as shown in FIG. 6B. The following configuration is met: two or more CG-PUSCHs, SPS-PDSCH1 and WUS-PDCCH precede the DRX active duration, two or more CG-PUSCHs precede SPS-PDSCH1, but positional relationships among each CG-PUSCH, SPS-PDSCH1 and WUS-PDCCH are not limited, as mentioned above. In addition, CG-PUSCH can be still included in the inactive duration of the DRX cycle, and the numbers of CG-PUSCH included in the inactive duration may depend on the uplink data transmission rate.

FIG. 6B(a) shows an embodiment where DL is 60 fps and UL is 240 fps, there contains CG-PUSCH1 to CG-PUSCH3 before the DRX active duration, and CG-PUSCH4 is included in the non-active duration. When a UL traffic in DRX cycle 2 arrives, for example, when UL traffic 1 arrives, the UE first determines the content that needs to be carried by CG-PUSCH1 to CG-PUSCH3 before the active duration.

In one example, CG-PUSCH3 closest to the DRX active duration can be encapsulated and sent, as in the case where there is only one CG-PUSCH before the DRX active duration in the DRX cycle described above in conjunction with FIG. 6A, to obtain the format of CG-PUSCH3, while CG-PUSCH1 and CG-PUSCH2 before CG-PUSCH3 in DRX cycle 2 each only contains part or all of PUSCH data of UL traffic 1 and UL traffic 2 in DRX cycle 2, respectively, as shown by option 1 and option 2 in FIG. 6B(a).

In another example, a first CG-PUSCH1 in the current DRX cycle 2 preferentially transmits all remaining PUSCHs in the previous DRX cycle 1, that is, the remaining PUSCH4, and CG-PUSCH2 in DRX cycle 2 preferentially transmits the remaining PUSCH of a previous CG-PUSCH1 in the current DRX cycle 2 and a part of CG-PUSCH2, and so on, CG-PUSCH3 transmits the remaining CG-PUSCH2, a part of CG-PUSCH3 and the BSR/PHR of the remaining CG-PUSCH3, the remaining bits of CG-PUSCH3 are finally transmitted by dynamic scheduling during the DRX active duration. Therefore, the formats of CG-PUSCH1, CG-PUSCH2 and CG-PUSCH3 are as shown by option 3 in FIG. 6B(a). FIG. 6B(b) shows the situation where DL is 60 fps and UL is 120 fps, where the steps are similar and the corresponding format is as shown in the figure.

It should be noted that the formats of CG-PUSCH1 to CG-PUSCH3 shown in FIG. 6B corresponds to a situation where all numbered PUSCHs have remaining bits that have not been transmitted during the inactive duration of the previous DRX cycle, if some numbered PUSCHs have no remaining data to be transmitted, the resources occupied by the data and corresponding TAG, or the BSR corresponding to the remaining bits, would be released, and used for transmission of other information. TAG is used to split PUSCH data with different numbers, can be designed as a known sequence, TAGs with different numbers correspond to different known sequences.

For SPS-PDSCH, depending on the relationship between the size of PDSCH data that currently needs to be sent and the size of the SPS-PDSCH resource, all or part of PDSCH data can be sent on the SPS-PDSCH. The transmission of the rest part data can be implemented by dynamic scheduling.

Figure 7A:
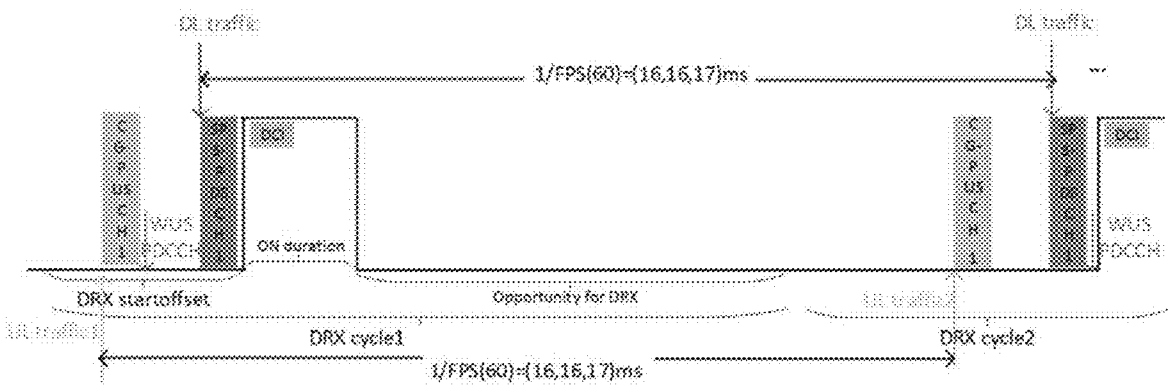
FIGS. 7A and 7B show a schematic structural diagram of both downlink data transmission and uplink data transmission in a dynamic scheduling scheme according to a second embodiment of the present disclosure.
Figure 7B:
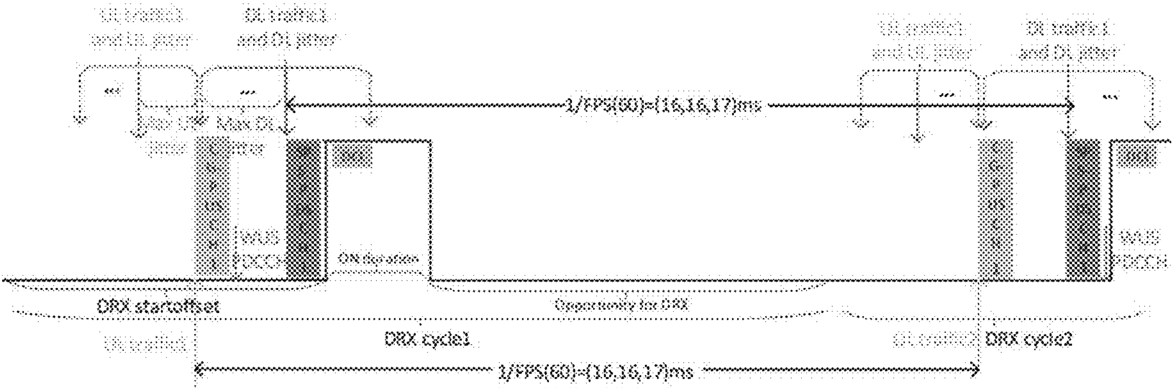

FIGS. 7A and 7B show schematic structural diagrams of both downlink data transmission and uplink data transmission in the dynamic scheduling scheme according to a second embodiment of the present disclosure, where both uplink data transmission and downlink data transmission are performed periodically and combined with dynamic data scheduling, and DL FPS is equal to UL FPS, such as DL@60 FPS, and UL@60 FPS. The following configuration is met: CG-PUSCH1, SPS-PDSCH1 and WUS-PDCCH precede the DRX active duration, CG-PUSCH1 precedes SPS-PDSCH1, but positional relationships among CG-PUSCH1 and SPS-PDSCH1 and WUS-PDCCH are not limited, as mentioned before. In addition, CG-PUSCH and SPS-PDSCH are not included in the inactive duration of the DRX cycle.

FIG. 7A shows a case where jitter is not considered, and FIG. 7B shows a case where jitter is considered. There is no need to additionally design the format of CG-PUSCH/SPS-PDSCH, for example, depending on the resource size of the CG-PUSCH/SPS-PDSCH and the size of the data to be transmitted, CG-PUSCH/SPS-PDSCH may transmit all data or part of the data, while indication information of the remaining data is appended at the end so that it can be dealt with during the active duration through dynamic scheduling.

Figure 8A:
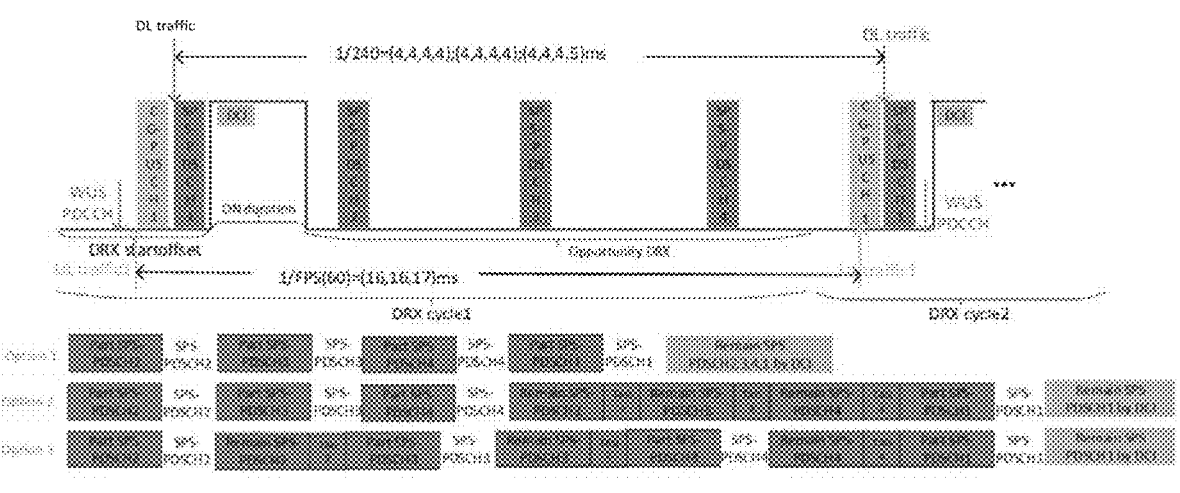
FIGS. 8A and 8B show a schematic structural diagram of both downlink data transmission and uplink data transmission in a dynamic scheduling scheme according to a third embodiment of the present disclosure.
Figure 8A:
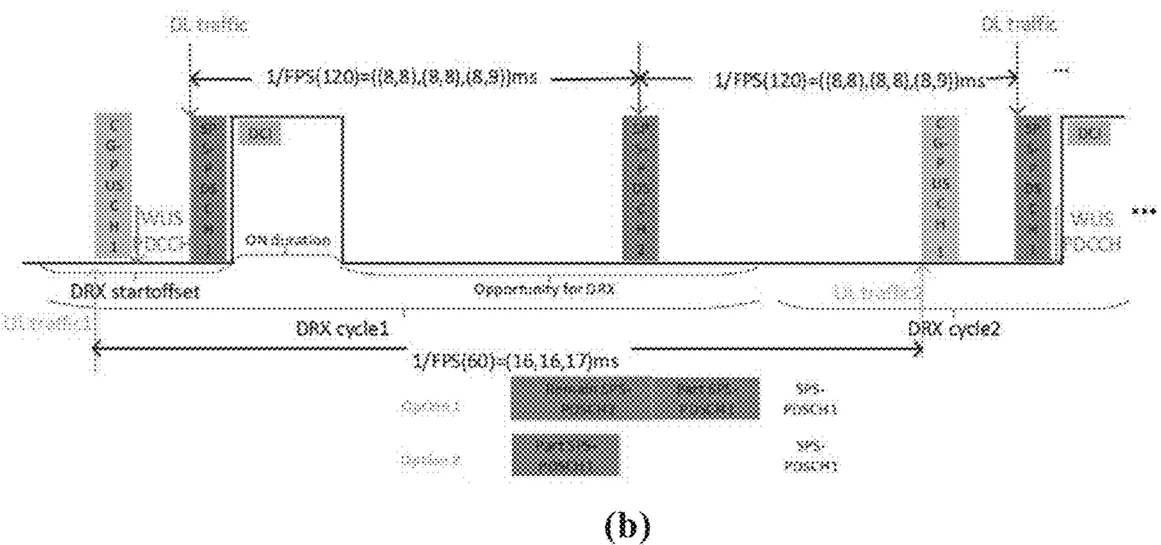
Figure 8B:
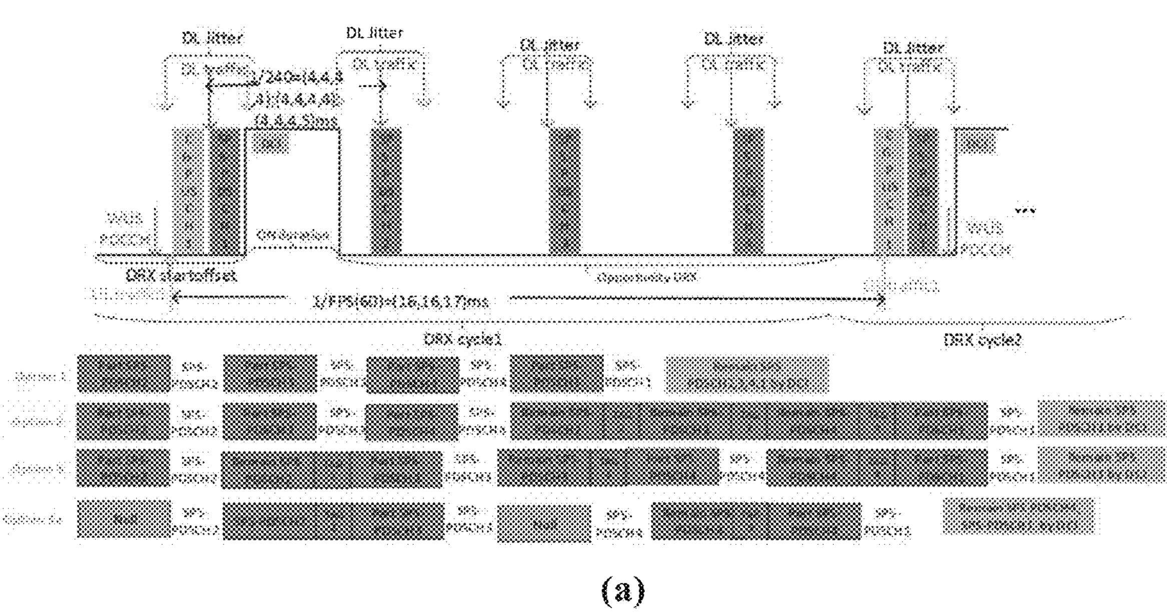
Figure 8B:
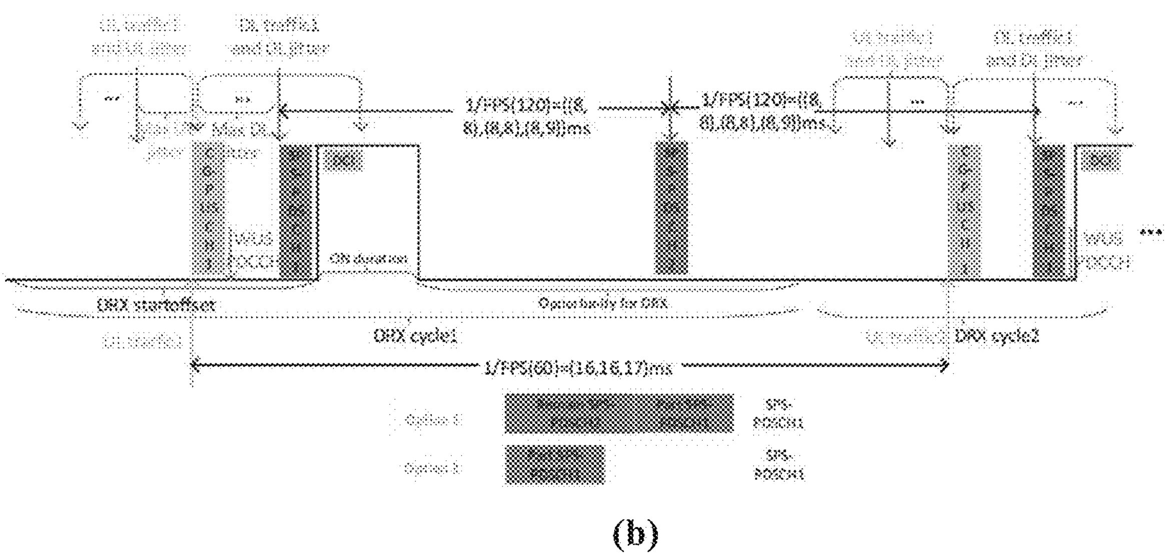

FIGS. 8A and 8B show schematic structural diagrams of both downlink data transmission and uplink data transmission in the dynamic scheduling scheme according to a third embodiment of the present disclosure, where both uplink data transmission and downlink data transmission are performed periodically and combined with dynamic data scheduling, and DL FPS is greater than UL FPS, such as DL@240 FPS, DL@120 FPS and UL@60 FPS. Among them, it may need to design a transmission structure for SPS-PDSCH, for example, the transmission structure for CG-PUSCH as described above in conjunction with FIGS. 6A and 6B. Specifically, depending on the different CG-PUSCH and SPS-PDSCH and DRX parameter configuration relationships, there may exist two situations as follows.

The first situation is a case where the arrival jitter is not considered and there contains only one SPS-PDSCH before the DRX active duration in the DRX cycle contains, as shown in FIG. 8A. The following configuration is met: CG-PUSCH1, SPS-PDSCH1, and WUS-PDCCH precede the DRX active duration, and CG-PUSCH1 precedes SPS-PDSCH1, but positional relationships among CG-PUSCH1, SPS-PDSCH1, and WUS-PDCCH are not limited. In addition, SPS-PUSCH is still included in the inactive duration of the DRX cycle, and the number of SPS-PUSCHs included in the inactive duration may depend on the uplink data transmission rate.

FIG. 8A(a) shows an embodiment where UL is 60 fps and DL is 240 fps, which shows transmission structures of SPS-PDSCH in the inactive duration of DRX cycle 1 and SPS-PDSCH1 before the active period of DRX cycle 2. In one example, each SPS-PDSCH only transmits a corresponding PDSCH, and the remaining PDSCH2, PDSCH3, PDSCH4, and PDSCH1 can be transmitted by dynamic scheduling, as shown in option 1. In another example, the remaining PDSCH2, remaining PDSCH3, remaining PDSCH4 and part of PDSCH1 are transmitted in SPS-PDSCH1 of DRX cycle 2, and the remaining PDSCH1 is transmitted in the active duration by dynamic scheduling, as shown in option 2. In yet another example, priorities of PSDCHs are set in chronological order, for example, the priority of the previous PDSCH data is higher than the priority of the subsequent PDSCH data, so the remaining data of the previous PDSCH is preferentially transmitted on the resource for the subsequent SPS-PDSCH. Therefore, a part of PDSCH2 is uploaded on SPS-PDSCH2, the remaining PDSCH2 and a part of PDSCH3 are uploaded on SPS-PDSCH, the remaining PDSCH3 and a part of PDSCH4 are uploaded on SPS-PDSCH4, the remaining PDSCH4 and a part of PDSCH1 are uploaded on SPS-PDSCH1, and the remaining PDSCH1 is transmitted by dynamic scheduling, as shown in option 3. It should be noted that the data transmission structure of option 3 here is also applicable to CG-PUSCH as described above in conjunction with FIG. 6A(a), especially the transmission structure for the CG-PUSCH in the inactive duration in DRX cycle 1 and the CG-PUSCH1 before the active duration in DRX cycle 2.

FIG. 8A(b) shows a situation where UL is 60 fps and DL is 120 fps, where the steps are similar and the corresponding format is as shown in the figure.

The second situation is a case where the arrival jitter is considered, as shown in FIG. 8B. The configuration is basically similar to the first case as described above in conjunction with FIG. 8A, but each SPS-PDSCH, especially the SPS-PDSCH in the inactive duration, will arrive in the presence of jitter, and its arrival time may even be earlier than the DL service.

FIG. 8B(a) shows an embodiment where UL is 60 fps and DL is 240 fps, which shows the transmission structure for SPS-PDSCH in the inactive period in DRX cycle 1 and SPS-PDSCH1 before the active period in DRX cycle 2, option 1-3 is essentially the same as options 1-3 shown in FIG. 8A(a).

In addition, in another example, if a SPS-PDSCH appears before the DL traffic arrives, and the SPS-PDSCH is the first SPS-PDSCH after the active duration, the SPS-PDSCH cannot send the current PDSCH, which is represented by Null in the transmission structure, then the PDSCH will be postponed to the next SPS-PDSCH from transmission, as shown in option 3a. In this way, for a case where one or more SPS-PDSCH resources are wasted, the content of each SPS-PDSCH can be flexibly adjusted according to the criteria of option 3a, that is, the content of each SPS-PDSCH can be postponed to the next SPS-PDSCH resource. FIG. 8B(b) shows a situation where UL is 60 fps and DL is 120 fps, where the steps are similar and the corresponding format is as shown in the figure.

According to embodiments of the present disclosure, periodic data transmission can be combined with dynamic data scheduling, and optimized scheduling control information can be further utilized, therefore, it is possible to achieve further optimized data transmission, in particular, non-fixed size data transmission can be matched and energy saving can be achieved. Specifically, in the data transmission cycle, pre-allocated resources can be used to transmit data, and data that has not been transmitted through pre-allocated resources and/or data that still remains after having been transmitted using pre-allocated resources can be transmitted through dynamically allocated resources, and when the dynamically allocated resources are used for transmission, the format of the scheduling control information can be optimized as described above. This can better match XR services and achieve better energy saving.

The communication between a control-side device (such as gNB) and a terminal-side device (such as UE) applying the above combined embodiment will be described below with reference to FIG. 9, which shows a signaling diagram of both data transmission and uplink data transmission in the dynamic scheduling scheme according to an embodiment of the present disclosure, in which periodic data transmission is combined with dynamic data scheduling, and optimized scheduling control information is further utilized.

According to an embodiment of the present disclosure, the processing circuit is further configured to configure a data communication cycle and configuration parameters of uplink and downlink data transmission based on predetermined resources according to terminal side data traffic information in the wireless communication system. In particular, the data communication cycle corresponds to the communication cycle complying with a Discontinuous Reception (DRX) mode, and the uplink and downlink data transmission based on predetermined resources correspond to CG-PUSCH and SPS-PDSCH respectively.

Before communication is carried out, the parameters of DRX, SPS-PDSCH and CG-PUSCH first need to be configured according to UE data traffic information. The cycle configuration of SPS/CG can be a fixed value or an adaptive variable value. The parameters of DRX can be configured according to a DL traffic model, for SPS-PDSCH, the configuration period can be configured according to a DL service cycle, and the resource size can be configured according to distribution of DL traffic data packets, for non-fixed size data packets, such as data packets that obey the truncated Gaussian distribution, the resource size can be configured according to the minimum/mean value of the data packet or a threshold value corresponding to the occurrence probability reaching a certain proportion or other appropriate values; for CG-PUSCH, the configuration period can be configured according to the UL service cycle, and the resource size can be configured according to distribution configuration of UL data packets, for non-fixed size data packets, such as data packets that obey truncated Gaussian distribution, the resource size can be configured according to the minimum/mean value of the data packet or a threshold value corresponding to the occurrence probability reaching a certain proportion or other appropriate values. In addition, the chronological order of WUS-PDCCH, CG-PUSCH, and SPS-PDSCH is not limited, but it is limited that the first CG-PUSCH resource precedes the first SPS-PDSCH resource in the same DRX cycle (for example, the interval is the maximum downlink jitter delay or twice the maximum downlink jitter delay, that is, half of the uplink/downlink traffic always arrives before CG-PUSCH/SPS-PDSCH), and for better energy saving, CG-PUSCH resources and SPS-PDSCH resources shall be configured before the DRX active duration. After UE acquires the corresponding parameter configuration, UE performs WUS-PDCCH monitoring as well as CG-PUSCH and SPS-PDSCH uplink and downlink data transmission according to existing standards. It should be noted that the setting and transmission of the above parameter configuration can be performed in various appropriate ways, for example, before the communication shown in FIG. 9, transmitted through data broadcast, or transmitted through other appropriate communication signaling.

At the beginning of communication, gNB sends WUS (wake up service) to the UE as a trigger message/wake-up message, WUS can be sent through PDCCH.

The UE monitors this information and starts uplink data transmission with the gNB, wherein the UE sends all or part of data and BSR/PHR of the remaining data/bits to the gNB through CG-PUSCH. In addition, gNB and UE perform downlink data transmission, in which gNB sends all or part of the data to UE through SPS-PDSCH. It should be noted that downlink data transmission is usually later than uplink data transmission, as shown above. For example, downlink data transmission can be performed after receiving uplink data transmission, or downlink data transmission can be performed according to the DL service cycle, regardless of whether the transmitted uplink data is received. The uplink and downlink data transmission here may correspond to the data transmission performed before the active duration in the DRX cycle as mentioned above.

At the beginning of the active duration in the RX cycle, gNB can generate DCI based on the data information uploaded by the UE, especially the BSR/PHR of the remaining data/bits, in order to allocate dynamic resources for the uplink transmission of the remaining data/bits. The DCI generated here can be optimized, as in options 1-3, as described previously. The UE detects the DCI and decodes the DCI accordingly so that the remaining data/bits can be sent uplink according to configuration of the DCI. The DCI transmission and remaining data/bit transmission here are performed during the active duration in the DRX cycle, as mentioned above.

Then an inactive duration of DRX is entered. However, uplink communication and/or downlink communication can still be performed according to pre-allocated resources during the DRX inactive duration, which is not shown here.

The above describes the situation where both uplink and downlink transmission are performed by using pre-allocated resources. It should be noted that the solution of the present disclosure can also be used for a situation that one of the uplink and downlink transmission employs transmission based on pre-allocated resources, while the other one employs dynamic resource transmission.

Figure 10A:
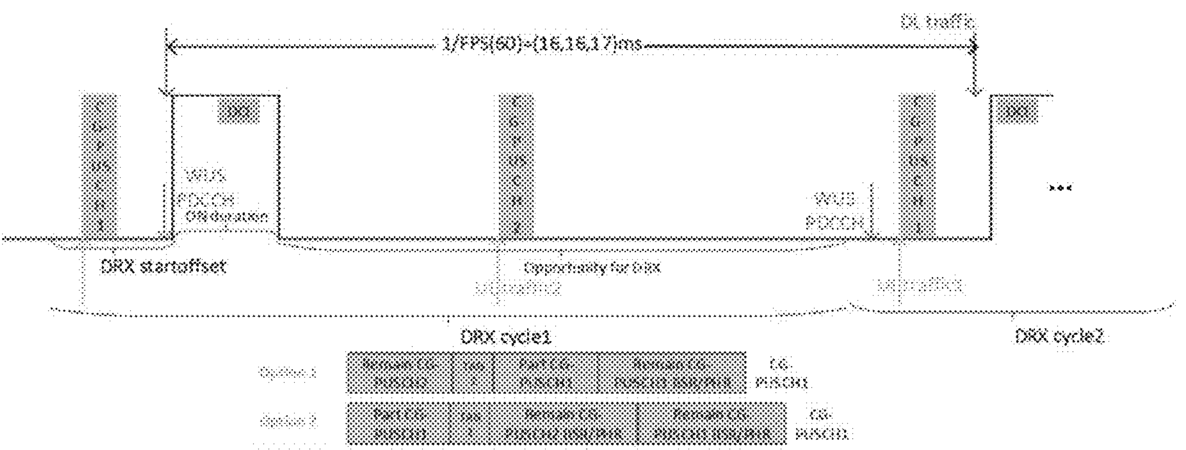
FIGS. 10A and 10B show a schematic structural diagram of uplink data transmission in a dynamic scheduling scheme according to the fourth embodiment of the present disclosure.
Figure 10B:
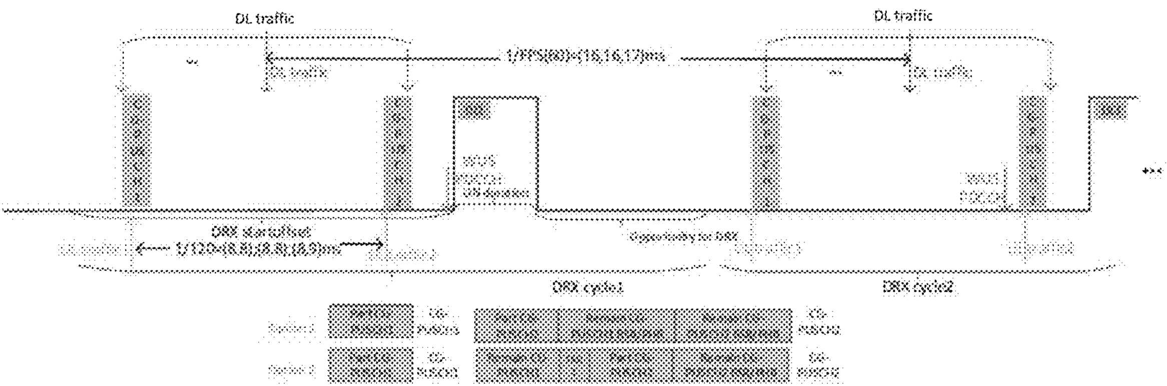

A fourth embodiment according to the present disclosure will be described below with reference to FIGS. 10A and 10B. FIGS. 10A and 10B show schematic structural diagrams of uplink data transmission in a dynamic scheduling scheme according to the fourth embodiment of the present disclosure, where DL@60 fps, UL@ 120 fps is used as an example to illustrate the solution of configuring combination of CG-PUSCH scheduling with dynamic scheduling. The fourth embodiment and the first embodiment differ only in that the SPS-PDSCH process is replaced by a standard existing downlink dynamic scheduling process, and the dynamically scheduled downlink data includes all downlink data, instead of the remaining unscheduled data transmitted by SPS-PDSCH.

Depending on different CG-PUSCH, SPS-PDSCH and DRX parameter configuration relationships, there may exist two situations as follows.

The first situation is a case where DL arrival jitter is not considered and there contains only one CG-PUSCH before DRX active duration in the DRX cycle, as shown in FIG. 10A. The following configuration is met: CG-PUSCH1, SPS-PDSCH1 and WUS-PDCCH precede the DRX active duration, as described above. The transmission structure of CG-PUSCH1 in this case can be that shown by options 1 and 2 in FIG. 10A, similar to options 1 and 2 in FIG. 6A(b).

The second situation is a case that the DL arrival jitter is considered, and there contains only two CG-PUSCHs before the DRX active duration in DRX cycle, as shown in FIG. 10B. The following configuration is met: two CG-PUSCHs, SPS-PDSCH1 and WUS-PDCCH precede the DRX active duration, as described above. The transmission structure of CG-PUSCH in this case can be that shown as options 1 and 2 in FIG. 10B, similar to options 1 and 2 in FIG. 6B(b).

Figure 11:
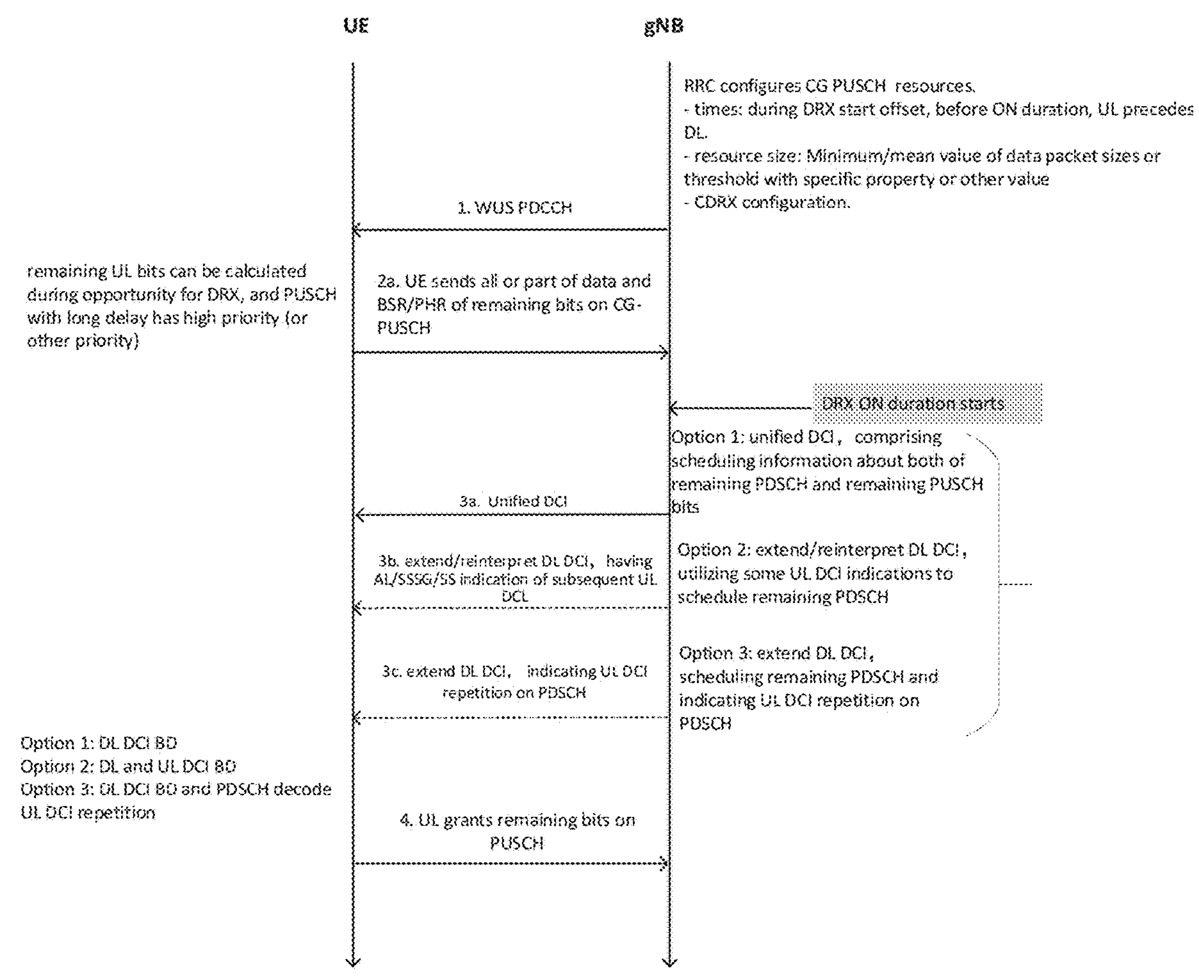
FIG. 11 shows a signaling diagram of uplink data transmission in a dynamic scheduling scheme according to an embodiment of the present disclosure.

The communication between the control-side device (e.g., gNB) and the terminal-side device (e.g., UE) applying the fourth embodiment described above will be described below with reference to FIG. 11, which shows a signaling diagram for uplink data transmission in a dynamic scheduling scheme according to an embodiment of the present disclosure, in which periodic uplink data transmission is combined with dynamic data scheduling, and optimized scheduling control information is further utilized.

Figure 9:
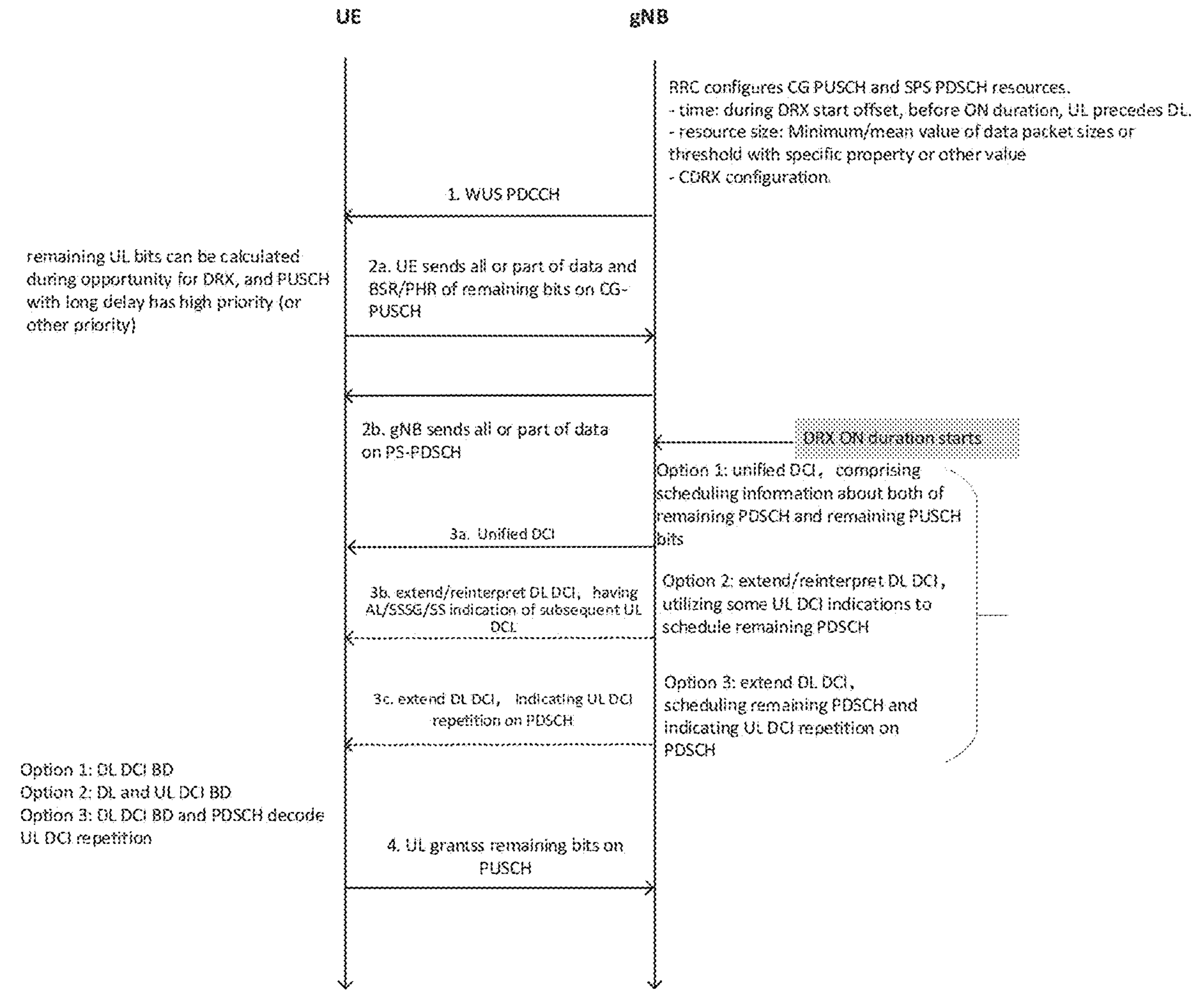
FIG. 9 shows a signaling diagram of both downlink data transmission and uplink data transmission in a dynamic scheduling scheme according to an embodiment of the present disclosure.

The signaling diagram here is basically the same as the signaling diagram shown in FIG. 9, and the main difference lies in operations before the active duration in the data transmission cycle. Specifically, after having monitored WUS, the UE starts the uplink data transmission with the gNB, in which the UE sends all or part of data and the BSR/PHR of the remaining data/bits to the gNB through CG-PUSCH. Here, the remaining UL bits are calculated based on the length of the inactive duration in the data transmission cycle (e.g., the inactive duration in DRX). And PUSCH can be set with appropriate priority, for example, PUSCH with long delay can be set with high priority or other appropriate priority.

In this way, the gNB can generate DCI for the remaining data/bits uploaded as well as the downlink data from the gNB to the UE, so that dynamically scheduled transmissions can be performed.

A fifth embodiment according to the present disclosure will be described below with reference to FIGS. 12A and 12B, which illustrate a solution according to the fifth embodiment of the present disclosure in which it is configured that SPS-PDSCH scheduling is combined with dynamic scheduling. The fifth embodiment and the first embodiment differ only in that the CG-PUSCH process is replaced by a standard existing uplink dynamic scheduling process, and the dynamically scheduled uplink data includes all uplink data that needs to be transmitted up to the current time moment, instead of the remaining unscheduled data transmitted by SPS-PDSCH.

Figure 12A:
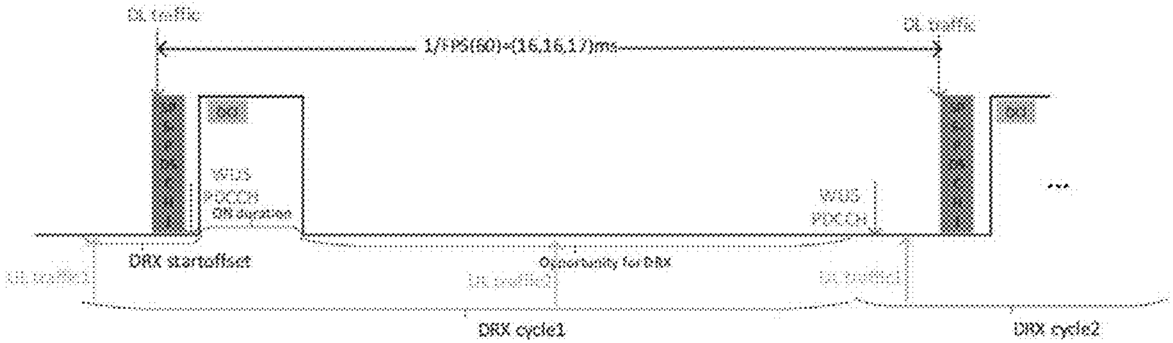
FIGS. 12A and 12B show a schematic structural diagram of downlink data transmission in a dynamic scheduling scheme according to a fifth embodiment of the present disclosure.
Figure 12B:
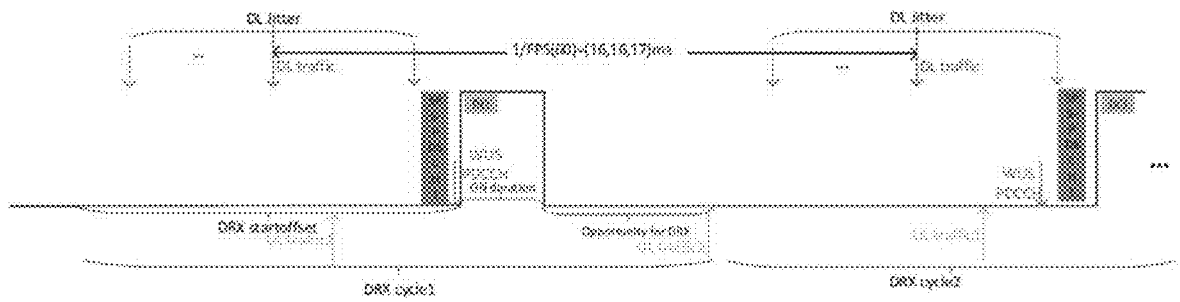

FIG. 12A shows a case where DL arrival jitter is not considered, and FIG. 12B shows a case where DL arrival jitter is considered. Although not shown, the SPS-PDSCH transmission structure in this embodiment may be similar to that described in FIGS. 8A(a) and 8B(b).

Figure 13:
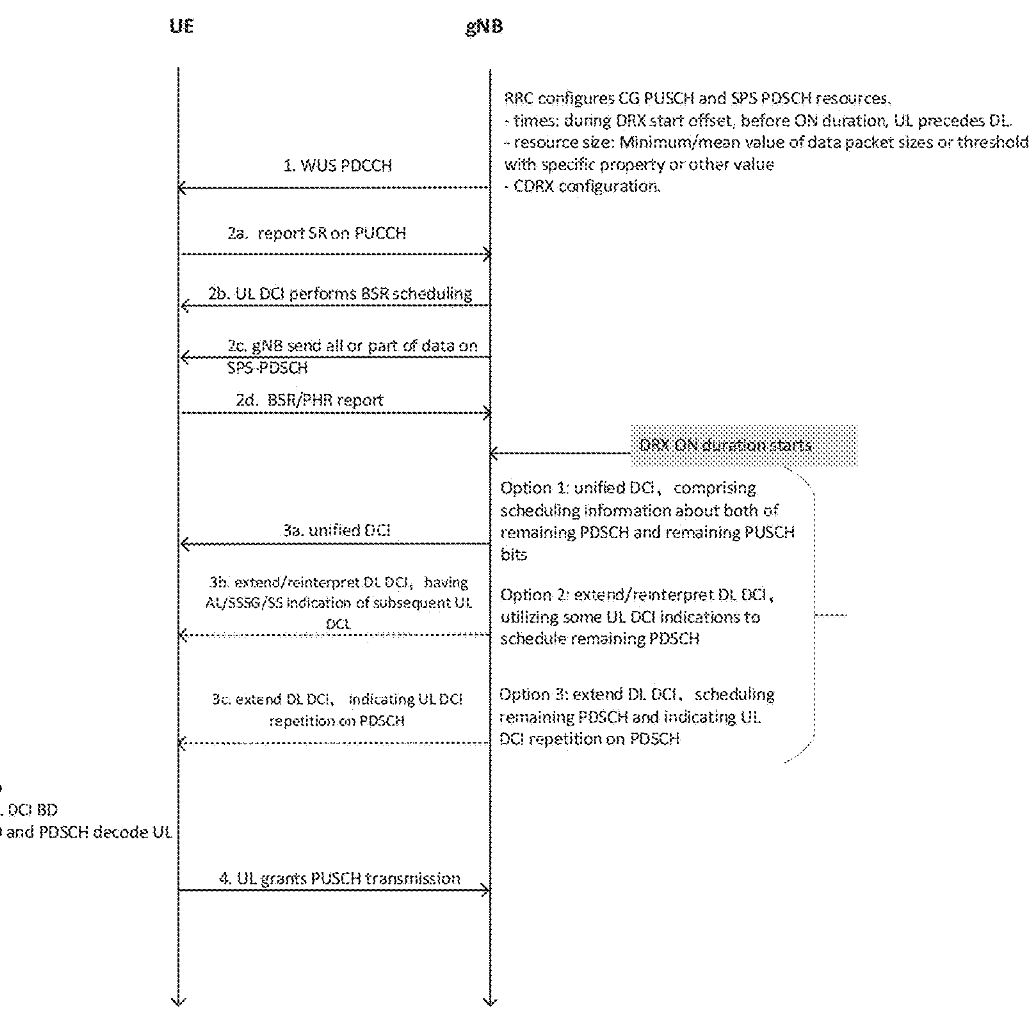
FIG. 13 shows a signaling diagram of downlink data transmission in a dynamic scheduling scheme according to an embodiment of the present disclosure.

The communication between the control-side device (e.g., gNB) and the terminal-side device (e.g., UE) applying the fifth embodiment described above will be described below with reference to FIG. 13, which shows a signaling diagram for downlink data transmission in a dynamic scheduling scheme according to an embodiment of the present disclosure, in which periodic downlink data transmission is combined with dynamic data scheduling, and optimized scheduling control information can be further utilized.

The signaling diagram here is basically the same as the signaling diagram shown in FIG. 9, the main difference lies in the operations before the active duration in the data transmission cycle. Specifically, after having monitored WUS, the UE performs SR reporting on PUCCH. The gNB generates UL DCI for BSR scheduling and sends it to the UE. In addition, the gNB also downlinks all or part of the data to the UE on the SPS-PDSCH. The UE can acquire the UL DCI through detection and decoding, and report BSR/PHR of the uploaded data to the gNB.

In this way, gNB can generate DCI for uploaded data and remaining downlink data from gNB to UE, so that dynamic scheduling transmission can be performed.

In the structural example of the above device, the electronic device 300 or its processing circuit 302 may be in various suitable forms and may be implemented in various suitable ways, as described above for the processing circuit 322, which will not be detailed here.

According to one embodiment, the processing circuit 302 may include various units for correspondingly implementing the above operations, for example, an acquisition unit 304 configured to acquire relevant information about data to be dynamically scheduled between the control-side electronic device and the terminal-side electronic device; a generation unit 306 configured to generate dynamic scheduling control information indicating configuration for data dynamic scheduling with respect to the acquired relevant information; and a sending unit 308 configured to send the generated dynamic scheduling control information to the terminal-side electronic device in the wireless communication system.

In some embodiments, the processing circuit 302 may further include a configuration unit 310 configured to configure a data communication cycle and configuration parameters of data transmission based on predetermined resources according to the terminal-side data traffic information in the wireless communication system. In some embodiments, the processing circuit 302 may further include a data transmission unit 312, for example, configured to transmit data by using preset resources and/or dynamically allocated resources. However, as shown by the dotted line, the configuration unit and data transmission unit do not have to be included in the processing circuit, they can be located outside the processing circuit, even outside the electronic device 300, in particular, the configuration parameters can be configured by other devices in the system and notified to the electronic device 300.

In addition, the control-side electronic device 300 may also include other components not shown, such as memory, radio frequency link, baseband processing unit, network interface, controller, etc., which will not be described in detail here, as described above for the control-side electronics 320.

The method for the control side of the wireless communication system according to an embodiment of the present disclosure will be described below with reference to the figures. FIG. 5B shows a flowchart of the method 500 for the control side of the wireless communication system according to an embodiment of the present disclosure.

In step S501 (referred to as acquiring step), acquire relevant information about data to be dynamically scheduled between the control-side electronic device and the terminal-side electronic device;

In step S502 (referred to as generating step), generate dynamic scheduling control information indicating configuration for data dynamic scheduling with respect to the acquired relevant information; and In step S503 (referred to as sending step), send the generated dynamic scheduling control information to the terminal-side electronic device in the wireless communication system.

In addition, the method may also include corresponding steps to implement the operations performed by the control-side electronic device 300 as described above, particularly including a configuration step for parameter configuration and a data transmission step, wherein the configuration step may precede the acquisition step, the data transmission step can precede the acquisition step and/or after the sending step. It should be noted that these steps may be performed by the control-side electronic device according to the present disclosure as described above, particularly by corresponding units of the control-side electronic device according to the present disclosure as described above.

Figure 14:
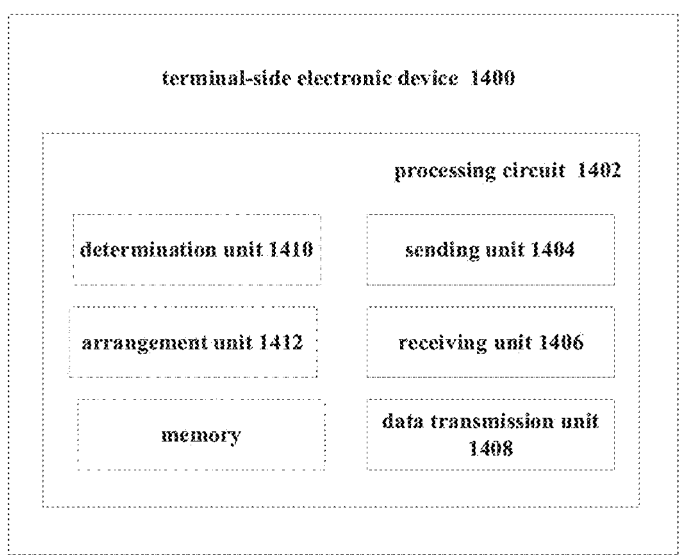
FIG. 14 shows a block diagram of a terminal-side electronic device in a wireless communication system according to an embodiment of the present disclosure.

A terminal-side electronic device of a wireless communication system according to an embodiment of the present disclosure will be described below. FIG. 14 shows a block diagram of a terminal-side electronic device according to an embodiment of the present disclosure. The terminal-side electronic device 1400 can perform data transmission based on predetermined resources with the control-side electronic device in the wireless communication system in a data communication cycle. The terminal-side electronic device 1400 includes a processing circuit 1402 configured to send relevant information about data to be dynamically scheduled between the control-side electronic device and the terminal-side electronic device to the control-side electronic device based on the predetermined source; receive dynamic scheduling control information indicating data dynamic scheduling configuration that is from the control-side electronic device and is generated with respect to the acquired relevant information; and send an output to the control-side electronic device based on dynamic resources indicated by the dynamic scheduling control information.

According to an embodiment of the present disclosure, the processing circuit is further configured to determine data to be dynamically scheduled, wherein the data to be dynamically scheduled may correspond to remaining data that can be obtained by deducting the transmitted data that has been carried by at least one data transmission channel before the active duration in the current data transmission cycle from the data that need to be transmitted up to the active duration in the current data transmission cycle, and the relevant information may include a buffer status report (BSR) or a power headroom report (PHR) for the remaining data. In some embodiments, the remaining data relates to at least one of the following: remaining data in the data that needs to be sent before the active duration in the current data transmission cycle that has not sent through resources of the data transmission channel; and the remaining data that has not been sent in the previous data transmission cycle.

According to an embodiment of the present disclosure, the processing circuit is further configured to arrange content that is carried in at least one data transmission channel before the active duration in the data transmission cycle, as described above, and will not be described in detail here.

According to an embodiment of the present disclosure, the dynamic scheduling control information received by the terminal-side electronic device may be set such that the times of detection operations performed by the terminal-side device on the dynamic scheduling control information is reduced. It may take various suitable forms and/or contain various suitable information, as mentioned above, and will not be described in detail here.

It should be noted that the terminal-side electronic device 1400 can be implemented in various appropriate ways, and in particular can be implemented in a similar manner with the control-side electronic device 300. For example, various units may be included to implement the aforementioned operations/functions, such as the sending unit 1404 for sending relevant information about data to be dynamically scheduled, the receiving unit 1406 for receiving the dynamic scheduling control information, and the data transmission unit 1408 for performing data transmission based on dynamic resources indicated by dynamic scheduling control information.

In addition, the processing circuit 1402 may further include a determination unit 1410 for determining data to be dynamically scheduled, and an arrangement unit 1412 for arranging data and/or indication information about the data to be dynamically scheduled on the data transmission channel. It should be noted that, as shown by the dotted line, the determination unit 1410 and the arrangement unit 1412 do not have to be included in the processing circuit, they can be located outside the processing circuit, or even outside the terminal-side electronic device, and their functions are implemented by other devices in the system which send information to the terminal-side electronic device.

Figure 15:
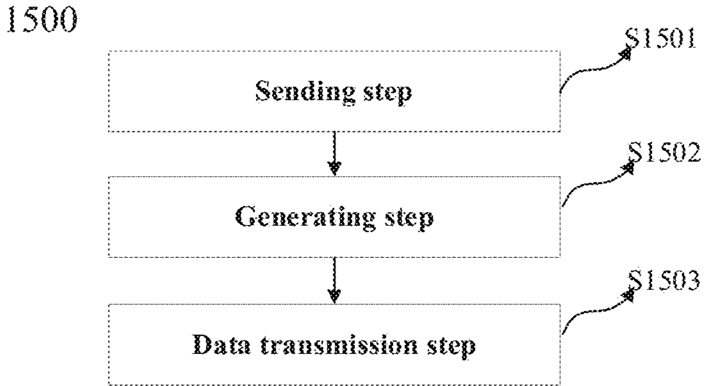
FIG. 15 shows a flowchart of a method for a terminal side in a wireless communication system according to an embodiment of the present disclosure.

A method for a terminal side in a wireless communication system according to an embodiment of the present disclosure will be described below with reference to the drawings. FIG. 15 shows a flowchart of a method 1500 for a terminal side in a wireless communication system according to an embodiment of the present disclosure.

In step S1501 (called a sending step), relevant information about data to be dynamically scheduled between the control-side electronic device and the terminal-side electronic device is sent to the control-side electronic device based on predetermined resources;

In step S1502 (called as a receiving step), dynamic scheduling control information indicating data dynamic scheduling configuration that is from the control-side electronic device and generated for the acquired relevant information is received; and In step S1503 (configured as a data transmission step), the output is sent to the control-side electronic device based on dynamic resources indicated by the dynamic scheduling control information.

In addition, the method may also include corresponding steps for implementing the operations performed by the terminal-side electronic device described above, particularly including a determining step for determining data to be dynamically scheduled, and an arranging step for arranging data and/or indication information about data to be dynamically scheduled on the data transmission channel. These two steps can be performed before step S1501. It should be noted that these steps may be performed by the terminal-side electronic device according to the present disclosure described above, particularly by corresponding units of the terminal-side electronic device according to the present disclosure described above.

It should be noted that the above description is only exemplary. The embodiments of the present disclosure can also be executed in any other appropriate way, and still can achieve the advantageous effects obtained by the embodiments according to the present disclosure. Furthermore, the embodiments of the present disclosure can also be applied to other similar application instances, and the advantageous effects obtained by embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but not limited to, a floppy disk, an optical disk, a magneto-optical disk, a storage card, a memory stick, and the like.

Figure 16:
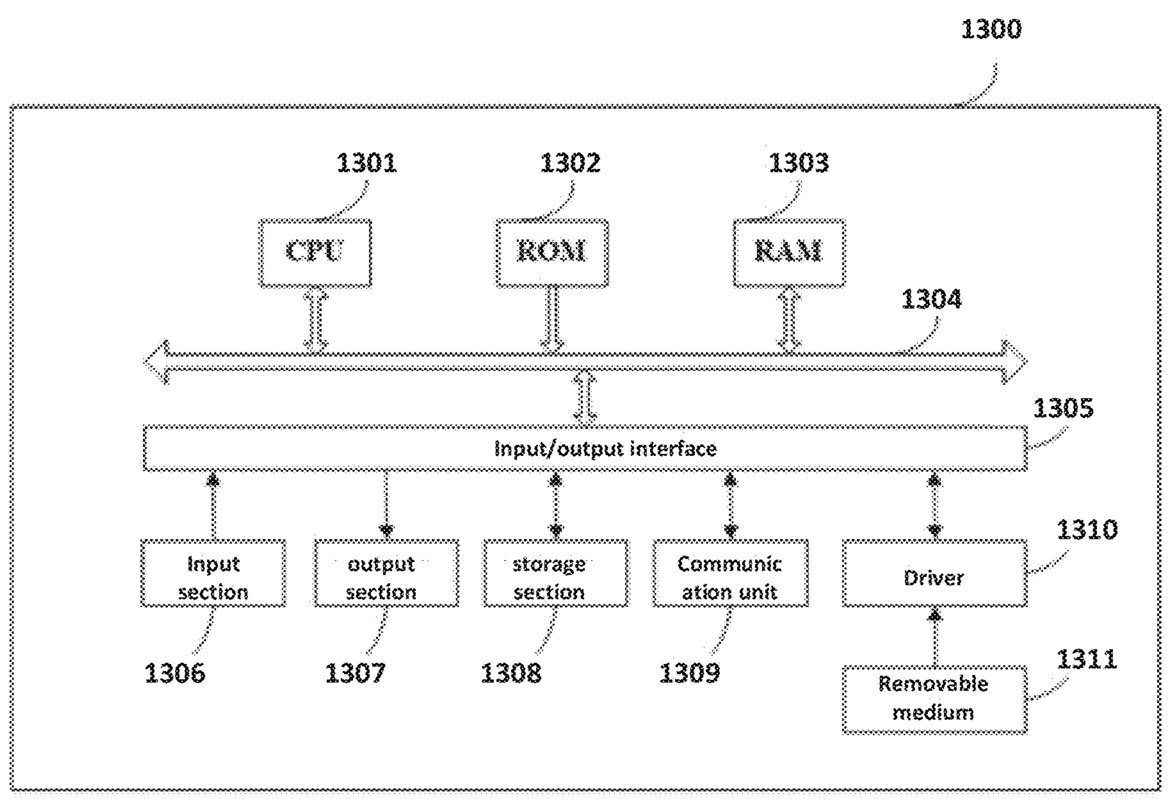
FIG. 16 schematically illustrates a block diagram of an exemplary structure of a personal computer as an information processing device that can be employed in an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1600 shown in FIG. 16, and the computer can perform a variety of functions by installing various programs thereon. FIG. 16 is a block diagram illustrating an example structure of a personal computer as an information processing apparatus that can be adopted in an embodiment of the present disclosure. In one example, the personal computer may correspond to the above-described exemplary terminal-side electronic device or control-side electronic device according to the present disclosure.

In FIG. 16, a central processing unit (CPU) 1601 performs various processes according to a program stored in a read only memory (ROM) 1602 or a program loaded from a storage section 1608 to a random-access memory (RAM) 1603. In the RAM 1603, data required when the CPU 1601 executes various processes and the like is also stored as necessary.

The CPU 1601, the ROM 1602, and the RAM 1603 are connected to each other via a bus 1604. An input/output interface 1605 is also connected to the bus 1604.

The following components are connected to the input/output interface 1605: an input section 1606 including a keyboard, a mouse, etc.; an output section 1607 including a display, such as a cathode ray tube (CRT), a liquid crystal display (LCD), etc., and a speaker, etc.; a storage section 1608 including hard disks, etc.; and communication section 1609 including network interface cards such as LAN cards, modems, etc. The communication section 1609 performs communication processing via a network such as the Internet.

A driver 1610 is also connected to the input/output interface 1605 as needed. A removable medium 1611 such as a magnetic disk, an optical disk, a magneto-optical disk, a semiconductor memory, etc. is installed on the drive 1610 as needed, so that a computer program read out therefrom can be installed into the storage section 1608 as needed.

In a case where the above-mentioned processes are realized by a software, the programs constituting the software are installed from a network such as the Internet or a storage medium such as a removable medium 1611.

Those skilled in the art should understand that such a storage medium is not limited to the removable medium 1611 shown in FIG. 16 in which the program is stored and which is distributed separately from the device to provide the program to the user. Examples of the removable medium 1611 include a magnetic disk (including a floppy disk (registered trademark)), an optical disk (including a Compact disc read-only memory (CD-ROM) and a digital versatile disk (DVD)), and a magneto-optical disk (including a mini disk (MD) (registered trademark)) and semiconductor memory. Alternatively, the storage medium may be the ROM 1602, a hard disk included in the storage section 1608, and the like, in which programs are stored and which are distributed to users along with the device containing them.

The technology of the present disclosure can be applied to various products.

For example, the control-side electronic devices according to embodiments of the present disclosure can be implemented as a variety of control devices/base stations, or be included therein. For example, the transmitting-side electronic device and/or terminal electronic device according to embodiments of the present disclosure can be implemented as a variety of terminal devices or be included in a variety of terminal devices.

For example, the transmitting-side electronic device/base stations mentioned in this disclosure can be implemented as any type of base station, for example, evolved Node B (eNB), such as macro eNB and small eNB. A small eNB may be an eNB covering a cell smaller than a macro cell, such as a pico eNB, a micro eNB, and a home (femto) eNB. Furthermore, for example, the transmitting-side electronic device/base stations can be implemented as gNB, such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, in some embodiments, the terminal device mentioned in this disclosure can be implemented as a mobile terminal such as a smart phone, a tablet personal computer (PC), a notebook PC, a portable gaming terminal, a portable/dongle Mobile routers and digital cameras, or vehicle terminals such as vehicle navigation equipment. The terminal device can also be implemented as a terminal that performs machine-to-machine (M2M) communication, also called as a machine type communication (MTC) terminal. In addition, the terminal device may be a wireless communication module mounted on each of the terminals described above, such as an integrated circuit module including a single chip.

Examples according to the present disclosure will be described below with reference to the figures.

[Example of Base Station]

It should be understood that the term "base station" in this disclosure has the full breadth of its usual meaning and includes at least a wireless communication station that is used as part of a wireless communication system or radio system for communication. Examples of base stations may be, for example but not limited to, the following: maybe one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE eNB, etc. that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 17:
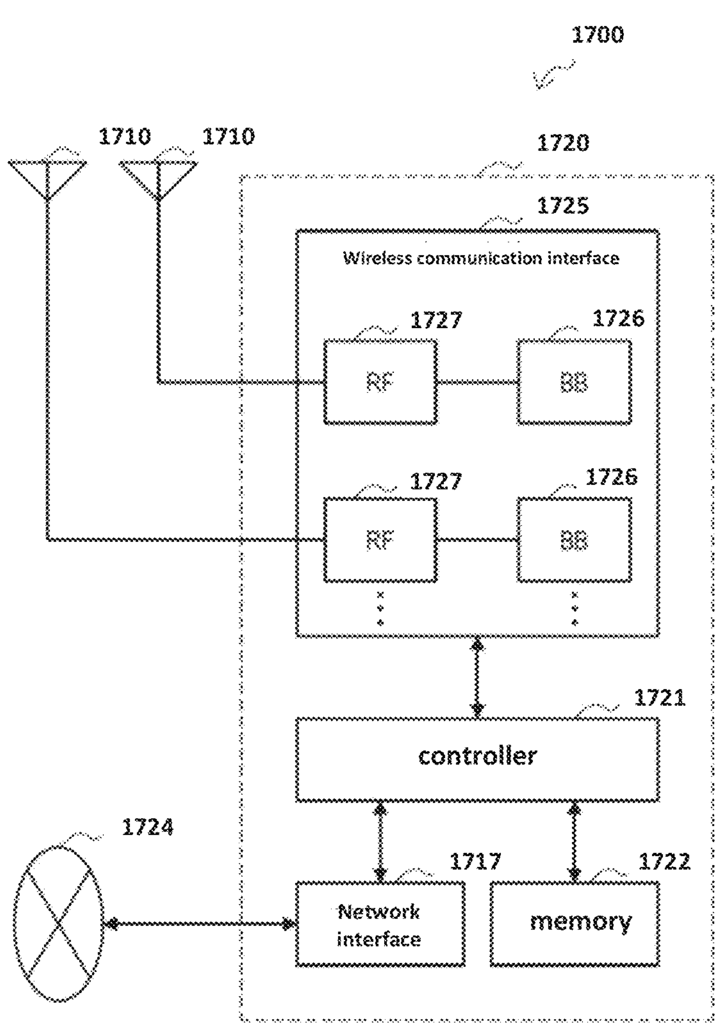
FIG. 17 is a block diagram illustrating a first example of a schematic configuration of an eNB to which the technology of the present disclosure can be applied.

FIG. 17 is a block diagram illustrating a first example of a schematic configuration of a gNB to which the technology of the present disclosure can be applied. The gNB 1700 includes a plurality of antennas 1710 and a base station device 1720. The base station device 1720 and each antenna 1710 may be connected to each other via an RF cable. In an implementation manner, the gNB 1700 (or the base station device 1720) herein may correspond to the above-mentioned transmitting-side and/or receiving-side electronic device.

Each of the antennas 1710 includes a single or multiple antenna elements, such as multiple antenna elements included in a multiple-input multiple-output (MIMO) antenna, and is used for the base station device 1720 to transmit and receive wireless signals. As shown in FIG. 17, the gNB 1700 may include a plurality of antennas 1710. For example, multiple antennas 1710 may be compatible with multiple frequency bands used by gNB 1700.

The base station device 1720 includes a controller 1721, a memory 1722, a network interface 1717, and a wireless communication interface 1725.

The controller 1721 may be, for example, a CPU or a DSP, and operates various functions of the base station device 1720 at a higher layer. For example, the controller 1721 determines position information about a target terminal device in at least one terminal device on the terminal side of a wireless communication system based on the location information and specific position configuration information about the at least one terminal device acquired via a wireless communication interface 1725. The controller 1721 may have logical functions that perform controls such as radio resource control, radio bearer control, mobility management, admission control, and scheduling. The controls can be performed in conjunction with a nearby gNB or core network node. The memory 1722 includes a RAM and a ROM, and stores a program executed by the controller 1721 and various types of control data such as a terminal list, transmission power data, and scheduling data.

The network interface 1717 is a communication interface for connecting the base station device 1720 to the core network 1724. The controller 1721 may communicate with a core network node or another gNB via the network interface 1717. In this case, the gNB 1700 and the core network node or other gNBs may be connected to each other through a logical interface such as an S1 interface and an X2 interface. The network interface 1717 may also be a wired communication interface or a wireless communication interface for a wireless backhaul line. If the network interface 1717 is a wireless communication interface, compared with the frequency band used by the wireless communication interface 1725, the network interface 1717 can use a higher frequency band for wireless communication.

The wireless communication interface 1725 supports any cellular communication scheme such as Long-Term Evolution (LTE) and LTE-Advanced, and provides a wireless connection to a terminal located in a cell of the gNB 1700 via an antenna 1710. The wireless communication interface 1725 may generally include, for example, a baseband (BB) processor 1726 and an RF circuit 1727. The BB processor 1726 may perform, for example, encoding/decoding, modulation/demodulation, and multiplexing/demultiplexing, and execute various types of signal processing in layers such as L1, Medium Access Control (MAC), Radio Link Control (RLC), and Group Data Convergence Protocol (PDCP). As an alternative of the controller 1721, the BB processor 1726 may have a part or all of the above-mentioned logical functions. The BB processor 1726 may be a memory storing a communication control program, or a module including a processor and related circuits configured to execute the program. Updating the program can change the function of the BB processor 1726. The module may be a card or a blade inserted into a slot of the base station device 1720. Alternatively, the module may be a chip mounted on a card or a blade. Meanwhile, the RF circuit 1727 may include, for example, a mixer, a filter, and an amplifier, and transmits and receives a wireless signal via the antenna 1710. Although FIG. 17 illustrates an example in which one RF circuit 1727 is connected to one antenna 1710, the present disclosure is not limited to this illustration, but one RF circuit 1727 may be connected to multiple antennas 1710 at the same time.

As shown in FIG. 17, the wireless communication interface 1725 may include a plurality of BB processors 1726. For example, the plurality of BB processors 1726 may be compatible with multiple frequency bands used by gNB 1700. As shown in FIG. 17, the wireless communication interface 1725 may include a plurality of RF circuits 1727. For example, the plurality of RF circuits 1727 may be compatible with multiple antenna elements. Although FIG. 17 illustrates an example in which the wireless communication interface 1725 includes a plurality of BB processors 1726 and a plurality of RF circuits 1727, the wireless communication interface 1725 may also include a single BB processor 1726 or a single RF circuit 1727.

Second Example

Figure 18:
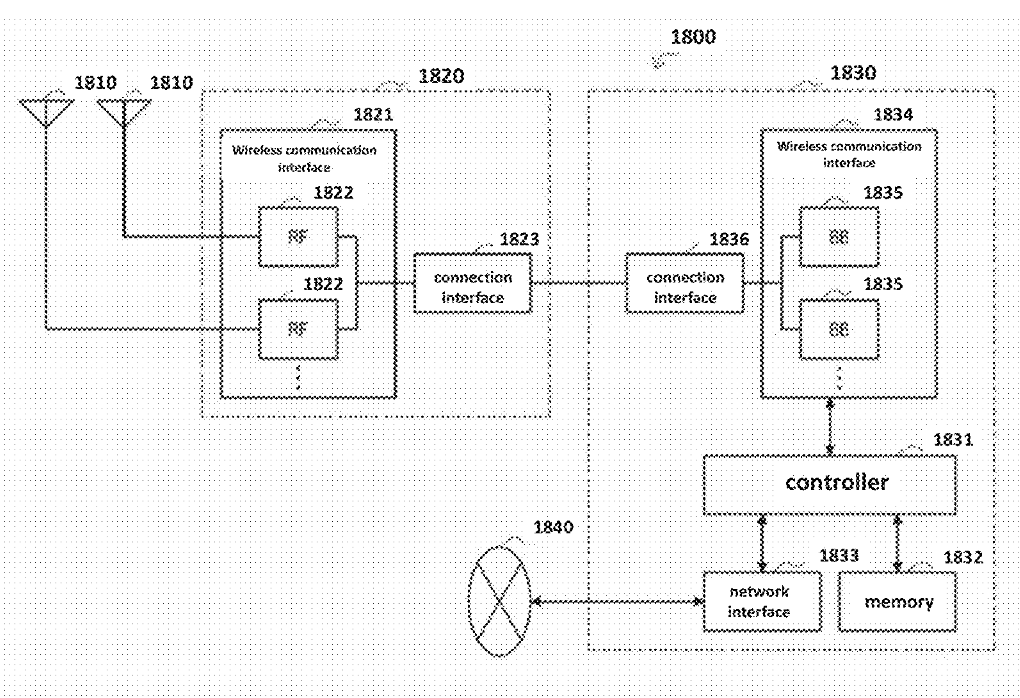
FIG. 18 is a block diagram illustrating a second example of a schematic configuration of an eNB to which the technology of the present disclosure can be applied.

FIG. 18 is a block diagram illustrating a second example of a schematic configuration of a gNB to which the technology of the present disclosure can be applied. The gNB 1800 includes multiple antennas 1810, RRH 1820 and base station equipment 1830. The RRH 1820 and each antenna 1810 may be connected to each other via an RF cable. The base station equipment 1830 and the RRH 1820 may be connected to each other via a high-speed line such as a fiber optic cable. In an implementation manner, the gNB 1800 (or the base station equipment 1830) herein may correspond to the foregoing transmitting-side and/or receiving-side electronic device.

Each of the antennas 1810 includes a single or multiple antenna elements (such as multiple antenna elements included in a MIMO antenna) and is used for RRH 1820 to transmit and receive wireless signals. As shown in FIG. 18, the gNB 1800 may include multiple antennas 1810. For example, multiple antennas 1810 may be compatible with multiple frequency bands used by gNB 1800.

The base station device 1830 includes a controller 1831, a memory 1832, a network interface 1833, a wireless communication interface 1834, and a connection interface 1836. The controller 1831, the memory 1832, and the network interface 1833 are the same as the controller 1721, the memory 1722, and the network interface 1717 described with reference to FIG. 17.

The wireless communication interface 1834 supports any cellular communication scheme such as LTE and LTE-Advanced, and provides wireless communication to a terminal located in a sector corresponding to the RRH 1820 via the RRH 1820 and the antenna 1810. The wireless communication interface 1834 may typically include, for example, a BB processor 1835. The BB processor 1835 is the same as the BB processor 1726 described with reference to FIG. 17 except that the BB processor 1835 is connected to the RF circuit 1822 of the RRH 1820 via the connection interface 1836. As shown in FIG. 18, the wireless communication interface 1834 may include a plurality of BB processors 1835. For example, multiple BB processors 1835 may be compatible with multiple frequency bands used by gNB 1800. Although FIG. 18 illustrates an example in which the wireless communication interface 1834 includes a plurality of BB processors 1835, the wireless communication interface 1834 may also include a single BB processor 1835.

The connection interface 1836 is an interface for connecting the base station device 1830 (wireless communication interface 1834) to the RRH 1820. The connection interface 1836 may also be a communication module for communication in the above-mentioned high-speed line connecting the base station device 1830 (wireless communication interface 1834) to the RRH 1820.

The RRH 1820 includes a connection interface 1823 and a wireless communication interface 1821.

The connection interface 1823 is an interface for connecting the RRH 1820 (wireless communication interface 1821) to the base station device 1830. The connection interface 1823 may also be a communication module for communication in the above-mentioned high-speed line.

The wireless communication interface 1821 transmits and receives wireless signals via the antenna 1810. The wireless communication interface 1821 may generally include, for example, an RF circuit 1822. The RF circuit 1822 may include, for example, a mixer, a filter, and an amplifier, and transmits and receives wireless signals via the antenna 1810. Although FIG. 18 illustrates an example in which one RF circuit 1822 is connected to one antenna 1810, the present disclosure is not limited to this illustration, but one RF circuit 1822 may be connected to multiple antennas 1810 at the same time.

As shown in FIG. 18, the wireless communication interface 1821 may include a plurality of RF circuits 1822. For example, the plurality of RF circuits 1822 may support multiple antenna elements. Although FIG. 18 illustrates an example in which the wireless communication interface 1821 includes a plurality of RF circuits 1822, the wireless communication interface 1821 may include a single RF circuit 1822.

[Example of User Device/Terminal Device]

First Example

Figure 19:
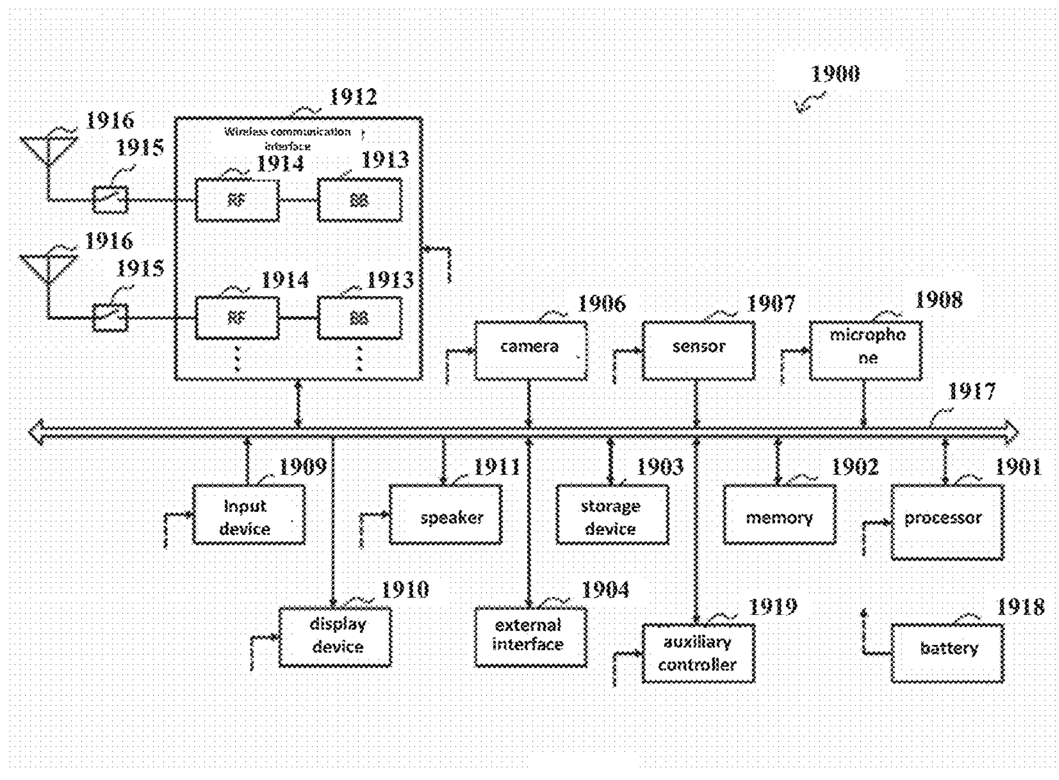
FIG. 19 is a block diagram illustrating an example of a schematic configuration of a smartphone to which the technology of the present disclosure can be applied.

FIG. 19 is a block diagram illustrating an example of a schematic configuration of a communication device 1900, such as smartphone, linker, etc., to which the technology of the present disclosure can be applied. The communication device 1900 includes a processor 1901, a memory 1902, a storage device 1903, an external connection interface 1904, a camera device 1906, a sensor 1907, a microphone 1908, an input device 1909, a display device 1910, a speaker 1911, a wireless communication interface 1912, one or more antenna switches 1915, one or more antennas 1916, a bus 1917, a battery 1918, and an auxiliary controller 1919. In an implementation manner, the communication device 1900 (or the processor 1901) herein may correspond to the foregoing transmitting device or terminal-side electronic device.

The processor 1901 may be, for example, a CPU or a system on chip (SoC), and controls functions of an application layer and another layer of the smartphone 1900. The memory 1902 includes a RAM and a ROM, and stores data and programs executed by the processor 1901. The storage device 1903 may include a storage medium such as a semiconductor memory and a hard disk. The external connection interface 1904 is an interface for connecting external devices such as a memory card and a universal serial bus (USB) device to the smartphone 1900.

The camera device 1906 includes an image sensor such as a charge-coupled device (CCD) and a complementary metal oxide semiconductor (CMOS), and generates a captured image. The sensor 1907 may include a set of sensors such as a measurement sensor, a gyroscope sensor, a geomagnetic sensor, and an acceleration sensor. The microphone 1908 converts a sound input to the smartphone 1900 into an audio signal. The input device 1909 includes, for example, a touch sensor, a keypad, a keyboard, a button, or a switch configured to detect a touch on the screen of the display device 1910, and receives an operation or information input from a user. The display device 1910 includes a screen such as a liquid crystal display (LCD) and an organic light emitting diode (OLED) display, and displays an output image of the smartphone 1900. The speaker 1911 converts an audio signal output from the smartphone 1900 into a sound.

The wireless communication interface 1912 supports any cellular communication scheme such as LTE and LTE-Advanced, and performs wireless communication. The wireless communication interface 1912 may generally include, for example, a BB processor 1913 and an RF circuit 1914. The BB processor 1913 may perform, for example, encoding/decoding, modulation/demodulation, and multiplexing/demultiplexing, and perform various types of signal processing for wireless communication. Meanwhile, the RF circuit 1914 may include, for example, a mixer, a filter, and an amplifier, and transmits and receives wireless signals via the antenna 1916. The wireless communication interface 1912 may be a chip module on which a BB processor 1913 and an RF circuit 1914 are integrated. As shown in FIG. 19, the wireless communication interface 1912 may include multiple BB processors 1913 and multiple RF circuits 1914. Although FIG. 19 illustrates an example in which the wireless communication interface 1912 includes a plurality of BB processors 1913 and a plurality of RF circuits 1914, the wireless communication interface 1912 may also include a single BB processor 1913 or a single RF circuit 1914.

In addition, in addition to the cellular communication scheme, the wireless communication interface 1912 may support other types of wireless communication scheme, such as a short-range wireless communication scheme, a near field communication scheme, and a wireless local area network (LAN) scheme. In this case, the wireless communication interface 1912 may include a BB processor 1913 and an RF circuit 1914 for each wireless communication scheme.

Each of the antenna switches 1915 switches a connection destination of the antenna 1916 between a plurality of circuits included in the wireless communication interface 1912 (for example, circuits for different wireless communication schemes).

Each of the antennas 1916 includes a single or multiple antenna elements, such as multiple antenna elements included in a MIMO antenna, and is used for the wireless communication interface 1912 to transmit and receive wireless signals. As shown in FIG. 19, the smartphone 1900 may include a plurality of antennas 1916. Although FIG. 19 illustrates an example in which the smart phone 1900 includes a plurality of antennas 1916, the smart phone 1900 may also include a single antenna 1916.

In addition, the smartphone 1900 may include an antenna 1916 for each wireless communication scheme. In this case, the antenna switch 1915 may be omitted from the configuration of the smartphone 1900.

The bus 1917 connects the processor 1901, the memory 1902, the storage device 1903, the external connection interface 1904, the camera device 1906, the sensor 1907, the microphone 1908, the input device 1909, the display device 1910, the speaker 1911, the wireless communication interface 1912, and the auxiliary controller 1919 to each other. The battery 1918 supplies power to each block of the smartphone 1900 shown in FIG. 19 via a feeder, and the feeder is partially shown as a dotted line in the figure. The auxiliary controller 1919 operates the minimum necessary functions of the smartphone 1900 in the sleep mode, for example.

Second Example

Figure 20:
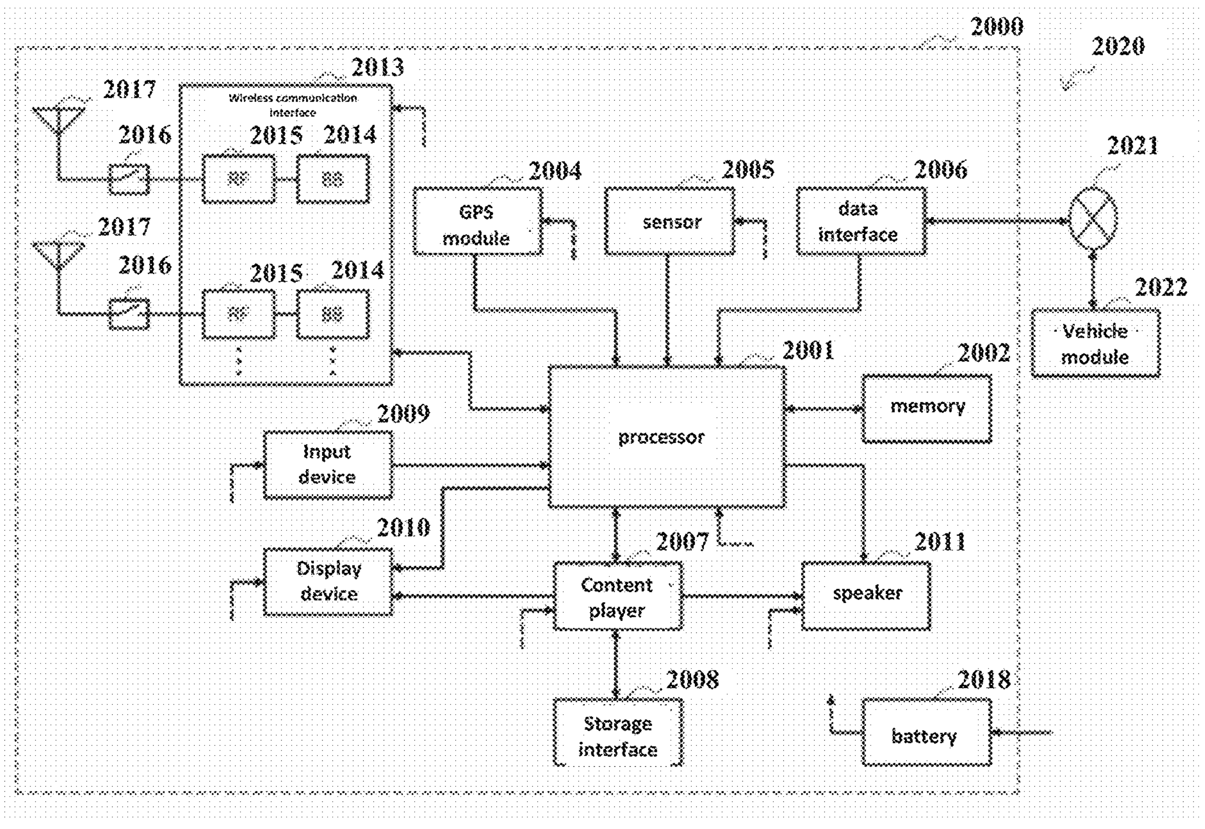
FIG. 20 is a block diagram illustrating an example of a schematic configuration of a vehicle navigation device to which the technology of the present disclosure can be applied.

FIG. 20 is a block diagram illustrating an example of a schematic configuration of a vehicle navigation device 2000 to which the technology of the present disclosure can be applied. The vehicle navigation device 2000 includes a processor 2001, a memory 2002, a global location system (GPS) module 2004, a sensor 2005, a data interface 2006, a content player 2007, a storage medium interface 2008, an input device 2009, a display device 2010, a speaker 2011, and a wireless communication interface 2013, one or more antenna switches 2016, one or more antennas 2017, and a battery 2018. In an implementation manner, the vehicle navigation device 2000 (or the processor 2001) herein may correspond to the transmitting device or terminal-side electronic device.

The processor 2001 may be, for example, a CPU or a SoC, and controls navigation functions and other functions of the vehicle navigation device 2000. The memory 2002 includes a RAM and a ROM, and stores data and programs executed by the processor 2001.

The GPS module 2004 uses a GPS signal received from a GPS satellite to measure the position (such as latitude, longitude, and altitude) of the vehicle navigation device 2000. The sensor 2005 may include a set of sensors such as a gyroscope sensor, a geomagnetic sensor, and an air pressure sensor. The data interface 2006 is connected to, for example, an in-vehicle network 2021 via a terminal not shown, and acquires data (such as vehicle speed data) generated by the vehicle.

The content player 2007 reproduces content stored in a storage medium such as a CD and a DVD, which is inserted into the storage medium interface 2008. The input device 2009 includes, for example, a touch sensor, a button, or a switch configured to detect a touch on the screen of the display device 2010, and receives an operation or information input from a user. The display device 2010 includes a screen such as an LCD or OLED display, and displays an image of a navigation function or reproduced content. The speaker 2011 outputs the sound of the navigation function or the reproduced content.

The wireless communication interface 2013 supports any cellular communication scheme such as LTE and LTE-Advanced, and performs wireless communication. The wireless communication interface 2013 may generally include, for example, a BB processor 2014 and an RF circuit 2015. The BB processor 2014 may perform, for example, encoding/decoding, modulation/demodulation, and multiplexing/demultiplexing, and perform various types of signal processing for wireless communication. Meanwhile, the RF circuit 2015 may include, for example, a mixer, a filter, and an amplifier, and transmit and receive wireless signals via the antenna 2017. The wireless communication interface 2013 may also be a chip module on which a BB processor 2014 and an RF circuit 2015 are integrated. As shown in FIG. 20, the wireless communication interface 2013 may include a plurality of BB processors 2014 and a plurality of RF circuits 2015. Although FIG. 20 illustrates an example in which the wireless communication interface 2013 includes a plurality of BB processors 2014 and a plurality of RF circuits 2015, the wireless communication interface 2013 may also include a single BB processor 2014 or a single RF circuit 2015.

In addition, in addition to the cellular communication scheme, the wireless communication interface 2013 may support other types of wireless communication scheme, such as a short-range wireless communication scheme, a near field communication scheme, and a wireless LAN scheme. In this case, the wireless communication interface 2013 may include a BB processor 2014 and an RF circuit 2015 for each wireless communication scheme.

Each of the antenna switches 2016 switches the connection destination of the antenna 2017 between a plurality of circuits included in the wireless communication interface 2013, such as circuits for different wireless communication schemes.

Each of the antennas 2017 includes a single or multiple antenna element, such as multiple antenna elements included in a MIMO antenna, and is used for the wireless communication interface 2013 to transmit and receive wireless signals. As shown in FIG. 20, the vehicle navigation device 2000 may include a plurality of antennas 2017. Although FIG. 20 illustrates an example in which the vehicle navigation device 2000 includes a plurality of antennas 2017, the vehicle navigation device 2000 may also include a single antenna 2017.

In addition, the vehicle navigation device 2000 may include an antenna 2017 for each wireless communication scheme. In this case, the antenna switch 2016 may be omitted from the configuration of the vehicle navigation device 2000.

The battery 2018 supplies power to each block of the vehicle navigation device 2000 shown in FIG. 20 via a feeder, and the feeder is partially shown as a dotted line in the figure. The battery 2018 accumulates power provided from the vehicle.

The technology of the present disclosure may also be implemented as a vehicle on-board system (or vehicle) 2020 including one or more of a vehicle navigation device 2000, an in-vehicle network 2021, and a vehicle module 2022. The vehicle module 2022 generates vehicle data such as vehicle speed, engine speed, and failure information, and outputs the generated data to the in-vehicle network 2021.

The exemplary embodiments of the present disclosure have been described above with reference to the drawings, but the present disclosure is of course not limited to the above examples. Those skilled in the art may find various alternations and modifications within the scope of the appended claims, and it should be understood that they will naturally fall in the technical scope of the present disclosure.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

In addition, it should be understood that the processes and devices described above may also be implemented by software and/or firmware. In the case of implementation by software and/or firmware, corresponding programs constituting the corresponding software are stored in the storage medium of the related device, and the programs, when executed, can perform various functions.

For example, a plurality of functions included in one unit in the above embodiment can be realized by separate devices. Alternatively, a plurality of functions implemented by multiple units in the above embodiments may be respectively realized by separate devices. In addition, one of the above functions can be realized by multiple units, and such a configuration is also included in the technical scope of this disclosure.

In this specification, the steps described in the flowchart include not only the processes that are executed in time series in the stated order, but also the processes that are executed in parallel or solely instead of necessarily in time series. In addition, even in the step of processing in time series, needless to say, the order can be appropriately changed.

In addition, the method and system of the present disclosure can be implemented in various ways. For example, the methods and systems of the present disclosure may be implemented by software, hardware, firmware, or any combination thereof. The order of the steps of the method described above is only illustrative, and the steps of the method of the present disclosure are not limited to the order specifically described above unless otherwise specified. Furthermore, in some embodiments, the present disclosure can also be embodied as a program recorded in a recording medium, including machine-readable instructions for implementing the method according to the present disclosure. Therefore, the present disclosure also covers a recording medium storing a program for implementing the method according to the present disclosure. Such storage media may include, but not limited to, floppy disks, optical disks, magneto-optical disks, memory cards, memory sticks, and the like.

Those skilled in the art should realize that the boundaries between the above operations are merely illustrative. Multiple operations can be combined into a single operation, the single operation can be distributed among additional operations, and the operations can be performed at least partially overlapping in time. Moreover, alternative embodiments may include multiple instances of specific operations, and the order of operations may be changed in other various embodiments. However, other modifications, variations and substitutions are also possible. Therefore, the specification and drawings should be regarded as illustrative rather than restrictive.

In addition, the embodiments of the present disclosure may also include the following exemplary embodiments (EE).

EE 1. A control-side electronic device in a wireless communication system, the control-side electronic device can perform data transmission based on a predetermined resource with a terminal-side electronic device in the wireless communication system in a data communication cycle, wherein the control-side electronic device comprises a processing circuit, which can be configured to: acquire relevant information about data to be dynamically scheduled between the control-side electronic device and the terminal-side electronic device; generate dynamic scheduling control information indicating data dynamic scheduling configuration based on the acquired relevant information; and send the generated dynamic scheduling control information to the terminal-side electronic device in the wireless communication system, wherein the dynamic scheduling control information is set such that the number of detection operations performed by the terminal-side electronic device on the dynamic scheduling control information is reduced.

EE 2. The control-side electronic device of EE 1, wherein the processing circuit can be further configured to send the dynamic scheduling control information in an active duration in the data communication cycle, and wherein data to be dynamically scheduled can be transmitted during the active duration through dynamically allocated resources indicated by the dynamic scheduling control information.

EE 3. The control-side electronic device of EE 1, wherein the data to be dynamically scheduled comprises at least one of:

data that has not been transmitted completely in uplink data transmission using preset resources;

data that has not been transmitted completely in downlink data transmission using preset resources;

data that is to be transmitted in uplink data transmission without using preset resources;

data that is to be transmitted in downlink data transmission without using preset resources.

EE 4. The control-side electronic device of EE 1, wherein the dynamic scheduling control information can comprise both uplink data scheduling control information and downlink data scheduling control information.

EE 5. The control-side electronic device of EE 1, wherein the dynamic scheduling control information can comprise assistant information which comprises information explicitly defining a configuration that shall be followed when the scheduling control information is to be decoded and detected at the terminal-side device.

EE 6. The control-side electronic device of EE 5, wherein the assistant information can be generated by extending reference scheduling control information or reinterpret a specific field or bit field in the reference scheduling control information.

EE 7. The control-side electronic device of EE 5, wherein the assistant information comprises at least one of format information about scheduling control information and aggregation level information.

EE 8. The control-side electronic device of EE 7, wherein the format information about scheduling control information can indicate whether the latter one in the uplink data scheduling control information and the downlink data scheduling control information has the same format set configuration or format configuration as the previous one.

EE 9. The control-side electronic device of EE 7, wherein the aggregation level indication information may indicate aggregation levels to be detected, wherein the number of aggregation levels to be detected is less than the number of all aggregation levels that can be detected.

EE 10. The control-side electronic device of EE 1, wherein the dynamic scheduling control information can comprise assistant information indicating at least one of uplink and downlink scheduling control information transmitted through a data transmission channel.

EE 11. The control-side electronic device of EE 1, wherein the dynamic scheduling control information can comprise assistant information indicating residual scheduling control information transmitted through the data transmission channel, the residual scheduling control information indicating difference between the total amount of signaling of uplink and downlink scheduling control information intended to be transmitted and the amount of control signaling that can be carried by reference scheduling control information.

EE 12. The control-side electronic device of claim 10 or 11, wherein the assistant information can comprise at least one of occupied time-frequency position, modulation and coding parameters, and the number of repetitions of the scheduling control information or the residual scheduling control information in transmission through the data transmission channel.

EE 13. The control-side electronic device of claim 1, wherein the control-side electronic device is gNB, and/or the terminal-side electronic device is UE.

EE 14. The control-side electronic device of EE 1, wherein the processing circuit is further configured to configure the data communication cycle and configuration parameters for data transmission based on predetermined resources according to information about data traffic at the terminal side in the wireless communication system.

EE 15. The control-side electronic device of EE 1, wherein the data communication cycle is a communication cycle using a discontinuous reception (DRX) mode.

EE 16. The control-side electronic device of EE 1, wherein uplink data transmission using predetermined resources corresponds to periodic CG-PUSCH, and wherein a configuration cycle for CG-PUSCH is configured according to a uplink (UL) traffic cycle, and resource sizes are configured according to distribution configuration of UL traffic data packets, wherein in a case that the UL traffic data packets are non-fixed-size data packets, the resource sizes are configured based on a mathematical statistical value of data packet sizes or a corresponding threshold when occurrence probability of the data packet sizes reaches a certain proportion.

EE 17. The control-side electronic device of EE 1, wherein uplink data transmission using predetermined resources corresponds to periodic SPS-PDSCH, and wherein a configuration cycle for SPS-PDSCH is configured according to a downlink traffic cycle, and resource sizes are configured according to distribution configuration of DL traffic data packets, wherein in a case that the DL traffic data packets are non-fixed-size data packets, the resource sizes can be configured based on a mathematical statistical value of data packet sizes or a corresponding threshold when occurrence probability of the data packet sizes reaches a certain proportion.

EE 18. The control-side electronic device of any one of EEs 15-17, wherein a first CG-PUSCH resource precedes a first SPS-PDSCH resource in the same DRX cycle, and the interval between the first CG-PUSCH resource and the first SPS-PDSCH resource corresponds to a downlink maximum jitter delay or its specific multiple.

EE 19. The control-side electronic device of any one of claims 15-17, wherein at least one CG-PUSCH resource and at least one SPS-PDSCH resource in the same DRX cycle are disposed before an active duration in the DRX cycle.

EE 20. A terminal-side electronic device in a wireless communication system, the terminal-side electronic device in the wireless communication system can perform data communication with a control-side electronic device in the wireless communication system in a data communication cycle, wherein the terminal-side electronic device comprises a processing circuit which is configured as: send relevant information about data to be dynamically scheduled between the control-side electronic device and the terminal-side electronic device to control-side electronic device based on a predetermined source; receive dynamic scheduling control information indicating data dynamic scheduling configuration that is from the control-side electronic device and is generated with respect to the acquired relevant information; and send an output to the control-side electronic device based on dynamic resources indicated by the dynamic scheduling control information.

EE 21. The terminal-side electronic device of EE 20, wherein the processing circuit is configured to send the relevant information about the data to be dynamically scheduled through at least one data transmission channel before an active duration in the current data transmission cycle.

EE 22. The terminal-side electronic device of EE 20, wherein the data to be dynamically scheduled corresponds to data that has not been successfully sent up to the active duration in the current data transmission cycle, and the relevant information comprises Buffering Status Report (BSR) and/or Power Headroom Report (PHR) for the remaining data.

EE 23. The terminal-side electronic device of EE 20, wherein the remaining data is related to at least one of: remaining data that has not been sent through the data transmission channel in data that need to be sent before the active duration in the current data transmission cycle; and remaining data that has not been sent successfully in a previous data transmission cycle.

EE 24. The terminal-side electronic device of EE 20, wherein data can be sent through resources of a data transmission channel before the active duration, and the content carried by the data transmission channel comprise: all data that needs to be sent before the active duration in the current data transmission cycle, or a part of data that needs to be sent before the active duration in the current data transmission cycle and indication information about the rest of data.

EE 25. The terminal-side electronic device of EE 20, wherein, in a case where there is remaining data that has not been successfully sent in a previous data transmission cycle, the content carried by the data transmission channel further comprises: all remaining data that has not been successfully sent in the previous data transmission cycle, or indication information about a part of remaining data that has not been successfully sent in the previous data transmission cycle and the rest of data.

EE 26. The terminal-side electronic device of EE 25, wherein the content carried by the data transmission channel comprise the remaining data that has not been successfully sent in the previous data transmission cycle, and a part of data to be sent in the current transmission cycle, and indication information about the remaining data, which are arranged in the stated order sequentially.

EE 27. The terminal-side electronic device of EE 26, wherein the remaining data that has not been successfully sent in the previous data transmission cycle comprises remaining data in at least one data transmission channel in an inactive duration of the previous data transmission cycle that is sorted in order of at least one data transmission channel in the previous data transmission cycle.

EE 28. The terminal-side electronic device of EE 20, wherein data can be sent through resources of two or more data transmission channels before the active duration, and wherein data transmission channels among the resources of the two or more data transmission channels, except for a data transmission channel closest to the active duration, respectively carry all or part of data allocated to the data transmission channels, and content carried by the data transmission channel among the resources of the two or more data transmission channels closest to the active duration comprises: all or part of data allocated to the data transmission channel, and indication information about a part of data that has not been carried by each data transmission channel among the two or more data transmission channels.

EE 29. The terminal-side electronic device of EE 28, wherein, in the content carried by the data transmission channel among the resources of the two or more data transmission channels closest to the active duration, a part of data for each data transmission channel is arranged in the order of data transmission channels.

EE 30. The terminal-side electronic device of EE 28, wherein in a case where there is remaining data that has not been successfully sent in a previous data transmission cycle, the content carried by the data transmission channel among the resources of the two or more data transmission closet to the active duration further comprise: all remaining data that has not been successfully sent in the previous data transmission cycle, indication information about remaining data that has not been successfully sent in the previous data transmission cycle, or a part of the remaining data that has not been successfully sent in the previous data transmission cycle and indication information about of the rest part of the remaining data.

EE 31. The terminal-side electronic device of EE 29, wherein the content carried by the data transmission channel comprise the remaining data that has not been successfully sent in a previous data transmission cycle, a part of data to be sent by each data transmission channel in the current transmission cycle, and indication information about the remaining data, which are arranged in sequence.

EE 32. The terminal side electronic device of EE 28, wherein in order of the remaining data that has not been successfully sent in a previous data transmission cycle and data to be sent through each data transmission channel starting from the first data transmission channel in the current data transmission cycle, data is arranged in two or more data transmission channels starting from the first data transmission channel, until all data transmission channels are arranged, and the indication information about the remaining data is arranged finally.

EE 33. The terminal-side electronic device of EE 20, wherein the dynamic scheduling control information is set such that the number of detection operations performed by the terminal-side device on the dynamic scheduling control information is reduced.

EE 34. The terminal-side electronic device of EE 33, wherein the dynamic scheduling control information can comprise both uplink data scheduling control information and downlink data scheduling control information.

EE 35. The terminal-side electronic device of EE 33, wherein the dynamic scheduling control information can comprise assistant information which comprises information explicitly defining a configuration that shall be followed when the scheduling control information is to be decoded and detected at the terminal-side device.

EE 36. The terminal-side electronic device of EE 35, wherein the assistant information may comprise format information about scheduling control information which can indicate whether the latter one in the uplink data scheduling control information and the downlink data scheduling control information has the same format set configuration or format configuration as the previous one, wherein when the format information indicates the same format set configuration or format configuration, the latter scheduling control information can be detected on candidate channels covered by the same format set or format in a search space set, and when the format information indicates different format set configuration or format configuration, the latter scheduling control information can be detected on candidate channels covered by different format sets or formats in the search space set.

EE 37. The terminal-side electronic device of EE 33, wherein the dynamic scheduling control information can comprise assistant information indicating at least one of uplink and downlink scheduling control information transmitted through a data transmission channel.

EE 38. The terminal-side electronic device of EE 33, wherein the dynamic scheduling control information can comprise assistant information indicating residual scheduling control information transmitted through the data transmission channel, the residual scheduling control information indicating difference between the total amount of signaling of uplink and downlink scheduling control information intended to be transmitted and the amount of control signaling that can be carried by reference scheduling control information.

EE 39. A method for a control side in a wireless communication system, a control-side electronic device in the wireless communication system can perform data transmission based on a predetermined resource with a terminal-side electronic device in the wireless communication system in a data communication cycle, wherein the method comprises: acquiring relevant information about data to be dynamically scheduled between the control-side electronic device and the terminal-side electronic device; generating dynamic scheduling control information indicating data dynamic scheduling configuration with respect to the acquired relevant information; and sending the generated dynamic scheduling control information to the terminal-side electronic device in the wireless communication system, wherein the dynamic scheduling control information is set such that the number of detection operations performed by the terminal-side device on the control information related to wireless communication is reduced.

EE 40. A method for a terminal side in a wireless communication system, a terminal-side electronic device can perform data transmission based on a predetermined resource with a control-side electronic device in the wireless communication system in a data communication cycle, wherein the method comprises: sending relevant information about data to be dynamically scheduled between the control-side electronic device and the terminal-side electronic device to the control-side electronic device in a predetermined source; receiving dynamic scheduling control information indicating data dynamic scheduling configuration that is from the control-side electronic device and is generated with respect to the acquired relevant information; and sending an output to the control-side electronic device based on dynamic resources indicated by the dynamic scheduling control information.

EE 41. A device, comprising:

at least one processor; and at least one storage device storing instructions thereon, wherein the instructions, when executed by the at least one processor, cause the at least one processor to perform the method of EE 39 or 40.

EE 42. A storage medium storing instructions which, when executed by a processor, enable execution of the method of EE 39 or 40.

EE 43. A computer program product comprising instructions which, when executed by a processor, enable execution of the method of EE 39 or 40.

EE 44. A computer program comprising instructions which, when executed by a computer, enable execution of the method of EE 39 or 40.

EE 45. A wireless communication apparatus comprising means for implementing the method of EE 39 or 40.

Although the present disclosure and its advantages have been described in detail, it should be understood that various changes, substitutions and alterations can be made hereto without departing from the spirit and scope of the present disclosure as defined by the appended claims. Furthermore, the terms “including”, “comprising”, or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence “including a . . . " do not exclude the existence of other identical elements in the process, method, article, or equipment including the elements.

Although some specific embodiments of the present disclosure have been described in detail, those skilled in the art should understand that the above-described embodiments are merely illustrative and do not limit the scope of the present disclosure. Those skilled in the art should understand that the above-described embodiments may be combined, modified, or replaced without departing from the scope and essence of the present disclosure. The scope of the present disclosure is defined by the appended claims.

What is claimed is:

1. A control-side electronic device in a wireless communication system, the control-side electronic device being capable of performing transmission with a terminal-side electronic device in the wireless communication system, wherein the control-side electronic device comprises:

at least one processor; and at least one storage device comprising computer program codes, wherein the at least one storage device and the computer program codes are configured to, through the at least one processor, cause the control-side electronic device to perform:

acquiring control information related to wireless communication between the control-side electronic device and the terminal-side electronic device, and sending the acquired control information to the terminal-side electronic device in the wireless communication system, wherein the control information is set such that the number of detection operations performed by the terminal-side electronic device on the control information in wireless communication is reduced, and wherein, the control information comprises assistant information which comprises information indicating that when subsequent control information after the control information is to be detected in wireless communication, a detection range is reduced.

2. The control-side electronic device of claim 1, wherein the assistant information comprises format information about control information indicating whether subsequent control information has the same format configuration as the control information, wherein, when the format information about control information indicates that the subsequent control information has the same format configuration as the control information, detection of subsequent control information is only performed in a detection range corresponding to the same format configuration, and wherein, when the format information about control information indicates that the subsequent control information has a different format configuration from the control information, then detection of subsequent control information is only performed in a detection range corresponding to the different format configuration.

3. The control-side electronic device of claim 1, wherein the assistant information comprises at least one of aggregation level information indicating that an aggregation level for detection of subsequent control information is reduced, or aggregation level information indicating whether an aggregation level for detection of subsequent control information is the same as the aggregation level for the control information, wherein, when the aggregation level information indicates that the aggregation level for detection of subsequent control information is the same as the aggregation level for the control information, then detection of subsequent control information is only performed in the same aggregation level, and wherein, when the aggregation level information indicates that the aggregation level for detection of subsequent control information is different from the aggregation level for the control information, detection of subsequent control information is only performed in different aggregation levels.

4. The control-side electronic device of claim 1, wherein the assistant information comprises at least one of: search space information indicating that a search space for detection of subsequent control information is reduced, or search space information indicating whether a search space or a search space set for detection of subsequent control information is the same as the search space or search space set for the control information, wherein, when the search space information indicates that the search space or the search space set for detection of subsequent control information is the same as the search space or the search space set for the control information, then the detection of subsequent control information is only performed in the same search space or search space set, and wherein, when the search space information indicates that the search space or the search space set for detection of subsequent control information is different from the search space or the search space set for the control information, then the detection of subsequent control information is only performed in different search space or search space set.

5. The control-side electronic device of claim 1, wherein the assistant information further comprises at least one of: applicable status information indicating that the indication of detection range reduction given in the assistant information is applicable to a specific amount of subsequent control information, or enable indication information which indicates whether at least one of the indication of detection range reduction or the applicable status of the indication of detection range reduction to subsequent control information given in the assistant information takes effect.

6. The control-side electronic device of claim 1, wherein whether at least one of the indication of detection range reduction or applicable status of the indication of detection range reduction to subsequent control information given in the assistant information takes effect is indicated by a specific control device in the wireless communication system or indicated explicitly or implicitly by specific signaling.

7. The control-side electronic device of claim 1, wherein the at least one storage device and the computer program codes are configured to, through the at least one processor, cause the control-side electronic device to perform: extending reference control information or reinterpreting a specific field or bit field in the reference control information to generate the assistant information.

8. The control-side electronic device of claim 1, wherein the control information is any one of scheduling control information and non-scheduling control information, and wherein subsequent control information subsequent to the control information comprises at least one of scheduling control information and non-scheduling control information.

9. A method for a control side in a wireless communication system, wherein a control-side electronic device in the wireless communication system being capable of performing transmission with a terminal-side electronic device in the wireless communication system, wherein the method comprises:

acquiring control information related to wireless communication between the control-side electronic device and the terminal-side electronic device, and sending the acquired control information to the terminal-side electronic device in the wireless communication system, wherein the control information is set such that the number of detection operations performed by the terminal-side device on the control information in wireless communication is reduced, and wherein, the control information comprises assistant information which comprises information indicating that for subsequent control information after the control information to be detected in wireless communication, a detection range is reduced.

10. A non-transitory storage medium storing instructions which, when executed by a processor, enable a control-side electronic device in a wireless communication system, which is capable of performing transmission with a terminal-side electronic device in the wireless communication system, to perform:

acquiring control information related to wireless communication between the control-side electronic device and the terminal-side electronic device, and sending the acquired control information to the terminal-side electronic device in the wireless communication system, wherein the control information is set such that the number of detection operations performed by the terminal-side electronic device on the control information in wireless communication is reduced, and wherein, the control information comprises assistant information which comprises information indicating that for subsequent control information after the control information to be detected in wireless communication, a detection range is reduced.

11. The method of claim 9, wherein the assistant information comprises format information about control information indicating whether subsequent control information has the same format configuration as the control information, wherein, under a condition where the format information about control information indicates that the subsequent control information has the same format configuration as the control information, detection of subsequent control information is only performed in a detection range corresponding to the same format configuration, and wherein, under a condition where the format information about control information indicates that the subsequent control information has a different format configuration from the control information, then detection of subsequent control information is only performed in a detection range corresponding to the different format configuration.

12. The method of claim 9, wherein the assistant information comprises at least one of aggregation level information indicating that an aggregation level for detection of subsequent control information is reduced, or aggregation level information indicating whether an aggregation level for detection of subsequent control information is the same as the aggregation level for the control information, wherein, under a condition where the aggregation level information indicates that the aggregation level for detection of subsequent control information is the same as the aggregation level for the control information, then detection of subsequent control information is only performed in the same aggregation level, and wherein, under a condition where the aggregation level information indicates that the aggregation level for detection of subsequent control information is different from the aggregation level for the control information, detection of subsequent control information is only performed in different aggregation levels.

13. The method of claim 9, wherein the assistant information comprises at least one of: search space information indicating that a search space for detection of subsequent control information is reduced, or search space information indicating whether a search space or a search space set for detection of subsequent control information is the same as the search space or search space set for the control information, wherein, under a condition where the search space information indicates that the search space or the search space set for detection of subsequent control information is the same as the search space or the search space set for the control information, then the detection of subsequent control information is only performed in the same search space or search space set, and wherein, under a condition where the search space information indicates that the search space or the search space set for detection of subsequent control information is different from the search space or the search space set for the control information, then the detection of subsequent control information is only performed in different search space or search space set.

14. The method of claim 9, wherein the assistant information further comprises at least one of: applicable status information indicating that the indication of detection range reduction given in the assistant information is applicable to a specific amount of subsequent control information, or enable indication information which indicates whether at least one of the indication of detection range reduction or the applicable status of the indication of detection range reduction to subsequent control information given in the assistant information takes effect.

15. The method of claim 9, wherein the method further comprises: extending reference control information or reinterpreting a specific field or bit field in the reference control information to generate the assistant information.

16. The non-transitory storage medium of claim 10, wherein the instructions which, when executed by a processor, enable the control-side electronic device to perform:

extending reference control information or reinterpreting a specific field or bit field in the reference control information to generate the assistant information.

17. The non-transitory storage medium of claim 10, wherein the control information is any one of scheduling control information and non-scheduling control information, and wherein subsequent control information subsequent to the control information comprises at least one of scheduling control information and non-scheduling control information.

* * * * *